United States Patent
Hongo et al.

(10) Patent No.: US 7,381,512 B2
(45) Date of Patent: Jun. 3, 2008

(54) HYDROXYGALLIUM PHTHALOCYANINE PIGMENT AND PROCESS FOR THE PRODUCTION THEREOF, ELECTROPHOTOGRAPHIC PHOTORECEPTOR, PROCESS CARTRIDGE, ELECTROPHOTOGRAPHIC DEVICE AND IMAGE FORMATION METHOD

(75) Inventors: Kazuya Hongo, Kanagawa (JP); Kozo Ota, Kanagawa (JP); Masahiko Miyamoto, Kanagawa (JP); Yukiko Kamijo, Kanagawa (JP); Hidemi Nukada, Kanagawa (JP); Kenji Inoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 411 days.

(21) Appl. No.: 10/928,556

(22) Filed: Aug. 30, 2004

(65) Prior Publication Data

US 2005/0100806 A1 May 12, 2005

(30) Foreign Application Priority Data

Nov. 6, 2003 (JP) ............................. 2003-377600
Mar. 24, 2004 (JP) ............................. 2004-088018

(51) Int. Cl.
*G03G 5/05* (2006.01)

(52) U.S. Cl. ........................ 430/78; 540/140; 399/159; 399/262

(58) Field of Classification Search .................. 430/78, 430/135; 540/140, 141; 399/159, 262
See application file for complete search history.

(56) References Cited

U.S. PATENT DOCUMENTS

| 5,885,737 A | * | 3/1999 | Tanaka .................... 430/58.35 |
| 2004/0248027 A1 | * | 12/2004 | Campbell .................... 430/114 |
| 2005/0089787 A1 | | 4/2005 | Uchinokura et al. |

FOREIGN PATENT DOCUMENTS

| JP | A 5-263007 | 10/1993 |
| JP | A 7-53892 | 2/1995 |

OTHER PUBLICATIONS

U.S. Appl. No. 11/738,149, filed Apr. 20, 2007, Iwamoto et al.
U.S. Appl. No. 11/755,484, filed May 30, 2007, Watanabe et al.
U.S. Appl. No. 11/755,517, filed May 30, 2007, Iwamoto et al.
U.S. Appl. No. 11/685,969, filed Mar. 14, 2007, Uchinokura et al.

\* cited by examiner

*Primary Examiner*—John L Goodrow
(74) *Attorney, Agent, or Firm*—Oliff & Berridge, PLC

(57) ABSTRACT

A hydroxygallium phthalocyanine pigment is characterized by having a maximum peak wavelength within a range of from 810 nm to 839 nm in optical absorption spectrum in a wavelength range of from 600 nm to 900 nm.

13 Claims, 29 Drawing Sheets

NUMBER OF REPETITION OF
ELECTROPHOTOGRAPHIC PROCESS

NUMBER OF REPETITION OF
ELECTROPHOTOGRAPHIC PROCESS

HYDROXYGALLIUM PHTHALOCYANINE PIGMENT AND PROCESS FOR THE PRODUCTION THEREOF, ELECTROPHOTOGRAPHIC PHOTORECEPTOR, PROCESS CARTRIDGE, ELECTROPHOTOGRAPHIC DEVICE AND IMAGE FORMATION METHOD

BACKGROUND OF THE INVENTION

1. Field of the Invention

The present invention relates to a hydroxygallium phthalocyanine pigment, a process for the production thereof, a process for producing a photosensitive layer-forming coating solution, an electrophotographic photoreceptor, a process cartridge, an electrophotographic device, and an image formation method.

2. Description of the Related Art

As photoconductive materials to be used in electrophotographic photoreceptors there are normally known various inorganic and organic photoconductive materials. In particular, these organic photoconductive materials have heretofore been proposed, studied and developed in various ways because they are advantageous in that they can form an electrophotographic photoreceptor having a good film transparency, film-forming properties and flexibility and are harmless and available at relatively low cost. Further, there has been a growing demand for the expansion of the wavelength range at which the photoconductive materials are sensitive to the wavelength range of semiconductor laser for the purpose of application to digital recording devices such as laser printer, digital copying machine and facsimile as photoreceptor. Several organic photoconductive materials for semiconductor laser have been already proposed. Among these photoconductive materials, phthalocyanine compounds have been reported much on the relationship between their crystal form and electrophotographic properties.

It is known that phthalocyanine compounds normally show many crystal forms depending on their production process or treatment process and thus show a change of photoelectric properties with crystal form. Known examples of the crystal form of phthalocyanine compounds, in case where they are metal-free phthalocyanine crystals, include α type, β type, π type, γ type and X type crystal forms. Further, gallium phthalocyanine pigments, too, have been reported much on the relationship between their crystal forms and electrophotographic properties. It is reported that a hydroxygallium phthalocyanine pigment having an extremely high sensitivity and diffraction peaks at positions of 7.5°, 9.9°, 12.5°, 16.3°, 18.6°, 25.1° and 28.3° in a Bragg angle ($2\theta \pm 0.2°$) of the X-ray diffraction spectrum using $CuK\alpha$ characteristic X-ray and an electrophotographic photoreceptor comprising such a hydroxygallium phthalocyanine pigment are excellent in photosensitivity, repeatability and environmental stability (see Journal of Imaging Science and Technology, Vol. 40, No. 3, May/June, 249 (1996), Journal of Imaging Science and Technology, Vol. 40, No. 3, May/June, 249 (1996) and JP-A-7-53892).

However, the related art hydroxygallium phthalocyanine pigments are disadvantageous in that when used as a material of electrophotographic photoreceptor, they can not be dispersed sufficiently in the binder resin for electrophotographic photoreceptor or cause scattering of properties such as sensitivity, charge ability and dark decay rate, easily causing image quality defects such as fogging and black or white spots. Thus, the related art hydroxygallium phthalocyanine pigments are not necessarily satisfactory in electrophotographic properties. Further improvements in hydroxygallium phthalocyanine pigments have been desired.

SUMMARY OF THE INVENTION

The present invention has been made in view of the above circumstances. An object of the invention is to provide a hydroxygallium phthalocyanine pigment which can exhibit an excellent dispersibility and sufficient sensitivity, charge ability and dark decay properties when used as a material of electrophotographic photoreceptor to provide a stabilized image quality over an extended period of time without causing image quality defects such as fogging and black or white spots, a process for the production of hydroxygallium phthalocyanine pigment, capable of efficiently and surely producing such a pigment, a process for producing a light sensitive layer-forming waiting solution, an electrophotographic photoreceptor, a process cartridge, an electrophotographic device and an image formation process.

The inventors made extensive studies of solution to the aforementioned problems. As a result, it was found that the use of a hydroxygallium phthalocyanine pigment having a maxim peak wavelength in a specific wavelength range in optical absorption spectrum in a specific wavelength range makes it possible to provide extremely excellent properties as a photoconductive material for electrophotographic photoreceptor and hence accomplish the aforementioned aim. The invention has thus been worked out.

According to a first aspect of the invention, a hydroxygallium phthalocyanine pigment is characterized by having a maximum peak wavelength within a range of from 810 nm to 839 nm in optical absorption spectrum in a wavelength range of from 600 nm to 900 nm.

In a phthalocyanine pigment, an interaction between phthalocyanine molecules changes in accordance with the molecular arrangement in its crystal. As a result, the state of molecular arrangement is reflected in the spectrum. When the phthalocyanine pigment is a hydroxygallium phthalocyanine pigment having a maximum peak wavelength within a range of from 810 nm to 839 nm in optical absorption spectrum as mentioned above, it can be fairly dispersed in the binder resin when used as a material of electrophotographic photoreceptor and the resulting electrophotographic photoreceptor exhibits sufficient sensitivity, charge ability and dark decay properties, making it possible to obtain a stabilized image quality without causing image quality defects such as fogging and black and white spots over an extended period of time. In the case where there are a plurality of peaks in optical absorption spectrum in a wavelength range of from 600 nm to 900 mm, the maximum peak wavelength is peak wavelength at which the maximum absorbance is shown.

When a hydroxygallium phthalocyanine pigment having a maximum peak wavelength in a range of more than 839 nm such as related art V type hydroxygallium phthalocyanine pigment normally having a peak wavelength in a range of from 840 nm to 870 nm (hydroxygallium phthalocyanine pigment having diffraction peaks at positions of 7.5°, 9.9°, 12.5°, 16.3°, 18.6°, 25.1° and 28.3° in a Bragg angle ($2\theta \pm 0.2°$) of the x-ray diffraction spectrum using $CuK\alpha$ characteristic X-ray) is used as a material of electrophotographic photoreceptor, the rise of dark current or fogging can easily occur. The inventors presume that this phenomenon is attributed to the fact that the hydroxygallium phthalocyanine pigment has absorption wavelength located at longer wavelength range and thus has a relatively strong interaction between molecules, making it easy for charge to flow in the crystal.

On the other hand, when a hydroxygallium phthalocyanine pigment having a maximum peak wavelength within a range of less than 810 nm (including those having a peak within a range of from 810 nm to 839 nm or in a range more than 839 nm but having a higher absorbance peak within a range of less than 810 nm) is used as a material of electrophotographic photoreceptor, sensitivity drop or residual potential rise can easily occur. The inventors presume that this phenomenon is attributed to the fact that the hydroxygallium phthalocyanine pigment has absorption wavelength located at shorter wavelength range and thus has a relatively weak interaction between molecules, making it difficult for charge to flow in the crystal.

According to a second aspect of the invention, a process for producing a hydroxygallium phthalocyanine pigment, includes a wet grinding which causes a hydroxygallium phthalocyanine pigment having diffraction peaks at positions of at least 6.9°, 13.2 to 14.2°, 16.5°, 26.0° and 26.4° or 7.0°, 13.4°, 16.6°, 26.0° and 26.7° in a Bragg angle (2θ±0.2°) of X-ray diffraction spectrum using CuKα characteristic X-rays the hydroxygallium phthalocyanine pigment to crystal transformation. The wet griding uses a grinding device with spherical media having an outer diameter of from 0.1 mm to 3.0 mm in an amount equal to or more than 50 parts by weight based on 1 part by weight of the hydroxygallium phthalocyanine pigment, and time of the wet griding is determined by the measurements of the absorption wavelength of the hydroxygallium phthalocyanine pigment which is being ground.

According to a third aspect of the invention, a process for producing a photosensitive layer-forming coating solution includes preparing a dispersion treatment device filled with a dispersion media of 20 to 50% by volume based on the volume of a dispersion chamber and introducing a mixture of a pigment, a binder resin and organic solvent into the dispersion chamber so that the mixture is subject to a dispersion treatment to obtain dispersion solution.

According to a fourth aspect of the invention, a process for producing a photosensitive layer-forming coating solution includes preparing a dispersion treatment device having a circulation path including a dispersion chamber filled with a dispersion media and causing a mixture of a pigment, a binder resin and an organic solvent to circulate through the circulation path to satisfy a relationship represented by following expression (A) so that the mixture is subjected to a dispersion treatment to obtain a dispersion solution.

$$0.3 \leq (Vc/Vo) \leq 1.6 \qquad (A)$$

Vo represents volume (ml) of the dispersion chamber and Vc represents the circulating flow rate (ml/min) of the mixture.

According to a fifth aspect of the invention, an electrophotographic photoreceptor includes a conductive support and a photosensitive layer which is disposed on the conductive layer and has a hydroxygallium phthalocyanine pigment characterized by having a maximum peak wavelength within a range of from 810 nm to 839 nm in optical absorption spectrum in a wavelength range of from 600 nm to 900 nm.

According to a sixth aspect of the invention, an electrophotographic photoreceptor includes an conductive support and a photosensitive layer which is disposed on the conductive layer and has is formed of a photosensitive layer-forming coating solution produced by a process for producing the photosensitive layer-forming coating solution. The process includes preparing a dispersion treatment device filled with a dispersion media of 20 to 50% by volume based on the volume of a dispersion chamber and introducing a mixture of a pigment, a binder resin and organic solvent into the dispersion chamber so that the mixture is subject to a dispersion treatment to obtain dispersion solution.

According to a seventh aspect of the invention, a process cartridge includes an electrophotographic photoreceptor including a conductive support and a photosensitive layer which is disposed on the conductive layer and has a hydroxygallium phthalocyanine pigment having a maximum peak wavelength within a range of from 810 nm to 839 nm in optical absorption spectrum in a wavelength range of from 600 nm to 900 nm, and at least one selected from the group consisting of a charging unit which charges the electrophotographic photoreceptor, an exposure unit which forms an electrostatic latent image on the electrophotographic photoreceptor, a development unit which develops the electrostatic latent image with a toner to form a toner image and a cleaning unit which removing the toner left on the electrophotographic photoreceptor.

According to an eighth aspect of the invention, an electrophotographic apparatus includes an electrophotographic photoreceptor including a conductive support and a photosensitive layer which is disposed on the conductive layer and has a hydroxygallium phthalocyanine pigment having a maximum peak wavelength within a range of from 810 nm to 839 nm in optical absorption spectrum in a wavelength range of from 600 nm to 900 nm, a charging unit which charges the electrophotographic photoreceptor, an exposure unit which forms an electrostatic latent image on the electrophotographic photoreceptor, a development unit which develops the electrostatic latent image with a toner to form a toner image and a transferring unit which transfers the toner image onto a recording medium.

According to a ninth aspect of the invention, an image formation process includes charging an electrophotographic photoreceptor including a conductive support and a photosensitive layer which is disposed on the conductive layer and has a hydroxygallium phthalocyanine pigment characterized by having a maximum peak wavelength within a range of from 810 nm to 839 nm in optical absorption spectrum in a wavelength range of from 600 nm to 900 nm, forming an electrostatic latent image on the electrophotographic photoreceptor, developing the electrostatic latent image with a toner to form a toner image; and transferring the toner image onto a recording medium.

In accordance with the invention, there can be provided a hydroxygallium phthalocyanine pigment which can exhibit an excellent dispersibility and sufficient sensitivity, chargeability and dark decay properties when used as a material of electrophotographic photoreceptor to provide a stabilized image quality over an extended period of time without causing image quality defects such as fogging and black or white spots, a process for the production of hydroxygallium phthalocyanine pigment, electrophotographic photoreceptor, process cartridge, electrophotographic device and image formation process capable of producing such a pigment efficiently and certainly. Further, in accordance with the process for the production of a photosensitive layer-forming coating solution of the invention, there can be provided a photosensitive layer-forming coating solution capable of forming an electrophotographic photoreceptor having good electrical properties and capable of sufficiently inhibiting the occurrence of image quality defects. Moreover, the use of the hydroxygallium phthalocyanine pigment of the invention makes it possible to cause the pigment to be fairly dispersed in the binder resin and obtain sufficient sensitivity, chargeability and dark decay properties and hence to provide an electrophotographic photoreceptor, process cartridge and electrophotographic device capable of giving a stabilized image quality without causing image quality defects over an extended period of time. Further, the use of the hydroxygallium phthalocyanine pigment of the invention makes it possible to obtain sufficient sensitivity, chargeability and dark decay properties. Accordingly, there can be provided an image formation process capable of forming a stabilized quality image without causing image quality defects such as fogging and black or white spots over an extended period of time.

DETAILED DESCRIPTION OF THE PREFFERED EMBODIMENTS

Figure 1A:
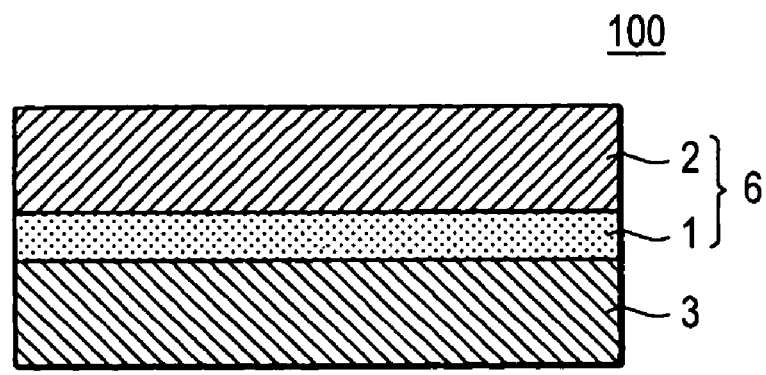
FIGS. 1A to 1C are typical sectional views illustrating first to third embodiments of implementation of the electrophotographic photoreceptor of the invention, respectively.

The details of the invention will be described below.

A hydroxygallium phthalocyanine pigment of the invention is characterized by having a maximum peak wavelength within a range of from 810 nm to 839 nm in optical absorption spectrum in a wavelength range of from 600 nm to 900 nm.

The hydroxygallium phthalocyanine pigment of the invention preferably has an volume average particle diameter of 0.20 μm or less and a BET specific surface area of 45 m$^2$/g or more. Further, the hydroxygallium phthalocyanine pigment of the invention preferably has a maximum primary particle diameter of 0.3 μm or less. When such a hydroxygallium phthalocyanine pigment is used as a material of electrophotographic photoreceptor, it can be more fairly dispersed in the binder. Further, electrophotographic photoreceptor can be reduced in the scattering of sensitivity, chargeability and dark decay properties and thus can provide a stabilized image quality sufficiently free from the occurrence of image quality defects such as fogging and black or white spots over an extended period of time.

The primary particle diameter of hydroxygallium phthalocyanine pigment as used herein can be measured under a transmission electron microscope (TEM) according to the following procedures (i) to (iii).

(i) Prepare a sample mesh for TEM on which a thin resin layer has previously been stuck and reinforced by vacuum metallization with carbon;

(ii) Disperse gallium phthalocyanine in ethanol. Add the dispersion dropwise to the aforementioned sample mesh. Allow the sample to dry.

(iii) Observe the sample mesh on the area where the dispersion has been added at 700× magnification at several to several tens of points over a field of view suitable for observation under TEM.

(iv) Make wide field observation at 6,000× magnification and narrow field observation at 30,000× magnification each in five fields of view.

The term "field of view suitable for observation under TEM" as used in the procedure (ii) is meant to indicate the field of view representing the entire sample. The field of view suitable for observation under TEM is preferably free of portion which has too thick aggregates to transmit electron ray. The field of view suitable for observation under TEM preferably accounts for the majority (70% to 100%) of the observed area of the sample in a wide field of view (low magnification).

Further, the hydroxygallium phthalocyanine pigment of the invention preferably has diffraction peaks at positions of 7.5°, 9.9°, 12.5°, 16.3°, 18.6°, 25.1° and 28.3° in a Bragg angle ($2\theta \pm 0.2°$) of X-ray diffraction spectrum using $CuK\alpha$ characteristic X-ray. When a hydroxygallium phthalocyanine pigment having a diffraction peak as defined above is used for an electrophotographic photoreceptor, an excellent photosensitivity, repeatability and environmental stability as well as sufficient chargeability and dark decay properties can be provided, making it possible to obtain a stabilized image quality sufficiently free from image quality defects over a longer period of time.

Moreover, the hydroxygallium phthalocyanine pigment of the invention preferably has a thermal weight loss of from 2.0% to 4.0% when heated from 25° C. to 400° C.

The thermal weight loss of hydroxygallium phthalocyanine pigment when heated from 25° C. to 400° C. observed during the thermal analysis thereof depends on the residual solvent and impurities contained in the crystal of hydroxygallium phthalocyanine pigment. By controlling the thermal weight loss within the above defined range, the effect of residual solvent and impurities on the sensitivity, chargeability, dark decay properties, potential stability against repeated use and image quality can be sufficiently inhibited. When such a hydroxygallium phthalocyanine pigment is used as a material of electrophotographic photoreceptor, more sufficient sensitivity, chargeability and dark decay properties can be obtained, making it possible to prevent the occurrence of image quality defects more sufficiently and hence obtain a stabilized image quality over a longer period of time.

A process for producing a hydroxygallium phthalocyanine pigment of the invention, including a wet grinding which causes a hydroxygallium phthalocyanine pigment having diffraction peaks at positions of at least 6.9°, 13.2 to 14.2°, 16.5°, 26.0° and 26.4° or 7.0°, 13.4°, 16.6°, 26.0° and 26.7° in a Bragg angle ($2\theta \pm 0.2°$) of X-ray diffraction spectrum using $CuK\alpha$ characteristic X-rays the hydroxygallium phthalocyanine pigment to crystral transformation. The wet griding uses a grinding device with spherical media having an outer diameter of from 0.1 mm to 3.0 mm in an amount equal to or more than 50 parts by weight based on 1 part by weight of the hydroxygallium phthalocyanine pigment, and time of the wet griding is determined by the measurements of the absorption wavelength of the hydroxygallium phthalocyanine pigment which is being ground. During the wet-grinding step, the wet-grinding time is preferably determined while monitoring the state of crystal transformation by the measurements of the absorption wavelength of the solution to be wet-ground such that the hydroxygallium phthalocyanine pigment after subjected to the wet-grinding step has a maximum peak wavelength within a range of from 810 nm to 839 nm in optical absorption spectrum in a wavelength range of from 600 nm to 900 nm.

The hydroxygallium phthalocyanine pigments obtained by the related art production methods tend to cause occurrence of coarse particles, aggregation of particles or uniformity in particle shape attributed to their crystal form or production step. The particle ununiformity causes scattering of photoelectric properties or lowering of dispersibility leading to the occurrence of image quality defects. On the contrary, the aforementioned production process of the invention can efficiently and certainly provide a hydroxygallium phthalocyanine pigment which has an unprecedentedly fine particle state and particle uniformity and has a maximum peak wavelength within a range of from 810 nm to 839 nm in optical absorption spectrum in a wavelength range of from 600 nm to 900 nm while maintaining a high sensitivity as in the related art hydroxygallium phthalocyanine pigments. When such a hydroxygallium phthalocyanine pigment is used as a material of electrophotographic photoreceptor, it can be fairly dispersed in the binder resin. The resulting electrophotographic photoreceptor exhibits sufficient sensitivity, chargeability and dark decay properties, making it possible to obtain a stabilized image quality without causing image quality defects over an extended period of time.

In the process for producing a hydroxygallium phthalocyanine pigment of the invention, the wet grinding step is preferably followed by cleaning with a solvent and/or heat drying. In this manner, a hydroxygallium phthalocyanine pigment of the invention having a thermal weight loss of from 2.0 to 4.0% when heated from 25° C. to 400° C. can be efficiently and certainly obtained.

The process for producing a photosensitive layer-forming coating solution of the invention preferably includes a first dispersion step of preparing a dispersion device filled with dispersion media in an amount of from 20 to 50% by volume based on the volume of the dispersion chamber and then introducing a mixture of a pigment, a binder resin and an organic solvent into the dispersion chamber so that the mixture is subjected to dispersion to obtain a dispersion solution.

Examples of the related art process for the production of a photosensitive layer of electrophotographic photoreceptor include a process which comprises vacuum evaporation of a pigment which forms an electrophotographic photoreceptor such as phthalocyanine pigment and azo pigment to form a photosensitive layer, and a process which comprises dispersing these pigments in a binder resin to prepare a coating solution, and then making a film from the coating solution to form a photosensitive layer. Among these processes, the latter process is normally used because it is excellent in productivity and cost reduction.

In the case where the process involving the use of the coating solution is employed, the dispersion of pigments in a binder resin can be carried out by various methods. In some detail, dispersion methods using dispersion media such as paint shaker, ball mill and sandmill are widely used. As the dispersion media there are used spherical particles of glass, ceramic, alumina, zirconia, etc.

In the case where the photosensitive layer of an electrophotographic photoreceptor is formed by a coating solution prepared by dispersion with dispersion media, the degree of dispersion of the coating solution has a great effect on the characteristics of the electrophotographic photoreceptor thus formed. For example, when the secondary aggregates of pigment are generally large or the pigment contains coarse particles having a diameter drastically deviating from the volume average particle diameter, these coarse particles are present in the photosensitive layer if the degree of dispersion of the coating solution is insufficient. When an electrophotographic photoreceptor having such a photosensitive layer is used to perform image formation, image quality defects such as fogging and black spots easily occur.

Accordingly, in order to inhibit the occurrence of such image quality defects and provide a good pigment dispersion stability, it is necessary that secondary aggregates of particles or coarse particles is thoroughly dispersed to reduce the diameter thereof. To this end, it is necessary that the dispersion time is sufficiently prolonged and the dispersion shear be sufficiently raised during the production of the coating solution.

In the case of ordinary wet dispersion, the dispersion and reduction of particle diameter of pigment are accomplished by the collision of pigment particles to each other, to the inner wall of the dispersion chamber and to dispersion media such as spherical particles during dispersion resulting in cracking or loosening of the secondary aggregates of particles or coarse particles. In order to sufficiently disperse or reduce the particle diameter of the pigment particles, it is necessary that the dispersion time is prolonged, the amount of dispersion media is raised, the viscosity of the solution to be dispersed is raised and the flow rate of the solution to be dispersed is controlled to raise the dispersion shear.

However, when the dispersion shear is too great, particles of pigment such as phthalocyanine pigment and azo pigment are out of shape or undergo crystal transformation. The resulting electrophotographic photoreceptor shows a drastic change in the electrical properties, causing image quality defects such as sensitivity drop, charging potential change and ghost. It is known that the crystal form of the polymorphic pigment such as phthalocyanine pigment and azo pigment tends to be changed when an external force is given. In particular, a hydroxygallium phthalocyanine pigment can easily undergo crystal transformation when an external force is given. Therefore, when subjected to dispersion with excessive shear or for a prolonged period of time, a hydroxygallium phthalocyanine pigment readily shows change of crystal form, causing further occurrence of image quality defects such as black spots, fogging and ghost or chargeability drop.

It has thus been heretofore difficult to produce a photosensitive layer-forming coating solution comprising pigment particles sufficiently dispersed and having a sufficiently reduced diameter and a sufficiently maintained crystal form it has therefore been difficult to form an electrophotographic photoreceptor having good electrical properties which can sufficiently prevent the occurrence of image quality defects such as black spots, fogging and ghost.

On the other hand, the inventors found that the use of the aforementioned process for the production of a photosensitive layer-forming coating solution makes it possible to solve the aforementioned problems. In some detail, in the process for the production of a photosensitive layer-forming coating solution, the mixture (solution to be dispersed to become a photosensitive layer-forming coating solution) can be dispersed in such a manner that the packing of dispersion media in the dispersion chamber falls within the above defined range, making it possible to sufficiently reduce the particle diameter of the pigment while sufficiently preventing the application of excessive dispersion shear to the pigment particles leading to the change of crystal form during dispersion. In this manner, the occurrence of image quality defects can be sufficiently inhibited, making it possible to obtain a photosensitive layer-forming coating solution capable of forming an electrophotographic photoreceptor having good electrical properties.

The term "packing" as used hereinabove is used to indicate the percent proportion of dispersion media in the volume of the dispersion chamber in the dispersion device.

The process for producing a photosensitive layer-forming coating solution of the invention may include a second dispersion step of preparing a dispersion device having a circulation path comprising a dispersion chamber filled with dispersion media and then allowing a mixture of a pigment, a binder resin and an organic solvent to be circulated through the circulation path to satisfy a relationship represented by following expression (A) so that the mixture is subjected to a dispersion treatment to obtain a dispersion solution.

$$0.3 \leq (Vc/Vo) \leq 1.6 \tag{A}$$

Vo represents the volume (ml) of the dispersion chamber; and Vc represents the circulating flow rate (ml/min) of the mixture.

By effecting the dispersion step in such a manner that the requirement represented by the aforementioned equation (A) is satisfied, the diameter of the pigment particles can be sufficiently reduced while sufficiently preventing the change of crystal form due to the application of excessive shear to the pigment particles during the dispersion of the mixture. In this manner, making it possible to obtain a photosensitive layer-forming coating solution capable of forming an electrophotographic photoreceptor that can sufficiently inhibit the occurrence of image quality defects and has good electrical properties.

In the aforementioned second dispersion step, the aforementioned packing of dispersion media in the volume of the aforementioned dispersion chamber is preferably predetermined to be from 20 to 50% by volume.

In this arrangement, the diameter of the pigment particles can be more sufficiently reduced while more sufficiently preventing the change of crystal form due to the change of crystal form the application of excessive shear to the pigment particles during the dispersion of the composition. In this manner, a photosensitive layer-forming coating solution capable of more certainly forming an electrophotographic photoreceptor that can inhibit the occurrence of image quality defects and has good electrical properties can be obtained.

The process for producing a photosensitive layer-forming coating solution of the invention preferably further includes centrifugal separation step of centrifugally separating the dispersion obtained at the aforementioned first or second dispersion step.

By effecting a centrifugal separation step after the dispersion step, abrasion pieces of the dispersion chamber and the dispersion media, if they are mixed in the dispersion step, or coarse particles, if they are left undispersed, can be efficiently removed, making it possible to obtain a photosensitive layer-forming coating solution capable of more certainly forming an electrophotographic photoreceptor which can inhibit the occurrence of image quality defects such as fogging and ghost more sufficiently.

In the process for producing of a photosensitive layer-forming coating solution of the invention, the aforementioned pigment is preferably a hydroxygallium phthalocyanine pigment.

The aforementioned process for the producing a photosensitive layer-forming coating solution of the invention is particularly suitable for the production of a photosensitive layer-forming coating solution involving the dispersion of an organic pigment, particularly hydroxygallium phthalocyanine pigment. This is because a hydroxygallium phthalocyanine pigment has a high sensitivity but tends to cause change of crystal form when given a great dispersion shear, causing deterioration of properties of the resulting electrophotographic photoreceptor. When the coating solution of such a hydroxygallium phthalocyanine pigment is produced by the process for the production of a photosensitive layer-forming coating solution of the invention, the aforementioned problems can be solved, making it possible to obtain a photosensitive layer-forming coating solution capable of certainly forming an electrophotographic photoreceptor that can sufficiently inhibit the occurrence of image quality defects and has good electrical properties.

Further, in the process for producing a photosensitive layer-forming coating solution of the invention, the aforementioned hydroxygallium phthalocyanine pigment is preferably the hydroxygallium phthalocyanine pigment of the invention.

In this arrangement, the dispersion and reduction of diameter of the pigment particles can be sufficiently effected while sufficiently preventing the change of the crystal form of the pigment particles at the aforementioned dispersion step. In this manner, a photosensitive layer-forming coating solution capable of certainly forming an electrophotographic photoreceptor that the sufficiently inhibit the occurrence of image quality defects and has good electrical properties can be obtained. Further, the use of such a photosensitive layer-forming coating solution makes it possible to form a high sensitivity electrophotographic photoreceptor which can provide a good image quality. Moreover, the use of the aforementioned hydroxygallium phthalocyanine pigment of the invention makes it possible to further reduce the amount of coarse particles left in the photosensitive layer-forming coating solution obtained by dispersion. Accordingly, when the aforementioned photosensitive layer-forming coating solution is used, a better photosensitive layer having less coat layer defects can be formed, making it possible to more effectively inhibit the occurrence of image quality defects caused by coat layer defects.

The electrophotographic photoreceptor of the invention comprises a conductive support and a photosensitive layer provided thereon, wherein the photosensitive layer comprises the aforementioned hydroxygallium phthalocyanine pigment incorporated therein.

The process cartridge of the invention includes the aforementioned electrophotographic photoreceptor and at least one selected from the group consisting of charging unit of charging the electrophotographic photoreceptor, exposure unit of forming an electrostatic latent image on the electrophotographic photoreceptor, development unit of developing the electrostatic latent image formed on the electrophotographic photoreceptor with a toner to form a toner image and cleaning unit of removing the toner left on the electrophotographic photoreceptor.

Further, the electrophotographic device of the invention includes the aforementioned electrophotographic photoreceptor, a charging unit of charging the electrophotographic photoreceptor, an exposure unit of forming an electrostatic latent image on the electrophotographic photoreceptor, a development unit of developing the electrostatic latent image formed on the electrophotographic photoreceptor with a toner to form a toner image, and a transferring unit of transferring the toner image onto a transferring material.

All the electrophotographic photoreceptor, process cartridge and electrophotographic device preferably includes the aforementioned hydroxygallium phthalocyanine pigment of the invention incorporated therein. The aforementioned hydroxygallium phthalocyanine pigment of the invention can be fairly dispersed. The resulting products exhibit sufficient sensitivity, chargeability and dark decay properties, making it possible to obtain a stabilized image quality without causing image quality defects such as fogging and black and white spots over an extended period of time.

Further, the electrophotographic photoreceptor of the invention includes an conductive support and a photosensitive layer provided thereon, wherein the photosensitive layer is formed of a photosensitive layer-forming coating solution produced by the aforementioned process for the production of a photosensitive layer-forming coating solution of the invention.

In this arrangement, an electrophotographic photoreceptor that can sufficiently inhibit the occurrence of image quality defects and has good electrical properties can be obtained.

In the electrophotographic photoreceptor of the invention, the aforementioned photosensitive layer preferably comprises at least a charge-generating layer containing a charge-generating material and a charge-transporting layer containing a charge-transporting material.

In the aforementioned arrangement that the photosensitive layer is a function separation type (laminated) photosensitive layer comprising a charge-generating layer and a charge-transporting layer and comprises the aforementioned hydroxygallium phthalocyanine pigment incorporated therein, a high sensitivity, a high chargeability and an excellent repetition stability of these properties can be obtained. In this case, the hydroxygallium phthalocyanine pigment of the invention is normally incorporated in the charge-generating layer as a charge-generating material.

Moreover, the aforementioned charge-transporting layer preferably comprises a polymer or copolymer having structural units represented by the following general formula (1) (hereinafter optionally referred to as "polymer 1").

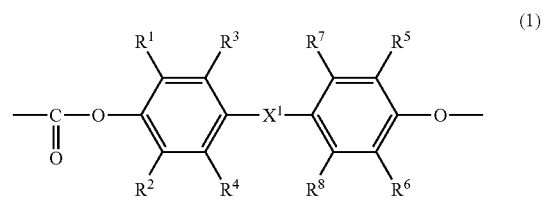

(1)

In the general formula (1), $R^1$ to $R^8$ each independently represent a hydrogen atom, alkyl group, aralkyl group, allyl group, substituted or unsubstituted aryl group or halogen atom; and $X^1$ represents a substituted or unsubstituted phenylene, biphenylene or naphthylene group, divalent aliphatic hydrocarbon group or divalent cyclic hydrocarbon group.

Further, the aforementioned charge-transporting layer preferably comprises a polymer or copolymer having structural units represented by the following general formula (2) (hereinafter optionally referred to as "polymer 2").

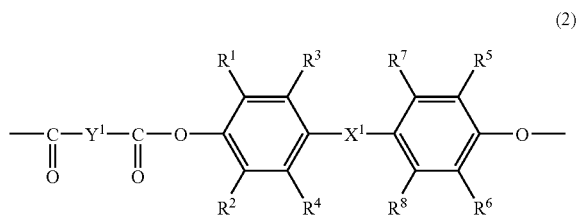
(2)

In the general formula (2), $R^1$ to $R^8$ each independently represent a hydrogen atom, alkyl group, aralkyl group, allyl group, substituted or unsubstituted aryl group or halogen atom; and $X^1$ and $Y^1$ each independently represent a substituted or unsubstituted phenylene, biphenylene or naphthylene group, divalent aliphatic hydrocarbon group or divalent cyclic hydrocarbon group.

The incorporation of the polymer 1 and/or polymer 2 makes it possible to provide a charge-transporting layer which is not only excellent in flexibility and strength but also can efficiently receive charge generated by the hydroxygallium phthalocyanine pigment of the invention because the units constituting these polymers are free of moiety having a great polarity.

Moreover, in the electrophotographic device of the invention, the aforementioned charging unit is preferably a unit capable of controlling the charging potential so that the charging potential after predetermined times of the repetition of an electrophotographic process comprising charging by the charging unit, exposure by the exposure unit, development by the development unit and transfer by the transferring unit is lower than the charging potential in the first cycle of the electrophotographic process.

In general, in an electrophotographic device, the repetition of the electrophotographic process is accompanied by the progress of abrasion of the surface layer of the electrophotographic photoreceptor. As the abrasion of the surface layer proceeds, the intensity of electric field applied to the photosensitive layer of the electrophotographic photoreceptor rises. As a result, in the case where the related art hydroxygallium phthalocyanine pigments are used, the rise of the intensity of electric field causes the occurrence of image quality defects such as density drop, making it difficult to obtain a stabilized image quality over an extended period of time.

On the contrary, an electro photographic device comprising an electrophotographic photoreceptor made of the hydroxygallium phthalocyanine pigment of the invention as well as the aforementioned charging unit can provide a stabilized image quality over a longer period of time.

Referring to the reason why a stabilized image quality can be obtained for a longer period of time, the inventors presume as follows. Firstly, it is thought that the impossibility of obtaining a stabilized image quality over an extended period of time is not caused by the abrasion of the surface layer of the electrophotographic photoreceptor itself but is caused by the rise of the intensity of electric field applied to the photosensitive layer. It is thus thought that when the electrophotographic process is repeated predetermined times by the aforementioned charging unit, the charging potential applied to the electrophotographic photoreceptor can be decreased to inhibit the rise of the intensity of electric field accompanying the abrasion of the photosensitive layer, making it possible to keep the intensity of electric filed within a predetermined range and hence inhibit the occurrence of image quality defects. It is further presumed that even when the repetition of the electrophotographic process is accompanied by the abrasion of the surface layer of the electrophotographic photoreceptor resulting in the rise of the intensity of electric field applied to the photosensitive layer, the hydroxygallium phthalocyanine pigment of the invention can sufficiently prevent itself from the passage of excess current through its crystal. Accordingly, it is thought that the use of the hydroxygallium phthalocyanine pigment of the invention and the adjustment of the charging potential applied to the electrophotographic photoreceptor by the aforementioned charging unit make it possible to obtain a stabilized image quality for a longer period of time.

Further, in the electrophotographic device, the aforementioned exposure unit is preferably capable of forming an electrostatic latent image on the electrophotographic photoreceptor between the time at which the electrophotographic photoreceptor in stationary state is actuated and the time at which the electrophotographic photoreceptor has completed one rotation.

In recent years, in the art of electrophotographic image forming apparatus, there has been a growing demand for the reduction of the time between the reception of image output and the point at which a first sheet of image is outputted (FCOT) from the standpoint of working efficiency and energy saving. In general, an electrophotographic photoreceptor tends to show a delicate change of charging potential (VH) and exposure potential (VL) over the period between the actuation from the stationary state and one to several rotations. Therefore, the related art electrophotographic devices are normally arranged such that the electrophotographic photoreceptor makes several idle rotations until the charging potential (VH) and exposure potential (VL) are stabilized before the formation of an electrostatic latent image on the electrophotographic photoreceptor. When the exposure step is preceded by the idle rotation of the electrophotographic photoreceptor, it is disadvantageous in that FCOT is prolonged by the time of idle rotation.

For example, in the case where the related art hydroxygallium phthalocyanine pigments are used in an electrophotographic device, a problem arises that the charging potential (VH) and exposure potential (VL) are not stabilized over the period between the actuation of the electrophotographic photoreceptor from stationary state and one to several rotations as in the case mentioned above. This is presumably attributed to the dispersibility of the hydroxygallium phthalocyanine pigments in the binder resin and their crystalline state. As previously described, the related art hydroxygallium phthalocyanine pigments have a relatively strong interaction between molecules. This means that a large amount of free carriers which have been naturally excited by heat can be present in the pigment crystal regardless of exposure energy. It is thought that the electrical properties of an electrophotographic photoreceptor having such a hydroxygallium phthalocyanine pigment having a large amount of free carriers incorporated in its photosensitive layer is kept unstable until the density of free carriers falls to a certain level.

Therefore, an image is output when an electrophotographic photoreceptor comprising the related art hydroxygallium phthalocyanine pigments is subjected to exposure over the period of one to several rotations during which the charging potential (VH) and exposure potential (VL) are not yet stabilized, an image quality defect called ghost is caused by the appearance of exposure history (exposure image) developed at one cycle of the electrophotographic process at the subsequent cycle of the electrophotographic process.

Accordingly, in order that the related art electrophotographic devices provide a good image quality, it is necessary that the electrophotographic photoreceptor make idle rotation until the charging potential (VH) and exposure potential (VL) are stabilized, making it difficult to reduce FCOT.

On the contrary, the hydroxygallium phthalocyanine pigment of the invention has a relatively weak interaction between molecules as described above. It is thus thought that the density of free carriers in the crystal of the pigment can be kept below a certain level, making it possible to stabilize the charging potential (VH) and exposure potential (VL) even over the period of one to several rotations. Therefore, the occurrence of ghost can be sufficiently prevented. The use of such a hydroxygallium phthalocyanine pigment in combination with the electrophotographic device having the aforementioned exposure unit makes it possible to omit the time of idle rotation and hence reduce FCOT sufficiently. Further, a good image quality sufficiently free from the occurrence of ghost can be obtained.

The image formation process of the invention includes a charging step of charging the aforementioned electrophotographic photoreceptor of the invention, an exposure step of forming an electrostatic latent image on the aforementioned electrophotographic photoreceptor, a development step of developing the electrostatic latent image formed on the aforementioned electrophotographic photoreceptor with a toner to form a toner image, and a transferring step of transferring the aforementioned toner image on to a transferring material.

In accordance with the aforementioned image formation process, the use of an electrophotographic photoreceptor comprising the hydroxygallium phthalocyanine pigment of the invention makes it possible to obtain sufficient sensitivity, chargeability and dark decay properties. Thus, a stabilized image quality can be obtained without causing image quality defects such as fogging and black or white spots over an extended period of time.

Further, the image formation process of the invention is preferably characterized in that, in the charging step, the surface of the electron photoreceptor is charged while controlling the charging potential so that the charging potential after predetermined times of the repetitions of an electrophotographic process comprising the charging step, the exposure step, the development step and the transferring step is lower than the charging potential in the first cycle of the electrophotographic process.

In accordance with the aforementioned image formation process, the use of the hydroxygallium phthalocyanine pigment of the invention and the adjustment of the charging potential of the surface of the electrophotographic photoreceptor at the aforementioned charging step make it possible to predetermine the intensity of electric field applied to the photosensitive layer within a predetermined range and hence to form a stabilized quality image without causing image quality defects such as density drop over an extended period of time.

Further, in the image formation process of the invention, it is preferred that the aforementioned exposure step is a step of forming an electrostatic latent image on the electrophotographic photoreceptor between the time at which the electrophotographic photoreceptor in stationary state is actuated and the time at which the electrophotographic photoreceptor has completed one rotation.

In accordance with the image formation process of the invention, the use of the hydroxygallium phthalocyanine pigment of the invention and the formation of an electrostatic latent image on the electrophotographic photoreceptor from the first rotation by the aforementioned exposure step make it possible to omit the time of idle rotation and hence to reduce FCOT sufficiently. Further, a good image quality sufficiently free from the occurrence of ghost can be obtained.

Preferred embodiments of implementation of the invention will be described below in detail optionally in connection with the attached drawings. In these drawings, same index numbers are given to the same or corresponding elements.

(Hydroxygallium Phthalocyanine Pigment)

Unlike the related art V type hydroxygallium phthalocyanine pigments, the hydroxygallium phthalocyanine pigment of the invention has a maximum peak wavelength within a range of from 810 nm to 839 nm in optical absorption spectrum in a wavelength range of from 600 nm to 900 nm. Those having a maximum peak wavelength within a range of from 810 nm to 835 nm are preferred because they have a better dispersibility. Thus, the hydroxygallium phthalocyanine pigment of the invention has a maximum peak wavelength located at shorter wavelength range than the related art V type hydroxygallium phthalocyanine pigments in optical absorption spectrum. In this arrangement, the hydroxygallium phthalocyanine pigment of the invention forms fine pigment particles the crystalline arrangement of which is fairly controlled. When such a hydroxygallium phthalocyanine pigment is used as a material of electrophotographic photoreceptor, an excellent dispersibility and sufficient sensitivity, chargeability and dark decay properties can be obtained.

The hydroxygallium phthalocyanine pigment of the invention preferably has an volume average particle diameter falling within a predetermined range and a BET specific surface area falling within a predetermined range. In some detail, the volume average particle diameter of the hydroxygallium phthalocyanine pigment of the invention is preferably 0.20 μm or less, more preferably from 0.01 to 0.15 μm, even more preferably from 0.01 to 0.1 μm, particularly from 0.01 to 0.08 μm. The BET specific surface area of the hydroxygallium phthalocyanine pigment of the invention is preferably 45 $m^2/g$ or more, more preferably 50 $m^2/g$ or more, particularly from 55 to 120 $m^2/g$.

When the volume average particle diameter of the hydroxygallium phthalocyanine pigment of the invention is more than 0.20 μm, or when the specific surface area of the hydroxygallium phthalocyanine pigment is less than 45 $m^2/g$, the particulate pigment is coarse or aggregates of particles are formed and thus tending to cause defects in dispersibility, sensitivity, chargeability and dark decay when used to form an electrophotographic photoreceptor and hence defects in image quality tend to be caused.

Further, the hydroxygallium phthalocyanine pigment of the invention is preferably free of coarse particles having a great particle diameter. In some detail, the maximum primary particle diameter of the hydroxygallium phthalocyanine pigment of the invention is preferably 0.3 μm or less, more preferably 0.2 μm or less. When the maximum primary particle diameter of the hydroxygallium phthalocyanine pigment is more than 0.3 μm, the particulate pigment is coarse or aggregates of particles are formed and thus tending to cause defects in dispersibility, sensitivity, chargeability and dark decay when used to form an electrophotographic photoreceptor and hence defects in image quality tend to be caused.

Further, the hydroxygallium phthalocyanine pigment of the invention preferably has diffraction peaks at positions of 7.5°, 9.9°, 12.5°, 16.3°, 18.6°, 25.1° and 28.3° in a Bragg angle (2θ±0.2°) of X-ray diffraction spectrum using CuKα characteristic X-ray.

Moreover, the hydroxygallium phthalocyanine pigment of the invention preferably has a thermal weight loss of from 2.0 to 4.0%, more preferably from 2.5 to 3.8% when heated from 25° C. to 400° C. The thermal weight loss can be measured by means of a thermobalance or the like.

When the thermal weight loss of the hydroxygallium phthalocyanine pigment of the invention exceeds 4.0%, impurities contained in the hydroxygallium phthalocyanine pigment have effects on the electrophotographic photoreceptor, giving a tendency that sensitivity, potential stability during repeated use and image quality can be deteriorated. On the contrary, when the thermal weight loss of the hydroxygallium phthalocyanine pigment is less than 2.0%, a tendency is given that sensitivity is deteriorated. This is attributed to the fact that the hydroxygallium phthalocyanine pigment interacts with the solvent molecules which are contained in the crystal in a slight amount to exert a sensitizing effect.

Further, the hydroxygallium phthalocyanine pigment of the invention may be subjected to surface treatment from the standpoint of enhancement of dispersibility so far as the maximum peak wavelength satisfies the aforementioned requirements. The surface treatment agent to be used herein is not specifically limited but may be a coupling agent or the like.

Examples of the coupling agent employable herein include silane coupling agents such as vinyl trimethoxy silane, γ-methacryloxypropyl-tris(β-methoxyethoxy) silane, β-(3,4-epoxycyclohexyl)ethyltrimethoxysilane, γ-glycidoxypropyltrimethoxy silane, vinyl triacetoxy silane, γ-mercaptopropyl trimethoxy silane, γ-aminopropl triethoxy silane, N-β-(aminoethyl)-γ-aminopropyl trimethoxy silane, N-β-(aminoethyl)-γ-aminopropylmethyl methoxy silane, N,N-bis(β-hydroxy ethyl)-γ-aminopropyl triethoxy silane, γ-chloropropyl trimethoxy silane, vinyl triethoxy silane, vinyl tris(2-methoxyethoxysilane), 3-methacryloxy propyl trimethoxy silane, 3-glycidoxy propyl trimethoxy silane, 2-(3,4-epoxycyclohexyl)ethyl trimethoxy silane, N-2-(aminoethyl)-3-aminopropyl trimethoxy silane, N-2-(aminoethyl)-3-aminopropyl dimethoxy silane, 3-aminopropyl triethoxy silane, N-phenyl-3-aminopropyl trimethoxy silane, 3-mercaptopropyl trimethoxy silane and 3-chloropropyl trimethoxy silane. Preferred among these silane coupling agents are vinyl trimethoxy silane, vinyl tris(2-methoxyethoxysilane), 3-methacryloxy propyl trimethoxy silane, 3-glycidoxy propyl trimethoxy silane, 2-(3,4-epoxycyclohexyl)ethyl trimethoxy silane, N-2-(aminoethyl)-3-aminopropyl trimethoxy silane, N-2-(aminoethyl)-3-aminopropyl dimethoxy silane, 3-aminopropyl triethoxy silane, N-phenyl-3-aminopropyl trimethoxy silane, 3-mercaptopropyl trimethoxy silane, and 3-chloropropyl trimethoxy silane.

Besides these coupling agents, organic zirconium compounds such as zirconium butoxide, zirconium ethyl acetoacetate, zirconium triethanolamine, acetyl acetonate zirconium butoxide, zirconium butoxide ethyl acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, zirconium butoxide stearate and zirconium butoxide isostearate may be used. Further, organic titanium compounds such as tetraisopropyl titanate, tetranormal butyl titanate, butyl titanate dimer, tetra(2-ethylhexyl)titanate, titanium acetyl acetonate, poly(titanium acetylacetonate), titanium octylene glycolate, titanium lactate ammonium salt, titanium lactate, titanium lactate ethyl ester, titanium triethanol aminate and polyhydroxys titanium stearate and organic aluminum compounds such as aluminum isopropylate, monobutoxy aluminum diisopropylate, aluminum butylate, diethyl acetoacetate aluminum diisopropylate and aluminum tris(ethyl acetoacetate) may be used.

The hydroxygallium phthalocyanine pigment of the invention described above can be used for various purposes such as pigment, dye, electrophotographic photoreceptor, optical disc, solar cell, sensor, deodorizer, anti-fungus and non-linear optical material. In particular, when the hydroxygallium phthalocyanine pigment of the invention is used as a charge-generating material for electrophotographic photoreceptor, it can provide the resulting electrophotographic photoreceptor with an optimum sensitivity or an excellent photoelectrical properties and can be fairly dispersed in the binder resin contained in the photosensitive layer to provide excellent image quality characteristics.

(Process for the Production of Hydroxygallium Phthalocyanine Pigment)

The process for the production of the hydroxygallium phthalocyanine pigment of the invention comprises wet-grinding a hydroxygallium phthalocyanine pigment having diffraction peaks at positions 6.9°, 13.2 to 14.2°, 16.5°, 26.0° and 26.4° or 7.0°, 13.4°, 16.6°, 26.0° and 26.7° in of a Bragg angle (2θ±0.2°) of X-ray diffraction spectrum using CuKα characteristic X-ray to cause crystal transformation thereof, wherein the wet grinding step is effected using a grinding device with spherical media having an outer diameter of from 0.1 mm to 3.0 mm in an amount of 50 parts by weight or more based on 1 part by weight of the hydroxygallium phthalocyanine pigment and the wet grinding time is determined by the measurements of the absorption wavelength of the hydroxygallium phthalocyanine pigment which is being ground. During the wet-grinding step, the wet-grinding time is preferably determined while monitoring the state of crystal transformation by the measurements of the absorption wavelength of the solution to be wet-ground such that the hydroxygallium phthalocyanine pigment after subjected to wet-grinding has a maximum peak wavelength within a range of from 810 nm to 839 nm in optical absorption spectrum in a wavelength range of from 600 nm to 900 nm at the wet-grinding step.

The hydroxygallium phthalocyanine pigment having a diffraction peaks at positions of 6.9°, 13.2 to 14.2°, 16.5°, 26.0° and 26.4° or 7.0°, 13.4°, 16.6°, 26.0° and 26.7° in a Bragg angle (2θ±0.2°) of X-ray diffraction spectrum using CuKα characteristic X-ray to be used as a starting material in the production process (hereinafter referred to as "I type hydroxygallium phthalocyanine pigment") can be obtained by any known method. An example of such a method will be described below.

Firstly, crude gallium phthalocyanine is produced by a method which comprises reacting o-phthalodinitrile or 1,3-diiminoisoindoline with gallium trichloride in a predetermined solvent (I type chlorogallium phthalocyanine method), a method which comprises heating and reacting o-phthalodinitrile, an alkoxy gallium and ethylene glycol in a predetermined solvent to synthesize a phthalocyanine dimer (phthalocyanine dimer method) or the like. As the solvent to be used in the aforementioned reaction there is preferably used an inert high boiling solvent such as α-chloronaphthalene, β-chloro naphthalene, α-methyl naphthalene, methoxy naphthalene, dimethyl amonoethanol, diphenylmethane, ethylene glycol, dialkyl ether, quinoline, sulfolane, dichlorobenzene, dimethyl formamide, dimethyl sulfoxide and dimethyl sulfonamide.

Subsequently, the crude gallium phthalocyanine obtained at the aforementioned step is subjected to acid pasting treatment so that it is atomized and converted to I type hydroxygallium phthalocyanine pigment. The term "acid pasting treatment" as used herein is meant to indicate a process which comprises pouring crude gallium phthalocyanine in an acid such as sulfuric acid or a salt of crude gallium phthalocyanine with an acid such as sulfuric acid into an alkali aqueous solution, water or ice-water to cause recrystallization thereof. The acid to be used as an acid for use in the aforementioned acid pasting treatment is preferably sulfuric acid, more preferably sulfuric acid having a concentration of from 70% to 100% (particularly from 95% to 100%).

In the process for the production of the hydroxygallium phthalocyanine pigment of the invention, the I type hydroxygallium phthalocyanine pigment obtained by the aforementioned acid pasting treatment is then subjected to wet grinding with a solvent to undergo crystal transformation.

The aforementioned wet grinding is effected using a grinding device with spherical media having an outer diameter of from 0.1 mm to 3.0 mm, preferably from 0.2 mm to 2.5 mm. When the outer diameter of the media is greater than 3.0 mm, the grinding efficiency is deteriorated to prevent the product from being atomized to a sufficiently small particle diameter, giving a tendency that aggregates can be easily produced. On the contrary, when the outer diameter of the media is smaller than 0.1 mm, a tendency is given that the media and the hydroxygallium phthalocyanine pigment can be difficultly separated from each other. Further, when the media are in a form other than sphere, such as pillar and amorphous form, the grinding efficiency is deteriorated. At the same time, as grinding proceeds, the media can be easily worn, giving an impurity powder that can easily deteriorate the properties of the hydroxygallium phthalocyanine pigment.

The material of the aforementioned media is not specifically limited but those hardly causing defects in image quality even when mixed in the hydroxygallium phthalocyanine pigment are preferred. The media is preferably glass, zirconia, aluminum, agate or the like.

Further, the material of the vessel in which the aforementioned wet grinding is effected is not specifically limited but those hardly causing defects in image quality even when mixed in the hydroxygallium phthalocyanine pigment are preferred. The vessel is preferably made of glass, zirconia, alumina, agate, polypropylene, teflon (trade name), polyphenylene sulfide or the like. The vessel maybe also made of iron or stainless steel lined with glass, polypropylene, teflon (trade name), polyphenylene sulfide or the like.

The amount of the aforementioned media to be used depends on the grinding device used but is normally 50 parts by weight or more, preferably from 55 to 100 parts by weight based on 1 part by weight of I type hydroxygallium phthalocyanine pigment. As the outer diameter of the media decreases, the density of the media in the device increases for the same weight (amount used) to raise the viscosity of the mixed solution and change the grinding efficiency. Accordingly, it is preferred that as the outer diameter of the media decreases, the amount of the media and the solvent to be used be controlled to give an optimum mixing ratio during wet grinding.

In the process for the production of the hydroxygallium phthalocyanine pigment of the invention, the volume average particle diameter, BET specific surface area and maximum primary particle diameter of the hydroxygallium phthalocyanine pigment of the invention thus obtained can be controlled by properly adjusting the conditions of wet grinding.

The wet grinding temperature is preferably from 0° C. to 100° C., more preferably from 5° C. to 80° C., particularly from 10° C. to 50° C. When the wet grinding temperature is too low, a tendency is given that the crystalline phase transformation rate is reduced. On the contrary, when the wet grind temperature is too high, the hydroxygallium phthalocyanine pigment is dissolved in the solvent more highly to facilitate the crystal growth, giving a tendency toward difficult atomization.

Examples of the solvent to be used in wet grinding include amides such as N,N-dimethylformamide, N,N-dimethylacetamie and N-methylpyrrolidone, esters such as ethyl acetate, n-butyl acetate and iso-amyl acetate, ketones such as acetone, methyl ethyl ketone and methyl iso-butylketone, and dimethyl sulfoxide. The amount of the solvent to be used is normally from 1 to 200 parts by weight, preferably from 1 to 100 parts by weight based on 1 part by weight of the hydroxygallium phthalocyanine pigment.

As the device for use in wet grinding there may be used a device using dispersion media such as oscillation mill, automatic mortar, sandmill, dinomill, coball mill, attritor, planetary ball mill and ball mill.

In the process for the production of the hydroxygallium phthalocyanine pigment of the invention, the crystal transformation rate is greatly affected by the scale of the wet grinding step, the agitation rate, the material of the media, etc. However, the wet grinding time is preferably determined while the crystal transformation state is being monitored by the measurements of the absorption wavelength of the solution to be wet-ground in such a manner that the hydroxygallium phthalocyanine pigment after subjected to wet-ground has a maximum peak wavelength within a range of from 810 nm to 839 nm in optical absorption spectrum in a wavelength range of from 600 nm to 900 nm and the process is preferably continued until the crystal transformation to the aforementioned desired hydroxygallium phthalocyanine pigment occur. Specific examples of the method of monitoring the crystal transformation state by the measurements of absorption wavelength of the solution to be wet-ground include a method which comprises sampling a small amount of the pigment solution from the wet grinding device during crystal transformation, diluting the sample with a solvent such as acetone and ethyl acetate, and then measuring the solution by a liquid cell method using a spectrophotometer.

The wet grinding time thus determined is normally from 5 to 500 hours, preferably from 7 to 300 hours. When the wet grinding time is less than 5 hours, crystal transformation cannot be completed, giving a tendency that deterioration in electrbphotographic properties, particularly undersensitivity easily occur. On the contrary, when the wet grind time is more than 500 hours, a tendency is given that sensitivity and productivity drop due to the effect of grinding stress or intrusion of powder produced by abrasion of media can easily occur. By thus determining the wet grinding time, wet grinding can be completed while keeping the hydroxygallium phthalocyanine pigment particles uniformly atomized. Further, in the case where a plurality of lots are repeatedly wet-ground, scattering of quality in the lots can be suppressed.

In the process for the production of the hydroxygallium phthalocyanine pigment of the invention, the hydroxygallium phthalocyanine pigment is then preferably subjected to cleaning with solvent and/or heat drying after the wet-grinding treatment. When thus subjected to cleaning with solvent and/or heat drying, the hydroxygallium phthalocyanine pigment can be controlled for impurity concentration, making it assured that a hydroxygallium phthalocyanine pigment having a thermal weight loss of from 2.0% to 4.0% when heated from 25° C. to 400° C. can be effectively obtained.

Examples of the solvent to be used when the impurity concentration is controlled by cleaning include water, organic solvents such as ethanol, methanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofurane, methylene chloride, chloroform, benzene, toluene, xylene, chlorobenzene, dimethyl formaldehyde, dimethyl acetamide, N,N-dimethyl formamide and dimethyl sulfoxide, mixture thereof, and supercritical fluids such as carbon dioxide and nitrogen. As the cleaning method there may be used any known method without restriction. From the standpoint of cleaning efficiency, however, a cleaning method using a ceramic filter, ultrasonic cleaner, Soxhlet extractor, micro-mixer having a flow path diameter of from 10 μm to 1,000 μm or the like can be used to advantage.

In the case where the impurity concentration of the hydroxygallium phthalocyanine pigment is controlled by heat drying, the heat drying temperature is preferably from 50° C. to 200° C., more preferably from 100° C. to 180° C. When the heating temperature is less than 50° C., a tendency is given that impurities affecting the properties of the hydroxygallium phthalocyanine pigment can be difficultly removed completely. On the contrary, when the heating temperature is more than 200° C., a tendency is given that the sensitivity of the hydroxygallium phthalocyanine pigment can be remarkably deteriorated. Further, the heat drying time is preferably adjusted properly depending on the weight of the hydroxygallium phthalocyanine pigment to be treated.

In order to efficiently remove impurities from the hydroxygallium phthalocyanine pigment by heat drying, heat drying of the hydroxygallium phthalocyanine pigment is preferably effected under reduced pressure. When heat drying is effected under reduced pressure, the heat drying temperature can be predetermined lower than at ordinary pressure to advantage. The heat drying temperature is preferably from 50° C. to 200° C., though depending on the degree of vacuum.

Heat drying is preferably effected in the presence of an inert gas. Examples of the inert gas employable herein include helium, neon and argon, which belong to the group 0 in the periodic table, and nitrogen. These inert gases may be used singly or in combination of two or more thereof. When heat drying is effected in the presence of such an inert gas, the oxidation of hydroxygallium phthalocyanine pigment by oxygen in the air can be prevented to allow heat drying at high temperature to advantage. Further, heat drying is preferably effected with light blocked. In this manner, the optical fatigue of the hydroxygallium phthalocyanine pigment during heat drying can be prevented.

(Electrophotographic Photoreceptor)

FIG. 1A is a typical sectional view illustrating a first embodiment of implementation of the electrophotographic photoreceptor of the invention. The electrophotographic photoreceptor 100 shown in FIG. 1A comprises a laminated photosensitive layer 6 having two functional divisions, i.e., a layer comprising a charge-generating material (charge-generating layer 1) and a layer comprising a charge-transporting material (charge-transporting layer 2). The electrophotographic photoreceptor 100 comprises the charge-generating layer 1 and the charge-transporting layer 2 laminated sequentially on an conductive support 3. The hydroxygallium phthalocyanine pigment of the invention is incorporated in the charge-generating layer 1 as a charge-generating material.

The various constituents of the electrophotographic photoreceptor 100 will be further described hereinafter.

Examples of the conductive support 3 employable herein include metallic supports such as aluminum, copper, iron, zinc and nickel, substrates such as polymer sheet, paper, plastic or glass electrically-conducted by vacuum metallization of metal such as aluminum, copper, gold, silver, platinum, palladium, titanium, nickel-chromium, stainless steel and copper-indium, the aforementioned substrates electrically-conducted by vacuum metallization by electrically-conductive metal compound such as indium oxide and tin oxide, the aforementioned substrates electrically-conducted by lamination with metal foil, and the aforementioned substrates electrically-conducted by coating with a dispersion of carbon black, indium oxide, tin oxide-antimony oxide powder, metal powder, copper iodide or the like in a binder resin. The conductive support 3 may be in any of drum, sheet and plate.

A metal pipe substrate, if used as the conductive support 3, maybe used untreated on the surface thereof but is preferably subjected to surface roughening by surface treatment such as mirror-surface cutting, etching, anodization, rough cutting, centerless cutting, sandblasting, wet honing and coloring. By thus roughening the surface of the substrate, wood grain-like density pattern in the electrophotographic photoreceptor by interference light which can occur when a coherent light source such as laser beam is used can be prevented.

The charge-generating layer 1 comprises the hydroxygallium phthalocyanine pigment of the invention as a charge-generating material and a binder resin.

Examples of the binder resin employable herein include insulating resins such as polycarbonate, polyacrylate, polystyrene, polysulfone, polyester, polyimide, polyamide, polyester carbonate, polyvinyl butyral, ester methacrylate polymer, vinyl acetate homopolymers, vinyl acetate copolymer, cellulose ester, cellulose ether, polybutadiene, polyurethane, phenoxy resin, epoxy resin, silicone resin, fluororesin, polyvinyl acetal resin, acrylic resin, polyacrylamide resin, polyvinyl pyridine resin, polyvinyl pyrrolidone resin and partially crosslinked hardening product thereof, and photoconductive resins such as poly-N-vinylcarbazole, polyvinyl anthracene, polyvinylpyrene and polysilane. These binder resins may be used singly or in combination of two or more thereof.

The mixing ratio (by weight) of the hydroxygallium phthalocyanine pigment of the invention to the binder resin in the charge-generating layer 1 is preferably 10:1 to 1:10, more preferably from 8:2 to 2:8. When the amount of the hydroxygallium phthalocyanine pigment of the invention exceeds 10 times that of the binder resin, a tendency is given that the pigment can be insufficiently dispersed in the dispersion used in the step of producing the electrophotographic photoreceptor. On the contrary, when the amount of the hydroxygallium phthalocyanine pigment of the invention falls below 1/10 of that of the binder resin, a tendency is given that the resulting electrophotographic photoreceptor has an insufficient sensitivity.

Further, the charge-generating layer 1 may comprise charge-generating materials other than the hydroxygallium phthalocyanine pigment of the invention incorporated therein. As the other charge-generating materials to be incorporated in the charge-generating layer 1, there may be used azo pigments, perylene pigments, condensed aromatic pigments, etc. However, metal or metal-free phthalocyanines are preferably used. In particular, hydroxygallium phthalocyanine pigments other than the hydroxygallium phthalocyanine pigment of the invention, chlorogallium phthalocyanine pigments, dichlorotin phthalocyanine pigments or oxytitanium phthalocyanine pigments are preferably used. The amount of the other charge-generating materials to be used in the charge-generating layer 1 is preferably 50% by weight or less based on the total weight of the materials to be incorporated in the charge-generating layer 1.

Moreover, various additives may be incorporated in the charge-generating layer 1 to enhance the electrical properties, image quality, etc. Examples of these additives include electron-transporting materials (e.g., chloranyl, bromoanyl, quinone-based compounds such as anthraquinone, tetracyanoquinodimethane-based compounds, fluorenone compounds such as 2,4,7-trinitrofluorenone and 2,4,5,7-tetranitro-9-fluorenone, oxadiazole-based compounds such as 2-(4-biphenyl)-5-(4-t-butylphenyl)-1,3,4-oxadiazole, 2,5-bis(4-naphthyl)-1,3,4-oxadiazole and 2,5-bis(4-diethylaminophenyl)-1,3,4-oxadiazole, xanthene-based compounds, thiophene compounds, diphenoquinone compounds such as 3,3',5,5'-tetra-t-butyldiphenoxy, polycondensed electron-transporting pigments, azo-based electron-transporting pigments, zirconium chelate compounds, titanium chelate compounds, aluminum chelate compounds, titanium alkoxide compounds, organic titanium compounds, and silane coupling agents.

As the silane coupling agents there may be used the same silane coupling agents as described above.

Examples of the zirconium chelate compounds employable herein include zirconium butoxide, zirconium ethyl acetacetate, zirconium triethanolamine, acetyl actonate zirconiumbutoxide, zirconium butoxide ethyl acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium buroxide methacrylate, zirconium butoxide stearate, and zirconium butoxide isostearate.

Examples of the titanium chelate compounds employable herein include tetraisopropyl titanate, tetranormal butyl titanate, butyl titanate dimer, tetra(2-ethylhexyl)titanate, titanium acetylactonate, poly(titanium acetylacetonate), titanium octylene glycolate, titanium lactate ammonium salt, titanium lactate, titanium lactate ethyl ester, titanium triethanol aminate, and polyhydroxys titanium stearate.

Examples of the aluminum chelate compounds employable herein include aluminum isopropylate, monobutoxy aluminum diisopropylate, aluminum butyrate, diethyl acetoacetate aluminum diisopropylate, and aluminum tris (ethylacetoacetate).

These compounds may be used singly. Alternatively, two or more kinds of these compounds may be used in admixture or in the form of polycondensate thereof.

In the case where other layers such as charge-transporting layer 2 are further formed on the charge-generating layer 1, the combination of the binder resin in the charge-generating layer 1 and the coating solution to be spread over the charge-generating layer 1 is properly selected to prevent the charge-generating layer 1 from being dissolved in or swelling with the solvent used in the coating solution. The refractive index of the binder resin used in the charge-generating layer 1 and the binder resin used in the charge-transporting layer 2 described later are preferably close to each other. In some detail, the difference in refractive index between the two binder resins is preferably 1 or less. The use of binder resins having similar refractive indexes in combination give a tendency that the reflection of light by the interface of the charge-generating layer 1 with the charge-transporting layer 2 is inhibited to enhance the effect of preventing the occurrence of interference band.

Further, the charge-generating layer 1 preferably has an absorption peak within a wavelength range of from 810 nm to 839 nm. Moreover, the charge-generating layer 1 preferably has an absorption peak wavelength within a range of from 600 nm to 700 nm in optical absorption spectrum wherein the maximum peak within a range of from 600 nm to 700 nm is greater than that within a range of from 810 nm to 850 nm. When the charge-generating layer 1 constituting the electrophotographic photoreceptor 100 satisfies the aforementioned requirements, the effect of the invention can be exerted more sufficiently.

The charge-generating layer 1 can be obtained by adding the hydroxygallium phthalocyanine pigment of the invention and a binder resin to a predetermined solvent, mixing and dispersing these components using a sandmill, colloid mill, dinomill, jet mill, coball mill, roll mill, ultrasonic dispersing machine, Gaulin homogenizer, microfluidizer, altimizer, milder or the like to obtain a coating solution, spreading the coating solution over a substrate by a blade coating method, meyer bar coating method, spray coating method, dip coating method, bead coating method, air knife coating method, curtain coating method or the like, and then drying the coat. Specific examples of the solvent to be used in the coating solution of the charge-generating layer 1 include methanol, ethanol, n-butanol, benzyl alcohol, acetone, methyl ethyl ketone, cyclohexanone, methyl acetate, n-butyl acetate, dioxane, tetrahydrofurane, methylene chloride, chloroform, toluene, xylene, chlorobenzene, dimethyl formamide, dimethyl acetamide, and water. These solvents maybe used singly or in admixture of two or more thereof. The thickness of the charge-generating layer 1 thus obtained is preferably from 0.05 μm to 5 μm, more preferably from 0.1 μm to 1 μm to obtain good electrical properties and image quality. When the thickness of the charge-generating layer 1 is less than 0.05 μm, a tendency is given that the sensitivity of the photosensitive layer is deteriorated. On the contrary, when the thickness of the charge-generating layer 1 is more than 5 μm, a tendency is given that troubles such as malchargeability can easily occur.

The charge-generating layer 1 is preferably formed of a photosensitive layer-forming coating solution produced by the process for the production of the photosensitive layer-forming coating solution of the invention. A preferred embodiment of implementation of the process for the production of the photosensitive layer-forming coating solution of the invention will be described hereinafter. The following description contains the production of a charge-generating layer-forming coating solution as a photosensitive layer-forming coating solution.

The process for the production of the photosensitive layer-forming coating solution of the invention (charge-generating layer-forming coating solution) of the invention comprises a first dispersion step of preparing a dispersion device filled with dispersion media in an amount of from 20 to 50% by volume based on the volume of the dispersion chamber and then introducing a mixture of a pigment, a binder resin and an organic solvent into the dispersion chamber so as to be subjected to dispersion to obtain a dispersion.

As the pigment constituting the aforementioned mixture, there may be used any pigment which has been heretofore used as a charge-generating material without special restriction. As such a pigment there may be used a gallium phthalocyanine pigment, azo pigment, perylene pigment, condensed ring aromatic pigment or the like. Preferred, among these pigments, is gallium phthalocyanine pigment, more preferred is a hydroxygallium phthalocyanine pigment represented by the following general formula (3).

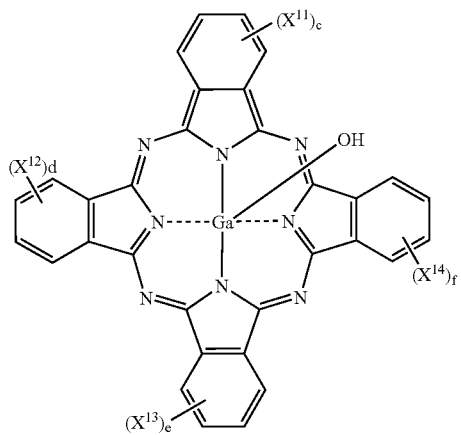

(3)

In the general formula (3), $X^{11}$, $X^{12}$, $X^{13}$ and $X^{14}$ each independently represent a chlorine atom or bromine atom; and c, d, e and f each independently represent an integer of from 0 to 4.

Among these hydroxygallium phthalocyanine pigments, the hydroxygallium phthalocyanine pigment of the invention described previously is particularly preferred as a charge-generating material in the process for the production of the charge-generating layer-forming coating solution of the invention.

The volume average particle diameter of the hydroxygallium phthalocyanine pigment to be used in the process for the production of the charge-generating layer-forming coating solution of the invention is preferably 0.10 μm or less, more preferably 0.08 μm or less. The BET process specific surface area of the hydroxygallium phthalocyanine pigment is preferably 45 m$^2$/g or more, more preferably 50 m$^2$/g or more, particularly preferably 55 m$^2$/g or more. When the volume average particle diameter of the hydroxygallium phthalocyanine pigment is more than 0.10 μm or the specific surface area of the hydroxygallium phthalocyanine pigment is less than 45 m$^2$/g, it is thought that the particulate pigment is coarse or a rigid aggregate of pigment particles is formed, giving a tendency that deterioration of electrical properties or image quality defects such as fogging, black spot and ghost can easily occur.

Further, the hydroxygallium phthalocyanine pigment to be used in the process for the production of the charge-generating layer-forming coating solution of the invention is preferably free of coarse particles having a great particle diameter. In some detail, the maximum primary particle diameter of the hydroxygallium phthalocyanine pigment of the invention is preferably 0.3 μm or less, more preferably 0.2 μm or less. When the maximum primary particle diameter of the hydroxygallium phthalocyanine pigment of the invention is more than 0.3 μm, it is thought that the particulate pigment is coarse or a rigid aggregate of pigment particles is formed, giving a tendency that deterioration of electrical properties or image quality defects such as fogging, black spot and ghost can easily occur.

Moreover, as the binder resin constituting the aforementioned mixture there may be used any known binder resin so far as a good dispersibility and desired electrophotographic photoreceptor properties can be obtained. For example, the binder resins exemplified above with reference to the charge-generating layer 1 can be used.

In the aforementioned mixture, the mixing ratio (by weight) of the pigment and the binder resin is preferably from 10:1 to 1:10, more preferably from 8:2 to 2:8. When the amount of the pigment to be used exceeds 10 times that of the binder resin, a tendency is given that the pigment can be insufficiently dispersed in the charge-generating layer-forming coating solution. On the contrary, when the amount of the pigment to be used falls below 1/10 of that of the binder resin, a tendency is given that the sensitivity of the electrophotographic photoreceptor is insufficient.

As the organic solvent constituting the aforementioned mixture, there may be used the solvent exemplified above with reference to the charge-generating layer 1.

The mixture of pigment, binder resin and organic solvent is then subjected to dispersion using a dispersion device filled with dispersion media having the above defined packing. In this manner, the application of excessive dispersion shear to the pigment during dispersion can be sufficiently inhibited, making it possible to sufficiently reduce the particle diameter of the pigment while sufficiently inhibiting the occurrence of crystal transformation. Accordingly, a charge-generating layer-forming coating solution capable of forming an electrophotographic photoreceptor that can inhibit the occurrence of image quality defects and has good electrical properties can be obtained.

The material of the aforementioned media is not specifically limited but those hardly causing defects in image quality when mixed in the hydroxygallium phthalocyanine pigment dispersion are preferred. The media is preferably made of glass, zirconia, aluminum, agate or the like.

The material of the aforementioned dispersion chamber is not specifically limited but preferred are those hardly mixed in the hydroxygallium phthalocyanine pigment dispersion solution or, those even when mixed in the hydroxygallium phthalocyanine pigment dispersion hardly cause defects in image quality. For example, stainless steel, glass, zirconia, alumina, agate, various ceramics, various hard resins, etc. are preferably used.

The process for the production of the charge-generating layer-forming coating solution may also comprise a second dispersion step of preparing a dispersion device having a circulation path comprising a dispersion chamber filled with dispersion media and then allowing a mixture of a pigment, a binder resin and an organic solvent to be circulated through the circulation path to satisfy a relationship represented by following expression (A) so that the mixture is subjected to a dispersion treatment to obtain a dispersion solution:

$$0.3 \leq (Vc/Vo) \leq 1.6 \quad \text{(A)}$$

wherein Vo represents the volume (ml) of the dispersion chamber; and Vc represents the circulating flow rate (ml/min) of the mixture.

When the dispersion step is effected in such a manner that the requirement represented by the aforementioned relationship (A) is satisfied, the particle diameter of the pigment can be sufficiently reduced while sufficiently preventing the application of excessive dispersion shear to the pigment and causing the change of crystal form during dispersion. In this manner, the occurrence of image quality defects can be sufficiently inhibited, making it possible to obtain a photosensitive layer-forming coating solution capable of forming an electrophotographic photoreceptor having good electrical properties.

In the aforementioned second dispersion step, the packing fraction of the aforementioned dispersion media based on the volume of the aforementioned dispersion chamber is preferably from 20 to 50% by volume. In this arrangement, the particle diameter of the pigment can be sufficiently reduced while sufficiently inhibiting the occurrence of crystal transformation due to the application of excessive dispersion shear to the pigment during dispersion. Accordingly, the occurrence of image quality defects can be sufficiently inhibited and a charge-generating layer-forming coating solution capable of forming an electrophotographic photoreceptor having good electrical properties can be obtained.

The process for the production of the charge-generating layer-forming coating solution of the invention preferably comprises a centrifugal separation step of centrifugally separating the dispersion obtained at the aforementioned first or second dispersion step.

When the dispersion step is followed by centrifugal separation, abrasion pieces of the dispersion chamber and the dispersion media, even if mixed in the dispersion, or coarse particles, even if left undispersed, can be efficiently removed, making it possible to obtain a photosensitive layer-forming coating solution capable of more certainly forming an electrophotographic photoreceptor which can inhibit the occurrence of image quality defects such as fogging and ghost more sufficiently.

When the aforementioned dispersion step and optionally the centrifugal separation step are completed, a charge-generating layer-forming coating solution can be produced. The coating solution thus obtained can be spread over the conductive support 3 by the coating method exemplified above with reference to the charge-generating layer 1 and then dried to form the charge-generating layer 1.

The charge-transporting layer 2 comprises a charge-transporting material and a binder resin. As the charge-transporting material to be incorporated in the charge-transporting layer 2, there may be used any material capable of transporting charge without limitation. Examples of the charge-transporting material employable herein include hole-transporting materials such as oxanediazole derivative (e.g., 2,5-bis(p-diethylaminophenyl)-1,3,4-oxadiazle), pyrazoline derivative (e.g., 1,3,5-triphenyl-pyrazoline, 1-[pyridyl-(2)]-3-(p-diethylaminostyryl)-5-(p-diethyl aminostyryl)pyrazoline], aromatic tertiary amino compound (e.g., triphenylamine, tri(P-methyl)phenyl amine, N,N'-bis(3,4-dimethylphenyl)biphenyl-4-amine, dibenzylaniline, 9,9-dimethyl-N,N'-di(p-tollyl) fluorenone-2-amine), aromatic tertiarydiamino compound (e.g., N,N'-diphenyl-N,N'-bis(3-methylphenyl)-[1,1-biphenyl]-4,4'-diamine), 1,2,4-triazine derivative (e.g., 3-(4$^1$-dimethylaminophenyl)-5,6-di-(4'-methoxy phenyl)-1,2,4-triazine), hydrazone derivative (e.g., 4-diethylaminobenzaldehyde-1,1-diphenylhydrazone, 4-diphenylaminobenzaldehyde-1,1-diphenylhydrazone, [p-(diethylamino)phenyl](1-naphthyl)phenylhydrazone), quinazoline derivative (e.g., 2-phenyl-4-styryl-quinazoline), benzofurane derivative (e.g., 6-hydroxy-2,3-di(p-methoxyphenyl)-benzofurane), α-stilbene derivative (e.g., p-(2,2-diphenylbinyl)-N,N'-diphenylaniline), enamine derivative, carbazole derivative (e.g., N-ethylcarbazole), poly-N-vinyl carbazole and derivative thereof, and electron-transporting materials such as quinone-based compound (e.g., chloranyl, bromoanyl, anthraquinone), tetracyanoquinodimethane-based compound, fluorenone compound (e.g., 2,4,7-trinitrofluorenone, 2,4,5,7-tetranitro-9-fluorenone), oxadiazole-based compound (e.g., 2-(4-biphenyl)-5-(4-t-butylphenyl)-1,3,4-oxadiazole, 2,5-bis(4-naphthyl)-1,3,4-oxadiazole, 2,5-bis(4-diethylaminophenyl)-1,3,4-oxadizole), xanthene-based compound, thiophene compound and diphenoquinone compound (e.g., 3,3',5,5'-tetra-t-butyl diphenoquinone). As the charge-transporting material, there may be also used a polymer having the basic structure of the above exemplified compound in its main or side chain. These charge-transporting materials may be used singly or in combination of two or more thereof.

As the binder resin to be incorporated in the charge-transporting layer 2, there maybe used any known binder resin without limitation. However, a resin capable of forming an electrically insulating film is preferably used. Examples of such a resin include polycarbonate resins, polyarylate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicon-alkyd resins, phenol-formaldehyde resins, styrene-alkyd resins, poly-N-carbazole, polyvinyl butyral, polyvinyl formal, polysulfones, casein, gelatin, polyvinyl alcohols, ethyl cellulose, phenolic resins, polyamides, carboxy-methyl cellulose, vinylidene chloride-based polymer waxes, and polyurethanes. These binder resins may be used singly or in combination of two or more thereof. In particular, polycarbonate resins, polyarylate resins, polyester resins, methacrylic resins, and acrylic resins are preferably used because they are excellent in compatibility with charge-transporting material, solubility in solvent and strength.

Particularly preferred among these binder resins are polycarbonate resins having the structural unit represented by the aforementioned aforementioned general formula (1) and polyacrylate resins having the structural unit represented by the general formula (2) because they are excellent in compatibility with charge-transporting material, solubility in solvent and strength.

The mixing ratio (by weight) of the binder resin to the charge-transporting material may be arbitrarily predetermined taking into account the deterioration of electrical properties and film strength.

The thickness of the charge-transporting layer 2 is preferably from 5 μm to 50 μm, more preferably from 10 μm to 45 μm, even more preferably from 10 μm to 40 μm, particularly from 10 μm to 35 μm.

The charge-transporting layer 2 may further comprise a solid lubricant or metal oxide dispersed therein for the purpose of eliminating abrasion. Examples of the solid lubricant employable herein include particulate fluorine-containing resins (ethylene tetrafluoride, ethylene trifluorochloride, ethylene tetrafluoride-propylene hexafluoride resins, vinyl fluoride resins, vinylidene fluoride resins, ethylene difluorodichloride, copolymer thereof), and particulate silicon-containing organic resins. Examples of the metal oxide employable herein include silica, alumina, titanium oxide, tin oxide.

When a solid lubricant is dispersed in the charge-transporting layer 2, the friction coefficient of the surface of the charge-transporting layer 2 is reduced, making it possible to inhibit friction. Further, when a metal oxide is dispersed in the charge-transporting layer 2, the mechanical hardness of the charge-transporting layer 2 is raised, making it possible to inhibit friction. The particulate fluororesin can be difficultly dispersed, but the dispersibility thereof can be enhanced by the use of a fluorine-containing polymer-based dispersion aid.

In order to disperse the aforementioned solid lubricant or metal oxide in the charge-transporting layer 2, a roll mill, ball mill, oscillating ball mill, attritor, sandmill, colloid mill, paint shaker, homogenizer, high pressure treatment type homogenizer or the like may be used. During the dispersion step, the particle diameter of the dispersed particles is predetermined to be 1.0 μm or less, preferably 0.5 μm or less to advantage.

The charge-transporting layer 2 may further comprise a slight amount of a silicone oil incorporated therein as a leveling agent for enhancing the smoothness of the coat layer.

As the solvent to be used in the coating solution for forming the charge-transporting layer 2 there may be used ordinary organic solvent such as dioxane, tetrahydrofurane, methylene chloride, chloroform, chlorobenzene and toluene, singly or in combination of two or more thereof. In order to spread the coating solution of the charge-transporting layer 2, any ordinary method such as blade coating method, wire bar coating method, spray coating method, dip coating method, bead coating method, air knife coating method and curtain coating method may be used.

Further, the photosensitive layer 6 (charge-generating layer 1, charge-transporting layer 2, etc.) may comprise additives such as an oxidation inhibitor and a light-stabilizer incorporated therein for the purpose of inhibiting the deterioration of the electrophotographic photoreceptor by ozone gas or oxidizing gas generated in the electrophotographic device or light or heat.

Examples of the oxidation inhibitor employable herein include hindered phenol, hindered amine, paraphenylene diamine, aryl alkane, hydroquinone, spirochromane, spiroindanone, derivative thereof, organic sulfur compounds, and organic phosphor compounds.

Examples of the hindered phenol-based oxidation inhibitor employable herein include 2,6-di-t-butyl-4-methylphenol, styrenated phenol, n-octadecyl-3-(3', 5'-di-t-butyl-4'-hydroxyphenyl)-propionate, 2,2'-methylene-bis-(4-methyl-6-t-butylphenol), 2-t-butyl-6-(3'-t-butyl-5'-methyl-2'-hydroxybenzyl)-4-methylphenyl acrylate, 4,4'-butylidene-bis-(3-methyl-6-t-butylphenol), 4,4'-thio-bis-(3-methyl-6-t-butyl phenol), 1,3,5-tris(4-t-butyl-3-hydroxy-2,6-dimethyl benzyl)isocyanurate, tetrakis-[methylene-3-(3',5'-di-t-butyl-4'-hydroxyphenyl)propionate]methane, and 3,9-bis[2-[3-(3-t-butyl-4-hydroxy-5-methylphenyl) propionyloxy]-1,1-dimethylethyl]-2,4,8,10-tetraoxabispio[5,5]undecane.

Examples of the hindered amine-based oxidation inhibitor employable herein include bis(2,2,6,6-tetramethyl-4-piperidyl)sebacate, bis(1,2,2,6,6-pentamethyl-4-piperidyl)sebacate, 1-[2-[3-(3,5-di-t-butyl-4-hydroxyphenyl)propionyloxy]ethyl]-4-[3-(3,5-di-t-butyl-4-hydroxyphenyl) propionyloxy]-2,2,6,6-tetramethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpiperidine, dimethyl succinate-1-(2-hydroxyethyl)-4-hydroxy-2,2,6,6-tetramethylpiperidine polycondensate, poly[{6-(1,1,3,3-tetramethylbutyl)imino-1,3,5-triazine-2,4-dimyl}{(2,2,6,6-tetramethyl-4-piperidyl)imino}hexamethylene{(2,3,6,6-tetramethyl-4-piperidyl)imino}], 2-(3,5-di-t-butyl-4-hydroxybenzyl)-2-n-butylmalonic acid-bis(1,2,2,6,6-pentamethyl-4-piperidyl), and N,N'-bis(3-aminopropyl)ethylenediamine-2, 4-bis[N-butyl-N-(1,2,2,6,6-pentamethyl-4-piperidyl) amino]-6-chloro-1,3,5-triazine condensate.

Examples of the organic sulfur-based oxidation inhibitor employable herein include dilauryl-3,3'-thiodipropionate, dimyristyl-3,3'-thiodipropionate, distearyl-3,3'-thiodipropionate, pentaerythritol-tetrakis-(β-laurylthiopropionate), ditridecyl-3,3'-thiodipropionate, and 2-mercaptobenzimidazole.

Examples of the organic phosphor-based oxidation inhibitor employable herein include trisnonylphenyl phosphate, triphenyl phosphite, and tris(2,4-di-t-butylphenyl)-phosphite.

These organic sulfur-based oxidation inhibitors and organic phosphor-based oxidation inhibitors are called secondary oxidation inhibitors and thus can be used in combination with a phenolic or amine-based primary oxidation inhibitor to exert a synergistic effect.

Examples of the light-stabilizer employable herein include benzophenone-based, benzotriazole-based, dithiocarbamate-based and tetramethylpiperidine-based derivatives.

Examples of the benzophenone-based light-stabilizer employable herein include 2-hydroxy-4-methoxybenzophenone, 2-hydroxy-4-octoxybenzophenone, and 2,2'-dihydroxy-4-methoxybenzophenone.

Examples of the benzotriazole-based light-stabilizer employable herein include 2-(2'-hydroxy-5'-methylphenyl)-benzotriazole, 2-[2'-hydroxy-3'-(3",4",5',6"-tetrahydrophthalimide-methyl)-5'-methylphenyl]benzotriazole, 2-(2'-hydroxy-3'-t-butyl-5'-methylphenyl)-5-chlorobenzotriazole, 2-(2'-hydroxy-3'-t-butyl-5'-methylphenyl)-5-chlorobenzo triazole, 2-(2'-hydroxy-3',5',-di-t-butylphenyl)benzotriazole, 2-(2'-hydroxy-5'-t-octylphenyl)benzotriazole, and 2-(2'-hydroxy-3',5',-di-t-amyl phenyl)benzotriazole.

Besides these light-stabilizers, 2,4-di-t-butyl phenyl-3',5'-di-t-butyl-4'-hydroxybenzoate, nickel dibutyl-dithiocarbamate, etc. may be used.

For the purpose of enhancing sensitivity, lowering residual potential and reducing fatigue during repeated use, the photosensitive layer 6 (charge-generating layer 1, charge-transporting layer 2, etc.) may comprise at least one electron-accepting material incorporated therein. Examples of the electron-accepting material employable herein include succinic anhydride, maleic anhydride, dibrommaleic anhydride, phthalic anhydride, tetrabromphthalic anhydride, tetracynoethylene, tetracyanoquinodimethane, o-dinitrobenzene, m-dinitrobenzene, chloranylquinone, dinitro anthraquinone, trinitrofluorenone, picric acid, o-nitrobenzoic acid, p-nitrobenzoic acid, and phthalic acid. Particularly preferred among these electron-accepting materials are fluorenone-based materials, quinone-based materials, and benzene derivatives having electron-attracting substituents such as $Cl^-$, $CN^-$ and $NO_2^-$.

Figure 1B:
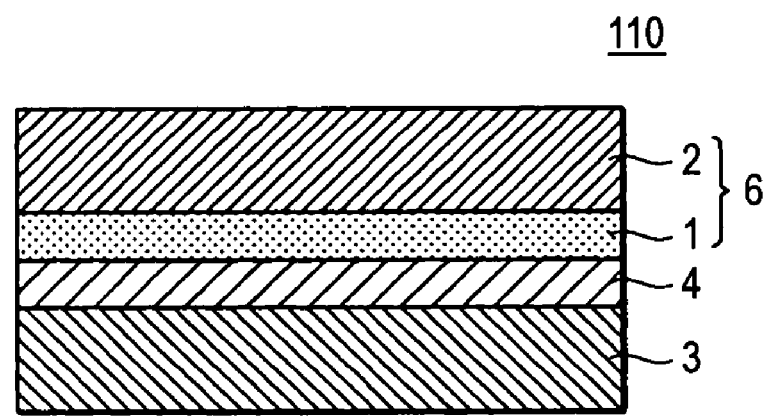

FIG. 1B is a typical sectional view illustrating a second embodiment of implementation of the electrophotographic photoreceptor of the invention. The electrophotographic photoreceptor 110 shown in FIG. 1B has the same configuration as the electrophotographic photoreceptor 100 shown in FIG. 1A except that a subbing layer 4 is provided interposed between the conductive support 3 and the photosensitive layer 6.

The subbing layer 4 is capable of preventing the injection of charge from the conductive support 3 to the photosensitive layer 6 during the charging of the photosensitive layer 6. The subbing layer 4 also acts as an adhesive layer for gluing the photosensitive layer 6 integrally to the conductive support 3. Further, the subbing layer 4 is capable of preventing the reflection of light by the conductive support 3.

The subbing layer 4 is made of a material selected arbitrarily from the group consisting of binder resin, organic or inorganic powder, electron-transporting material, etc. As the binder resin there may be used any known material such as acetal rein (e.g., polyvinyl butyral), polymer resin compound (e.g., polyvinyl alcohol, casein, polyamide resin, cellulose resin, gelatin, polyurethane resin, polyester resin, methacrylic resin, acrylic resin, polyvinyl chloride resin, polyvinyl acetate resin, vinyl chloride-vinyl acetate-maleic anhydride resin, silicone resin, silicone-alkyd resin, phenol-formaldehyde resin, melamine resin), zirconium chelate compound, titanium chelate compound, aluminum chelate compound, titanium alkoxide compound, organic titanium compound and silane coupling agent. These compounds may be used singly, in admixture of two or more thereof or in the form of polycondensate thereof. Preferred among these compounds are zirconium chelate compound and silane coupling agent because they are excellent in properties, e.g., low residual potential, little potential change due to environmental conditions, little potential change with repeated use.

As the silane coupling agent, zirconium chelate compound, titanium chelate compound and aluminum chelate compound there may be used those described above.

The subbing layer 4 may comprise various organic or inorganic compound particles incorporated therein for the purpose of enhancing electrical properties or light scattering properties. In particular, an inorganic pigment such as white pigment (e.g., titaniumoxide, zincoxide, tinoxide, zincoxide, zinc sulfide, leadwhite, lithopone) and extender pigment (e.g., alumina, calcium carbonate, barium sulfate), particulate teflon (trade name), particulate benzoguanamine resin, particulate styrene, etc. are useful. The particle diameter of the additive particulate material is from 0.01 μm to 2 μm. The particulate material is added as necessary. The amount of the particulate material to be added is preferably from 10 to 90% by weight, more preferably from 30 to 80% by weight based on the total weight of the solid content in the subbing layer 4.

Preferred among these particulate materials to be incorporated in the subbing layer 4 are particulate metal oxides such as titanium oxide, zinc oxide and tin oxide. When these particulate metal oxides are added, a tendency is given that the properties of the electrophotographic photoreceptor can be enhanced.

The average primary particle diameter of the particulate metal oxide is preferably 0.5 μm or less. Further, the subbing layer 4 is preferably provided with a proper resistance to obtain leak resistance. To this end, as the particulate metal oxide there is preferably used one having a powder resistivity of from about $10^2$ to $10^{11}$ Ω·cm. When the specific resistivity of the particulate metal oxide falls below $10^2$ Ω·cm, a tendency is given that a sufficient leak resistance cannot be obtained. On the contrary, when the specific resistivity of the particulate metal oxide exceeds $10^{11}$ Ω·cm, a tendency is given that the residual potential can be raised. Two or more of these particulate metal oxides may be used in admixture.

The particulate metal oxides may be subjected to surface treatment. In order to subject the particulate metal oxides to surface treatment, a hydrolyzable organic metal compound may be used. As the hydrolyzable organic metal compound there may be used any organic metal compound without limitation so far as desired electrophotographic photoreceptor properties can be obtained. Examples of the hydrolyzable organic metal compounds employable herein include known materials such as zirconium chelate compounds, titanium chelate compounds, aluminum chelate compounds, titanium alkoxide compounds, organic titanium compounds and silane coupling agents. As the silane coupling agents, zirconium chelate compounds, titanium chelate compounds and aluminum chelate compounds there may be used the same compounds as described above.

As the surface treatment of the particulate metal oxide there may be used any known surface treatment method. Dry or wet process may be employed. In the case where the dry process surface treatment is effected, the particulate metal oxide is sprayed with dried air or nitrogen gas with a hydrolyzable organic metal compound being added dropwise thereto directly or in the form of solution in an organic solvent or water while being stirred by a mixer having a great shearing force or the like so as to be uniformly treated. The addition or spraying is preferably effected at a temperature not higher than the boiling point of the solvent. When spraying is effected at a temperature not lower than the boiling point of the solvent, the solvent is evaporated before being uniformly stirred, causing the hydrolyzable organic metal compound to be locally aggregated and giving a tendency that uniform treatment can be difficultly effected. After the addition or spraying, the particulate metal oxide thus treated may be then subjected to baking at a temperature of 100° C. or higher. Baking can be effected within an arbitrary range of temperature for an arbitrary period of time so far as desired electrophotographic properties can be obtained. In the case of dry process, the particulate metal oxide may be heat-dried to remove absorbed water on the surface thereof before the surface treatment by the hydrolyzable organic metal compound. By thus removing the surface adsorbed water before treatment, the hydrolyzable organic metal compound can be uniformly adsorbed to the surface of the particulate metal oxide. The heat drying of the particulate metal oxide may be effected with stirring by a mixer having a great shearing force or the like.

In the case where wet process surface treatment is effected, the particulate metal oxide may be dispersed in a solvent using an agitator, ultrasonic device, sandmill, attritor, ball mill or the like. To the dispersion solution is then added a hydrolyzable organic metal compound solution. The mixture is then stirred or dispersed. The solvent is then removed from the solution to cause uniform treatment. The removal of the solvent is carried out, e.g., by distillation. When the removal of the solvent is carried out by filtration, a tendency is given that unreacted hydrolyzable organic metal compound can flow out, making it difficult to control the amount of the hydrolyzable organic metal compound required to obtain desired properties. After the removal of the solvent, the particulate metal oxide may be further baked at 100° C. or more. Baking can be effected within an arbitrary range of temperature for an arbitrary period of time so far as desired electrophotographic properties can be obtained. In the case of wet process, too, the particulate metal oxide may be free of absorbed water from the surface thereof before the surface treatment by the hydrolyzable organic metal compound. The removal of surface adsorbed water is carried out by a method which comprises heating the material in the solvent used for surface treatment with stirring, a method which comprises boiling the material together with the solvent or the like besides heat drying method as in the dry process. The amount of the hydrolyzable organic metal compound to be used based on the weight of the particulate metal oxide can be arbitrarily predetermined within a range where desired electrical properties can be obtained.

The subbing layer 4 can comprise the electron-transporting material or electron-transporting pigment described above incorporated therein to advantage from the standpoint of reduction of residual potential or environmental stability. Examples of the electron-transporting pigment to be incorporated in the subbing layer 4 include organic pigments such as perylene pigment, bisbenzimidazole perylene pigment, polycyclic quinone pigment, indigo pigment, quinacridone pigment, bisazo pigments having electron-attracting substituents such as cyano group, nitro group, nitroso group and halogen atom and phthalocyanine pigment, and inorganic pigments such as zinc oxide and titanium oxide. Preferred among these pigments are perylene pigment, bisbenzimidazole perylene pigment and polycyclic pigment because they have a high electron mobility. When the electron-transporting pigment is incorporated in a too much amount, a tendency is given that the strength of the subbing layer 4 is deteriorated, causing the occurrence of defects in coat layer. Therefore, the electron-transporting pigment is added in an amount of 95% by weight or less, preferably 90% by weight or less based on the total weight of the solid content in the subbing layer 4.

Further, the thickness of the subbing layer 4 is preferably from 0.01 μm to 30 μm, more preferably from 0.05 μm to 25 μm. In the case where the subbing layer 4 is free of particulate metal oxide, the thickness of the subbing layer 4 is even more preferably from 0.1 μm to 10 μm, particularly from 0.5 μm to 10 μm. On the other hand, in the case where the subbing layer 4 comprises a particulate metal oxide incorporated therein, the thickness of the subbing layer 4 is preferably 15 μm or more, more preferably from 15 μm to 50 μm. When the thickness of the subbing layer 4 satisfies the aforementioned requirements, a tendency is given that the occurrence of local dielectric breakdown (leak from the electrophotographic photoreceptor) in the electrophotographic photoreceptor 100 can be prevented more certainly. Another tendency is given that a stabilized image quality can be obtained over an extended period of time. Moreover, the subbing layer 4 preferably has a Vickers strength of 35 or more.

The subbing layer 4 may further comprise a particulate material other than the aforementioned particulate metal oxide incorporated therein. As the particulate material there may be used any particulate material such as particulate silicone, particulate teflon (trade name) and particulate crosslinked PMMA resin. The amount and particle diameter of the particulate resin to be incorporated in the subbing layer 4 may be arbitrarily predetermined so far as desired surface roughness and electrical properties can be obtained. In practice, however, the particle diameter of the particulate resin is preferably from 0.5 μm to 10 μm, more preferably from 1 μm to 6 μm. Two or more of particulate resins having different particle diameters may be used.

The subbing layer 4 may be polished to adjust the surface roughness thereof. Polishing is carried out by buffing, sandblasting, wet honing, cutting or the like.

In the case where a particulate material is added during the preparation of the coating solution of the subbing layer 4, the particulate material is subjected to dispersion in a solution having a resin component dissolved therein. The dispersion is carried out by the use of roll mill, ball mill, oscillating ball mill, attritor, sandmill, colloid mill, paint shaker or the like.

As the solvent for use in the preparation of the coating solution there may be used any solvent so far as it can dissolve a resin component therein and causes no gelation or aggregation when the electron-transporting pigment is mixed or dispersed therein. Specific examples of such a solvent include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofurane, methylene chloride, chloroform, chlorobenzene, and toluene. These solvents may be used singly or in admixture of two or more thereof.

The subbing layer 4 can be formed by spreading a coating solution for forming the subbing layer 4 over the conductive support 3, and then drying the coat layer. The spreading of the coating solution is carried out by any ordinary method such as blade coating method, wire bar coating method, spray coating method, dip coating method, bead coating method, air knife coating method and curtain coating method.

Figure 1C:
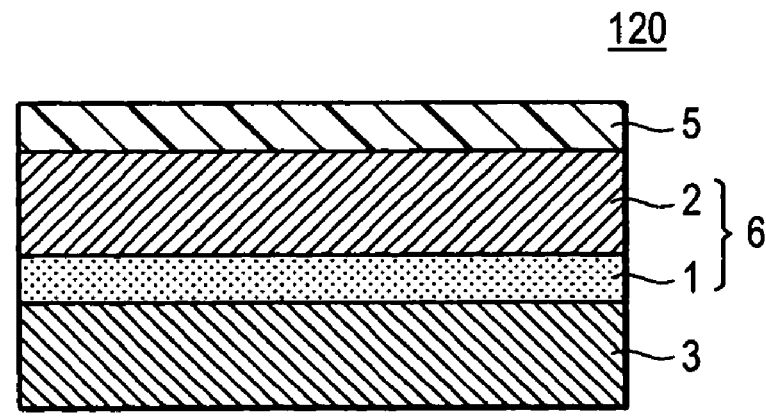

FIG. 1C is a typical sectional view illustrating a third embodiment of implementation of the electrophotographic photoreceptor of the invention. The electrophotographic photoreceptor 120 shown in FIG. 1C has the same configuration as the electrophotographic photoreceptor 100 shown in FIG. 1A except that a protective layer 5 is provided on the photosensitive layer 6.

The protective layer 5 is used to prevent the chemical change of the charge-transporting layer 2 during the charging of the electrophotographic photoreceptor 120 or enhance the mechanical strength of the photosensitive layer 6.

The protective layer 5 is formed by spreading a coating solution having an electrically-conductive material incorporated in a proper binder resin over the photosensitive layer 6. The electrically-conductive material is not specifically limited. Examples of the electrically-conductive material employable herein include metalocene compounds such as N,N'-dimethylphelocene, aromatic amine compounds such as N,N'-diphenyl-N,N'-bis(3-methylphenyl)-[1,1'-biphenyl]-4,4'-diamine, molybdenum oxide, tungsten oxide, antimonyoxide, tinoxide, titaniumoxide, indiumoxide, carrier of solid solution of tin oxide with antimony, carrier of solid solution of barium sulfate with antimony oxide, mixture of the aforementioned metal oxides, single particulate material of titanium oxide, tin oxide, zinc oxide or barium sulfate having the aforementioned metal oxides incorporated therein, and single particulate material of titanium oxide, tin oxide, zinc oxide or barium sulfate coated with the aforementioned metal oxide.

As the binder resin to be incorporated in the protective layer 5 there may be used any known resin such as polyamide resin, polyvinyl acetal resin, polyurethane resin, polyester resin, epoxy resin, polyketone resin, polycarbonate resin, polyvinyl ketone resin, polystyrene resin, polyacrylamide resin, polyimide resin and polyamideimide resin. These binder resins may be optionally crosslinked to each other before use.

The protective layer 5 is preferably a hardened layer containing a compound represented by the following general formula (4).

$$F\text{-}[D\text{-}SiR^{11}{}_{3-a}(OR^{12})_a]_b \qquad (4)$$

In the general formula (4), F represents an organic group derived from a photofunctional compound; D represents a divalent group; $R^{11}$ represents a hydrogen atom, alkyl group or substituted or unsubstituted aryl group; $R^{12}$ represents a hydrogen atom, alkyl group or trialkylsilyl group; the suffix a represents an integer of from 1 to 3; and the suffix b represents an integer of from 1 to 4.

The group —SiR$^{11}_{3-a}$(OR$^{12}$)$_a$ in the general formula (4) is a substituted silicon group having a hydrolyzable group and acts to form a three-dimensional Si—O—Si bond (inorganic glass-based network) when subjected to crosslinking reaction.

In the general formula (4), F is an organic group having photoelectrical properties, particularly photocarrier transporting properties. The structure of photofunctional compounds which have heretofore been known as charge-transporting materials can be used as it is. Specific examples of the organic group represented by F include hole-transporting compound skeletons such as triarylamine-based compound, bendizine-based compound, arylalkane-based compound, aryl-substituted ethylene-based compound, stilbene-based compound, anthracene-based compound and hydrazone-based compound, and electron-transporting compound skeletons such as quinone-based compound, fluorenone compound, xanthene-based compound, benzophenone-based compound, cyanovinyl-based compound and ethylene-based compound.

Preferred examples of the organic group represented by F include those represented by the following general formula (5). When F is a group represented by the following general formula (5), the resulting product exhibits particularly excellent photoelectrical properties and mechanical properties.

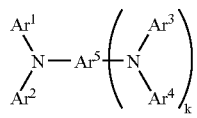

(5)

In the general formula (5), Ar$^1$ to Ar$^4$ each independently represent a substituted or unsubstituted aryl group; Ar$^5$ represents a substituted or unsubstituted aryl or arylene group; k represents an integer of 0 or 1; and among Ar$^1$ to Ar$^4$, those by number of b each represent a bond connected to the group represented by D-SiR$^{11}_{3-a}$(OR$^{12}$)$_a$.

Ar$^1$ to Ar$^4$ in the aforementioned general formula (5) each are preferably any of those represented by the following general formulae (5-1) to (5-7).

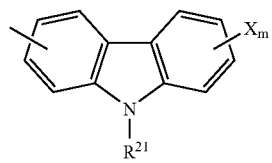

(5-1)

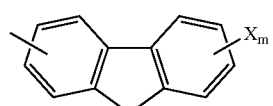

(5-2)

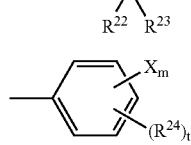

(5-3)

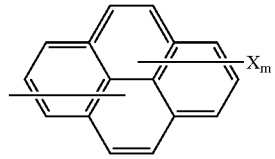

(5-4)

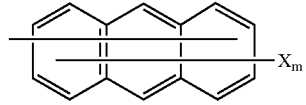

(5-5)

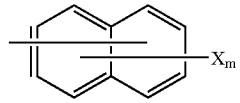

(5-6)

—Ar—Z$_s$—Ar—X$_m$ (5-7)

In the general formulae (5-1) to (5-7), R$^{21}$ represents an hydrogen atom, C$_1$-C$_4$ alkyl group, phenyl group substituted by C$_1$-C$_4$ alkyl or alkoxy group, unsubstituted phenyl group or C$_7$-C$_{10}$ aralkyl group; R$^{22}$ to R$^{23}$ each independently represent a hydrogen atom, C$_1$-C$_4$ alkyl group, C$_1$-C$_4$ alkoxy group, phenyl group substituted by C$_1$-C$_4$ alkoxy group, unsubstituted phenyl group, C$_7$-C$_{10}$ aralkyl group or halogen atom; Ar represents a substituted or unsubstituted arylene group; X represents Y—SiR$^{11}_{3-a}$(OR$^{12}$)$_a$; m and s each independently represent an integer of 0 or 1; and t represents an integer of from 1 to 3.

Specific preferred examples of Y include divalent hydrocarbon groups represented by —C$_p$H$_{2p}$—, —C$_p$H$_{2p-2}$— and —C$_p$H$_{2p-4}$— (in which p represents an integer of from 1 to 15), —COO—, —S—, —O—, —N=CH—, and divalent groups represented by the following general formulae (5-8) to (5-11).

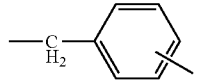

(5-8)

(5-9)

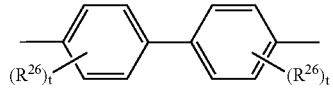

(5-10)

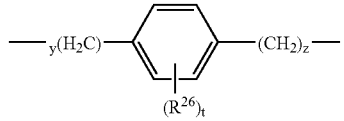

(5-11)

In the general formulae (5-8) to (5-11), R$^{25}$ and R$^{26}$ each independently represent a hydrogen atom, C$_1$-C$_4$ alkyl group, C$_1$-C$_4$ alkoxy group, phenyl group substituted by C$_1$—$_{C4}$ alkoxy group, unsubstituted phenyl group, C$_7$-C$_{10}$ aralkyl group or halogen atom; t represents an integer of from 1 to 3; and y and z each independently represent an integer of from 1 to 5.

Ar in the aforementioned general formula (5-7) is preferably one represented by the aforementioned general formula (5-9) or (5-10).

Z in the general formula (5-7) is preferably one represented by any one of the following general formulae (5-12) to (5-19).

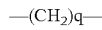 (5-12)

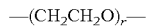 (5-13)

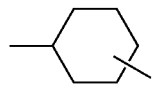 (5-14)

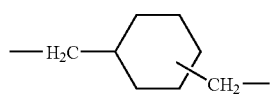 (5-15)

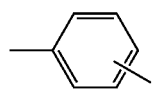 (5-16)

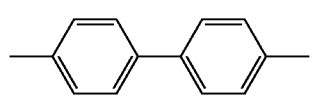 (5-17)

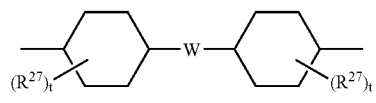 (5-18)

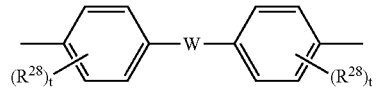 (5-19)

In the general formulae (5-12) to (5-19), $R^{27}$ and $R^{28}$ each independently represent a hydrogen atom, $C_1$-$C_4$ alkyl group, $C_1$-$C_4$ alkoxy group, phenyl group substituted by $C_1$-$C_4$ alkoxy group, unsubstituted phenyl group, $C_7$-$C_{10}$ aralkyl group or halogen atom; W represents a divalent group; q and r each independently represent an integer of from 1 to 10; and t represents an integer of from 1 to 3.

W in the aforementioned general formulae (5-18) to (5-19) is preferably any one of the divalent groups represented by the following general formulae (5-20) to (5-28).

—CH$_2$— (5-20)

—C(CH$_3$)$_2$— (5-21)

—O— (5-22)

—S— (5-23)

—C(CF$_3$)$_2$— (5-24)

—Si(CH$_3$)$_2$— (5-25)

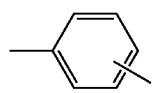 (5-26)

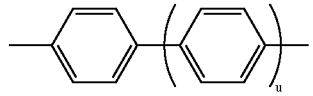 (5-27)

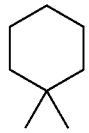 (5-28)

In the general formula (5-28), u represents an integer of from 0 to 3.

In the aforementioned general formula (5), $Ar^5$ is an aryl group exemplified above with reference to $Ar^1$ to $Ar^4$ when k is 0 or an arylene group obtained by removing a predetermined hydrogen atom from the aryl group when k is 1.

In the aforementioned general formula (4), the divalent group represented by D acts to connect F which provides photoelectrical properties to —SiR$^{11}_{3-a}$(OR$^{12}$)$_a$ which is directly connected to three-dimensional inorganic glass-based network and provides a proper flexibility to the hard but brittle inorganic glass-based network and hence enhance the toughness of the film.

Specific examples of the divalent group represented by D include divalent hydrocarbon groups represented by —C$_p$H$_{2p}$—, —C$_p$H$_{2p-2}$— and —C$_p$H$_{2p-4}$— (in which p represents an integer of from 1 to 15), —COO—, —S—, —O—, —CH$_2$—C$_6$H$_4$—, —N=CH—, —C$_6$H$_4$—C$_6$H$_4$—, combination thereof, and groups obtained by introducing substituents into these groups.

In the aforementioned general formula (4), b is preferably 2 or more. When b is 2 or more, the photofunctional organic silicon compound represented by the aforementioned general formula (4) has two or more silicon atoms, giving a tendency that an inorganic glass-based network can be easily formed to enhance the mechanical strength.

The compounds represented by the aforementioned general formula (4) may be used singly or in combination of two or more thereof.

Further, the compound represented by the aforementioned general formula (4) may be used in combination with a compound represented by the following general formula (6) for the purpose of further enhancing the mechanical strength of the hardened layer.

B(—SiR$^{11}_{3-a}$(OR$^{12}$)$_a$)$_g$ (6)

wherein $R^{11}$, $R^{12}$ and a are as defined in the general formula (4); B represents a hydrocarbon group having a valence of g which may be branched, phenyl group having a valence of g, —NH— or a group having a valence of g formed of two or more of these groups in combination; and g represents an integer of 2 or more.

The compound represented by the aforementioned general formula (6) is a compound containing a substituted silicon group having a hydrolyzable group represented by —SiR$^{11}_{3-a}$(OR$^{12}$)$_a$. The compound represented by the general formula (6) forms an Si—O—Si bond to give a three-dimensional crosslinked hardened layer when it reacts with a compound represented by the general formula (4) or compounds represented by the general formula (4) react with each other. When the compound represented by the general formula (6) and the compound represented by the general formula (4) are used in combination, the crosslinked structure of the hardened layer can be easily three-dimensional. Further, the hardened layer is provided with a proper flexibility. Thus, a higher mechanical strength can be obtained.

The compound represented by the aforementioned general formula (6) is preferably one represented by any one of the following general formulae (6-1) to (6-5). In the general formulae (6-1) to (6-5), $T^1$ and $T^2$ each independently represent a divalent or trivalent hydrocarbon group which may be branched. The group A represents a substituted silicon group containing a hydrolyzable group represented by $-SiR^{11}{}_{3-a}(OR^{12})_a$. The suffixes h, i and j each independently represent an integer of from 1 to 3. The compounds represented by the general formulae (6-1) to (6-5) are selected such that the number of the groups A per molecule is 2 or more.

$$T^1\text{-}[A]_j \quad (6\text{-}1)$$

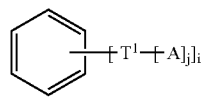  (6-2)

  (6-3)

$$HN\text{-}[T^1\text{-}A]_2 \quad (6\text{-}4)$$

$$T^2\text{-}[NH\text{-}T^1\text{-}A]_j \quad (6\text{-}5)$$

Preferred examples of the compound represented by the aforementioned general formula (6) will be set forth in Table 1. In Table 1, Me represents a methyl group, Et represents an ethyl group, and Pr represents a propyl group.

TABLE 1

| | | | |
|---|---|---|---|
| 6-6 | (MeO)₃Si∼∼Si(OMe)₃ | 6-7 | (EtO)₃Si∼∼Si(OEt)₃ |
| 6-9 | (i-Pr-O)₃Si∼∼Si(O-i-Pr)₃ | 6-8 | (MeO)₃Si∼∼∼∼Si(OMe)₃ |
| 6-10 | (EtO)₃Si∼∼∼∼Si(OEt)₃ | 6-11 | (i-Pr-O)₃Si∼∼∼∼Si(O-iPr)₃ |
| 6-12 | (MeO)₃Si-CH₂-C₆H₄-CH₂-Si(OMe)₃ | 6-13 | (EtO)₃Si-CH₂-C₆H₄-CH₂-Si(OEt)₃ |
| 6-14 | (MeO)₃Si-CH₂-C₆H₄-CH₂-C₆H₄-CH₂-Si(OMe)₃ | 6-15 | (EtO)₃Si-CH₂-C₆H₄-CH₂-C₆H₄-CH₂-Si(OEt)₃ |
| 6-16 | (MeO)₃Si∼N(H)∼Si(OMe)₃ | 6-17 | (MeO)₃Si∼N(H)∼N(H)∼Si(OMe)₃ |
| 6-18 | (MeO)₂MeSi(CH₂)₂SiMe(OMe)₂ | 6-19 | (EtO)₂EtSi(CH₂)₂SiEt(OEt)₂ |
| 6-20 | (MeO)₂MeSi(CH₂)₆SiMe(OMe)₂ | 6-21 | (EtO)₂EtSi(CH₂)₆SiEt(OEt)₂ |
| 6-22 | (MeO)₂MeSi(CH₂)₁₀SiMe(OMe)₂ | 6-23 | (EtO)₂EtSi(CH₂)₁₀SiEt(OEt)₂ |
| 6-24 | MeOMe₂Si(CH₂)₆SiMe₂OMe | | |

The compound represented by the aforementioned general formula (4) may be used in combination with other compounds which can undergo crosslinking reaction. As such a compound, there may be used any silane coupling agent, commercially available silicone-based hard coat agent or the like.

Examples of the silane coupling agent employable herein include vinyl trichlorosilane, vinyl trimethoxy silane, vinyl triethoxysilane, γ-glycidoxypropyl methyl diethoxysilane, γ-glycidoxypropyl trimethoxysilane, γ-glycidoxypropyl trimethoxysilane, γ-aminopropyl triethoxysilane, γ-aminopropyl trimethoxysilane, γ-aminopropyl methyl dimethoxysilane, N-β(aminoethyl)γ-aminopropyl triethoxysilane, tetramethoxysilane, methyl trimethoxysilane, and dimethyl dimethoxysilane.

Examples of the commercially available hard coat agent employable herein include KP-85, CR-39, X-12-2208, X-40-9740, X-4101007, KNS-5300, X-40-2239 (produced by Shinetsu Chemical Co., Ltd.), and AY42-440, AY42-441 and AY49-208 (produced by Dow Corning Toray Silicone Co., Ltd.).

The protective layer 5 may further comprise a fluorine-containing compound incorporated therein for the purpose of providing surface lubricity. By enhancing the surface lubricity of the protective layer 5, the coefficient of friction of the protective layer 5 with the cleaning member is reduced, making it possible to enhance the abrasion resistance thereof. The protective layer 5 has an effect of preventing the attachment of discharge products, developer and paper dust to the surface of the electrophotographic photoreceptor to help prolonging the life of the electrophotographic photoreceptor.

As the fluorine-containing compound, a fluorine-containing polymer such as polytetrafluoroethylene may be added as it is or fine particles of the polymer may be added. In the case of hardened layer formed of the compound represented by the aforementioned general formula (4), as the fluorine-containing compound, one capable of reacting with an alkoxysilane is preferably added to form a part of a crosslinked layer. Examples of the fluorine-containing compound include (tridecafluoro-1,1,2,2-tetrahydro octyl)triethoxysilane, (3,3,3-trifluoropropy)trimethoxysilane, 3-(heptafluoroisopropoxy)propyltriethoxysilane, 1H, 1H, 2H, 2H-perfluoroalkyl triethoxysilane, 1H, 1H, 2H, 2H-perfluorodecyl triethoxysilane, and 1H, 1H, 2H, 2H-perfluorooctyl triethoxysilane.

The content of the fluorine-containing compound is preferably 20% by weight or less based on the total weight of the protective layer 5. When the content of the fluorine-containing compound exceeds 20% by weight, there can occur problems in the film-forming properties of the crosslinked hardened layer.

The protective layer 5 containing the aforementioned compound has a sufficient oxidation resistance but may comprise an oxidation inhibitor incorporated therein for the purpose of providing itself with a higher oxidation resistance. As the oxidation inhibitor, there is preferably used a hindered phenolic or hindered amine-based oxidation inhibitor. Any known oxidation inhibitor such as organic sulfur-based oxidation inhibitor, phosphate-based oxidation inhibitor, dithiocarbaminate-based oxidation inhibitor, thiourea-based oxidation inhibitor and benzimidazole-based oxidation inhibitor may be used. The content of the oxidation inhibitor is preferably 15% by weight or less, more preferably 10% by weight or less based on the total weight of the protective layer 5.

Examples of the hindered phenolic oxidation inhibitor employable herein include 2,6-di-t-butyl-4-methylphenol, 2,5-di-t-butylhydroquinone, N,N'-hexamethylenebis(3,5-di-t-butyl-4-hydroxyhydro cinnamide), 3,5-di-t-butyl-4-hydroxybenzylphosphonate-diethylester, 2,4-bis[(octylthio)methyl]-o-cresol, 2,6-di-t-butyl-4-ethylphenol, 2,2'-methylenebis(4-methyl-6-t-butylphenol), 2,2'-methylenebis(4-ethyl-6-t-butylphenol), 4,4'-butylidenebis(3-methyl-6-t-butyl phenol), 2,5-di-t-amylhydroquinone, 2-t-butyl-6-(3-butyl-2-hydroxy-5-methylbenzyl)-4-methylphenyl acrylate, and 4,4'-butylidenebis(3-methyl-6-t-butyl phenol).

The protective layer 5 may further comprise any known additives for use in the formation of coat layer incorporated therein. Any known additives such as leveling agent, ultraviolet absorber, light-stabilizer and surface active agent may be added.

The protective layer 5 may be formed by spreading a coating solution containing the aforementioned compound over the charge-transporting layer 2 which is then subjected to heat treatment. In this manner, the compound represented by the aforementioned general formula (4) and the like undergo three-dimensional crosslinking hardening reaction to form a rigid hardened layer. The heat treatment temperature is not specifically limited so far as the protective layer 5 doesn't affect the underlying layers such as photosensitive layer 6 but is preferably from room temperature to 20° C., more preferably from 100° C. to 160° C.

The crosslinking hardening reaction may be effected in the absence of catalyst or in the presence of a proper catalyst. Examples of the catalyst employable herein include acid catalysts such as hydrochloric acid, sulfuric acid, phosphoric acid, formic acid, acetic acid and trifluoroacetic acid, base groups such as ammonia and triethylamine, organic tin compounds such as dibutyl tindiacetate, dibutyl tin dioctoate and stannous octoate, organic titanium compounds such as tetra-n-butyl titanate and tetraisopropyl titanate, iron salt, manganese salt, cobalt salt, zinc salt and zirconium salt of organic carboxylic acids, and aluminum chelate compounds.

Examples of the coating method for spreading the coating solution of the protective layer 5 include blade coating method, wire bar coating method, spray coating method, dip coating method, bead coating method, air knife coating method and curtain coating method.

Examples of the solvent to be used in the coating solution for forming the protective layer 5 include ordinary organic solvents such as dioxane, tetrahydrofurane, methylene chloride, chloroform, chlorobenzene, toluene, water, methanol, ethanol, n-propanol, i-propanol, n-butanol, benzyl alcohol, methyl cellosolve, ethyl cellosolve, acetone, methyl ethyl ketone, cyclohexanone, methyl acetate, n-butyl acetate, dimethyl ether and dibutyl ether. These solvents may be used singly or in admixture of two or more thereof. However, a solvent which can difficultly dissolve the photosensitive layer 6 over which the coating solution is spread is preferably used.

The thickness of the protective layer 5 having the aforementioned constitution is preferably from 0.5 μm to 20 μm, more preferably from 1 μm to 20 μm, even more preferably from 2 μm to 10 μm.

In the electrophotographic photoreceptor of the invention, the thickness of the functional layer above the charge-generating layer is preferably 50 μm or less, more preferably 40 μm or less from a view point of obtaining high resolution. In the case where the functional layer is a thin layer, the aforementioned subbing layer 4 and a high strength protective layer 5 are used in combination to particular advantage.

Figure 2A:
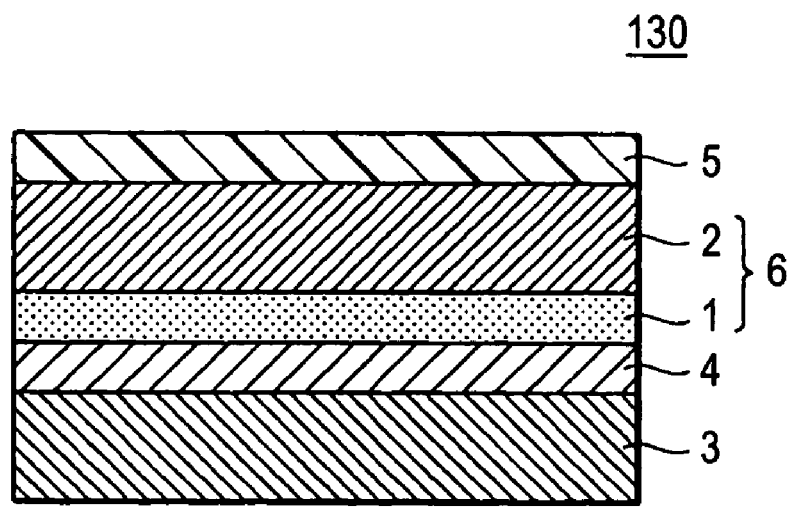
FIGS. 2A and 2B are typical sectional views illustrating other embodiments of implementation of the electrophotographic photoreceptor of the invention, respectively.

While preferred embodiments of implementation of the electrophotographic photoreceptor of the invention has been described in detail, the electrophotographic photoreceptor of the invention is not limited thereto. For example, the electrophotographic photoreceptor of the invention may comprise a subbing layer 4 interposed between the conductive support 3 and the photosensitive layer 6, and a protective layer 5 may be provided on the photosensitive layer 6 as in the electrophotographic photoreceptor 130 shown in FIG. 2A.

Figure 2B:
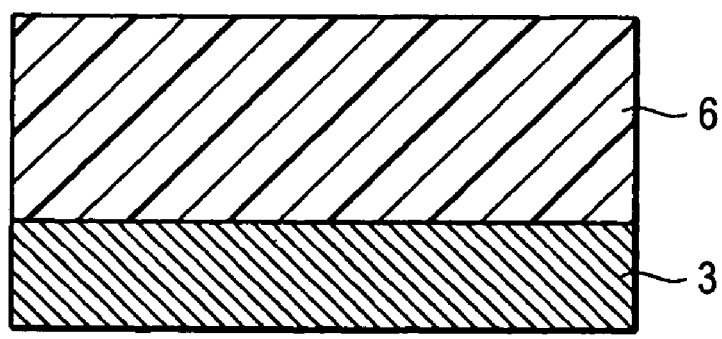

While the aforementioned embodiments 100, 110 and 120 of the electrophotographic photoreceptor of the invention have been described with reference to the case where the photosensitive layer 6 has a laminated structure, the photosensitive layer 6 may have a single-layer structure as in the electrophotographic photoreceptor 140 shown in FIG. 2B. In this case, too, a subbing layer 4 may be provided between the conductive support 3 and the photosensitive layer 6, and a protective layer 5 may be provided on the photosensitive layer 6. Both the subbing layer 4 and the protective layer 5 may be provided.

Figure 25:
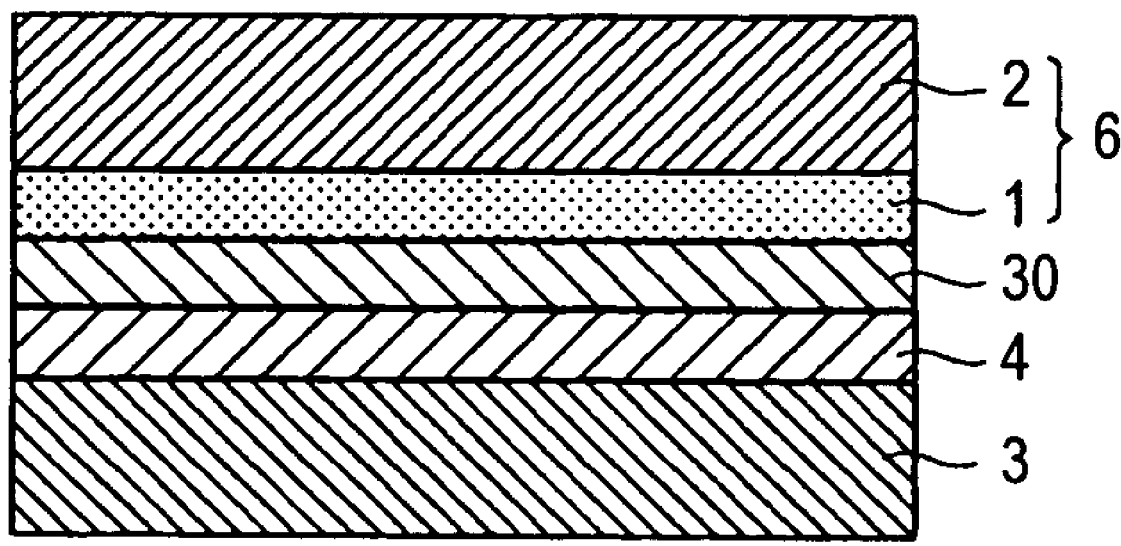
FIG. 25 is a typical sectional view illustrating another embodiment of implementation of the electrophotographic photoreceptor of the invention.

Further, an interlayer 30 may be provided interposed between the photosensitive layer 6 and the subbing layer 4 as in the electrophotographic photoreceptor 150 shown in FIG. 25. As the material constituting the interlayer 30 there may be used an organic metal compound such as organic zirconium compound (e.g., zirconium chelate compound, zirconium alkoxide compound, zirconium coupling agent), organic titanium compound (e.g., titanium chelate compound, titanium alkoxide compound, titanate coupling agent), organic aluminum compound (e.g., aluminum chelate compound, aluminum coupling agent), antimony alkoxide compound, germanium alkoxide compound, organic indium compound (e.g., indium alkoxide compound, indium chelate compound), organic manganese compound (e.g., manganese alkoxide compound, manganese chelate compound), organic tin compound (e.g., tin alkoxide compound, tin chelate compound) and aluminum silicon alkoxide compound similarly to the subbing layer 4. Among these organic materials, organic zirconium compounds, organic titanyl compounds and organic aluminum compounds are preferably used because they show a low residual potential and provide good electrophotographic properties.

The interlayer 30 may comprise a silane coupling agent such as vinyl trichlorosilane, vinyl trimethoxysilane, vinyl triethoxysilane, vinyl tris-2-methoxyethoxysilane, vinyl tri-acetoxysilane, γ-glycidoxypropyltrimethoxysilane, γ-methacryloxypropyl trimethoxysilane, γ-aminopropyl triethoxysilane, γ-chloropropyl trimethoxysilane, γ-2-aminoethylamino propyl trimethoxysilane, γ-mercaptopropyl trimethoxysilane, γ-uridopropyl triethoxysilane and β-3,4-epoxycyclohexyl trimethoxysilane incorporated therein as in the subbing layer 4.

Further, known binder resins such as polyvinyl alcohol, polyvinyl methyl ether, poly-N-viylimidazole, polyethylenoxide, ethyl cellulose, methyl cellulose, ethylene-acrylic acid copolymer, polyamide, polyimide, casein, gelatin, polyethylene, polyester, phenolic resin, vinyl chloride-vinyl acetate copolymer, epoxy resin, polyvinyl pyrrolidone, polyvinyl puridine, polyurethane, polyglutamic acid and polyacrylic acid may be used. The mixing ratio of these components may be properly predetermined as necessary.

The interlayer 30 may further comprise an electron-transporting pigment incorporated/dispersed therein as in the subbing layer 4. Examples of the electron-transporting pigment employable herein include organic pigments such as perylene pigment, bisbenzimidazole perylene pigment, polycyclic pigment, indigo pigment, quinacridone pigment, bisazo pigment having an electron-attracting substituent such as cyano group, nitro group, nitroso group and halogen atom and phthalocyanine pigment, and inorganic pigments such as zinc oxide and titanium oxide. Among these pigments, perylene pigment, bisbenzimidazole perylene pigment and polycyclic quinone pigment are preferably used because they have a high electron mobility. When the electron-transporting pigment is incorporated in too large amount, the strength of the subbing layer is deteriorated, causing defects in the coat layer. Thus, the content of the electron-transporting pigment is 95% by weight or less, preferably 90% by weight or less.

The interlayer 30 is formed by spreading a coating solution having the aforementioned materials incorporated/dispersed in a predetermined organic solvent over the subbing layer 4, and then drying the coat layer to remove the solvent therefrom in the same manner as the subbing layer. In order to incorporate/disperse the materials in the solvent to prepare the coating solution for forming the interlayer 30, a ball mill, roll mill, sandmill, attritor, ultrasonic device or the like may be used. As the organic solvent, there may be used any organic solvent so far as it causes neither gelation nor aggregation when the organic metal compound is dissolved therein and the electron-transporting pigment is incorporated/dispersed therein. Specific examples of the organic solvent employable herein include methanol, ethanol, n-butanol, benzyl alcohol, methyl cellosolve, ethyl cellosolve, acetone, methyl ethyl ketone, cyclohexanone, methyl acetate, n-butyl acetate, dioxane, tetrahydrofurane, methylene chloride, chloroform, chlorobenzene, and toluene. These organic solvents may be used singly or in admixture of two or more thereof. The drying of the coat solution is effected at a temperature where the solvent can be evaporated to form a film.

The thickness of the interlayer 30 is preferably from 0.1 μm to 10 μm, more preferably from 0.5 μm to 5 μm. When the thickness of the interlayer 30 satisfies the aforementioned requirements, stable properties can be obtained even when the electrophotographic photoreceptor is continuously used over an extended period of time.

The electrophotographic photoreceptor of the invention described above can be mounted on electrophotographic devices such as laser beam printer emitting near infrared light or visible light, digital copying machine, LED printer and laser facsimile and process cartridge provided in these electrophotographic devices. The electrophotographic photoreceptor of the invention may be used with a one-component or two-component normal developer or reversal developer. The normal developer is a developer used for charge area development and the reversal developer is a developer used for reversal development. The electrophotographic photoreceptor of the invention can also be mounted on a contact type charging type electrophotographic device comprising a charging roller or charging brush to obtain good properties with little current leakage.

(Electrophotographic Device and Process Cartridge)

Figure 3:
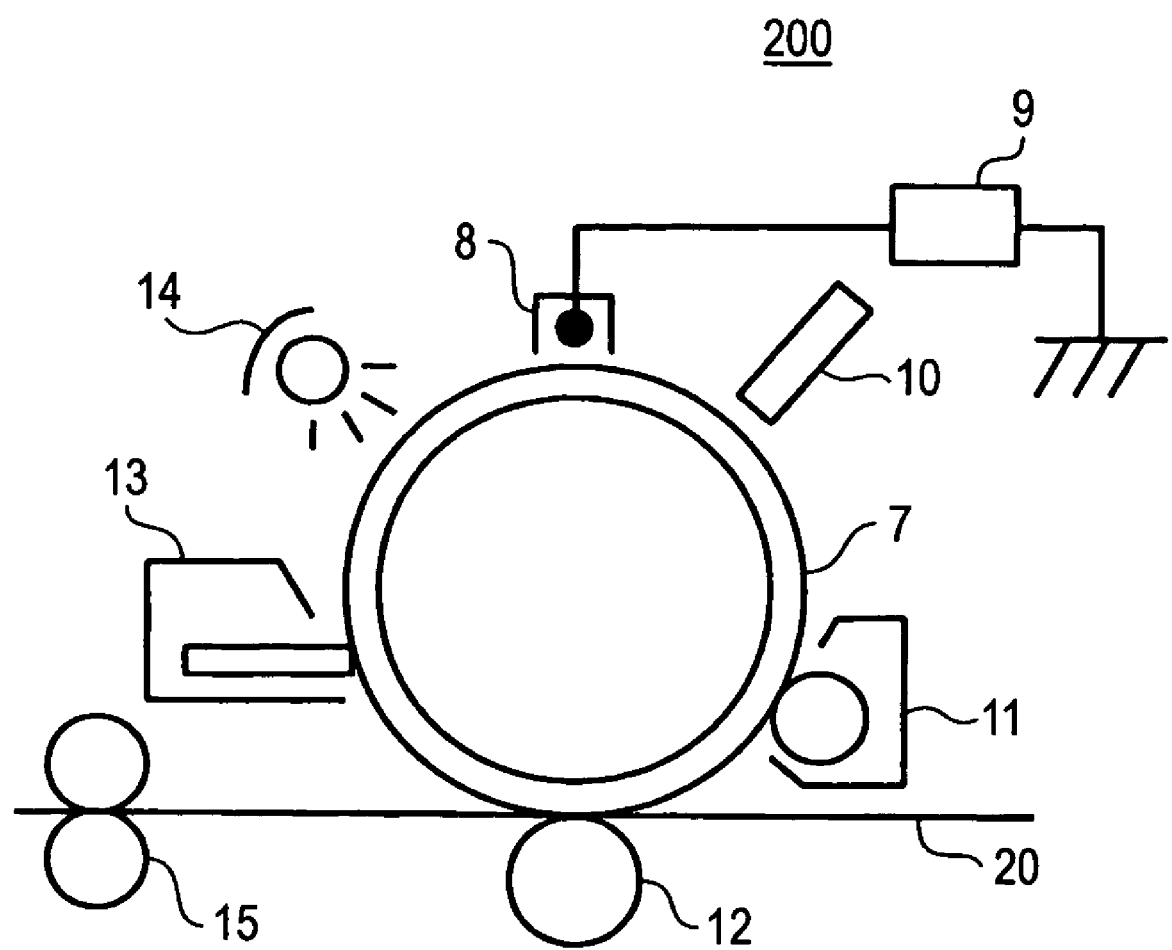
FIG. 3 is a sectional view schematically illustrating the basic configuration of a preferred embodiment of implementation of the electrophotographic device of the invention.
Figure 4:
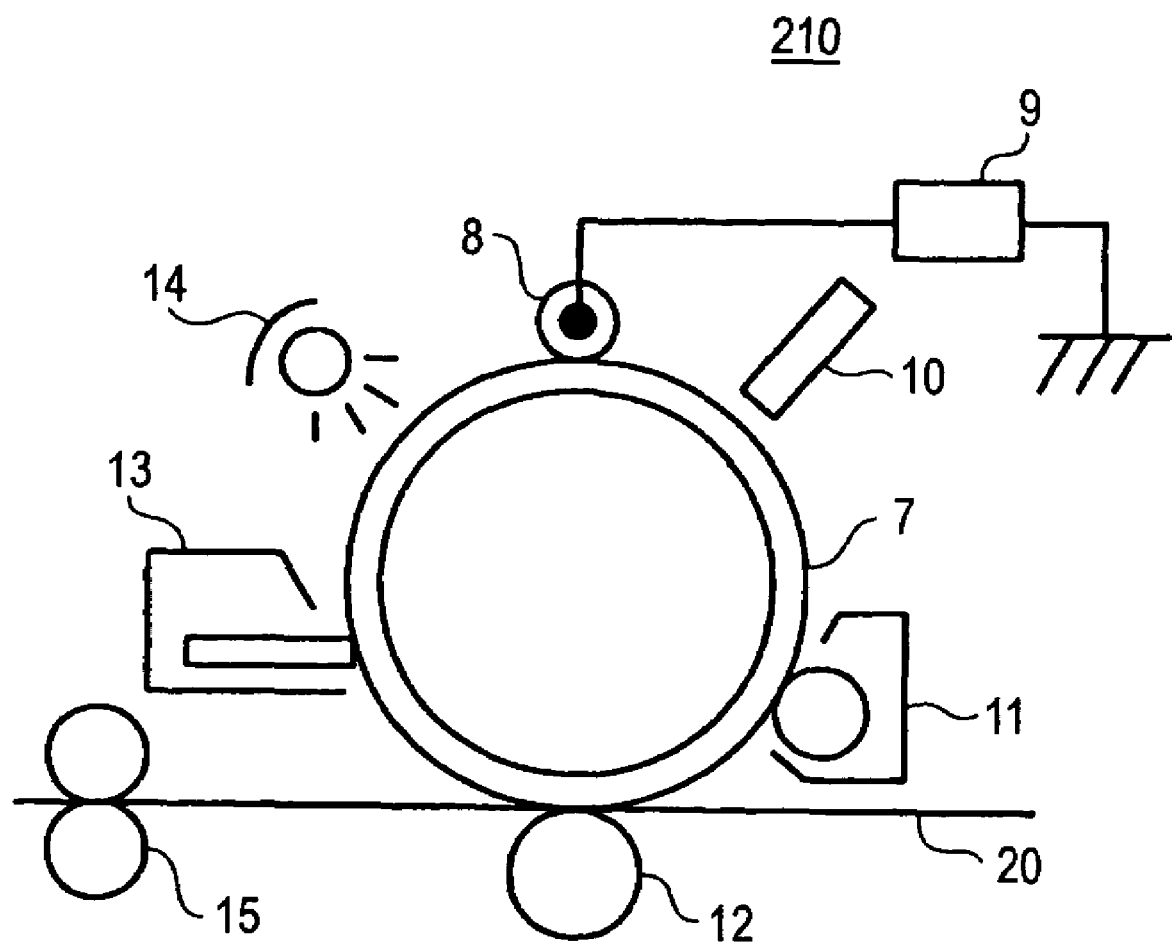
FIG. 4 is a sectional view schematically illustrating the basic configuration of another preferred embodiment of implementation of the electrophotographic device of the invention.

FIGS. 3 and 4 each are a sectional view schematically illustrating the basic configuration of a preferred embodiment of implementation of the electrophotographic device of the invention.

The electrophotographic device 200 shown in FIG. 3 comprises an electrophotographic photoreceptor 7 of the invention, a charging unit 8 for charging the electrophotographic photoreceptor 7 in corona discharge process, an electric supply 9 connected to the charging unit 8, an exposure unit 10 for exposing the electrophotographic photoreceptor 7 charged by the charging unit 8 to light to form an electrostatic latent image, a development unit 11 for developing the electrostatic latent image formed by the exposure unit 10 with a toner to form a toner image, a transferring unit 12 for transferring the toner image formed by the development unit 11 onto a transferring material 20, a cleaning unit 13, a discharger 14, and a fixing device 15.

The electrophotographic device 210 shown in FIG. 4 has the same configuration as the electrophotographic device 200 shown in FIG. 3 except that there is provided the charging unit 8 for charging the electrophotographic photoreceptor 7 of the invention in contact process. In particular, an electrophotographic device employing a contact process charging unit using an ac voltage having a dc voltage superposed thereon is preferably used because it has an excellent abrasion resistance. In this case, the discharger 14 may not be provided.

As the charging unit 8, there may be used a contact type charger using a roller-shaped, brush-shaped, blade-shaped, film-shaped or pin electrode-shaped electrically-conductive or semiconductive charging member or a non-contact type charger such as scorotron charger and corotron utilizing corona discharge process.

As the charging member in the contact type charger there is preferably used one having an elastic layer, resistance layer, protective layer, etc. provided on the periphery of a core.

Examples of the core material employable herein include electrically-conductive materials such as iron, copper, brass, stainless steel, aluminum and nickel. Alternatively, a molded resin product having an electrically-conductive particulate material or the like dispersed therein may be used.

As the material of the elastic layer, there may be used an electrically-conductive or semiconductive material such as rubber material having an electrically-conductive particulate material or semiconductive particulate material dispersed therein. Examples of the rubber material employable herein include EPDM, polybutadiene, natural rubber, polyisobutylene, SBR, CR, NBR, silicone rubber, urethane rubber, epichlorohydrin rubber, SBS, thermoplastic elastomer, norbornene rubber, fluorosilicone rubber, ethylene oxide rubber, choroprene rubber, isoprene rubber, and epoxy rubber. Examples of the electrically-conductive particulate material or semiconductive particulate material employable herein include metals such as carbon black, zinc, aluminum, copper, iron, nickel, chromium and titanium, and metal oxides such as $ZnO$—$Al_2O_3$, $SnO_2$—$Sb_2O_3$, $In_2O_3$—$SnO_2$, $ZnO$—$TiO_2$, $MgO$—$Al_2O_3$, $FeO$—$TiO_2$, $TiO_2$, $SnO_2$, $Sb_2O_3$, $In_2O_3$, $ZnO$ and $MgO$. These materials may be used singly or in admixture of two or more thereof.

As the material of the resistance layer and protective layer, there may be used one obtained by dispersing an electrically-conductive particulate material or semiconductive particulate material in a binder resin and controlling their resistance. Examples of the binder resin employable herein include acrylic resins, cellulose resins, polyamide resins, methoxymethylated nylon, ethoxymethylated nylon, polyurethane resins, polycarbonate resins, polyester resins, polyethylene resins, polyvinyl resins, polyarylate resins, polythiophene resins, polyolefin resins such as PFA, FEP and PET, and styrene butadiene resins. As the electrically-conductive particulate material or semiconductive particulate material, there may be used carbon black, metal or metal oxide as used in the elastic layer. The resistance layer and protective layer may comprise an oxidation inhibitor such as hindered phenol and hindered amine, a filler such as clay and kaolin, a lubricant such as silicone oil or the like incorporated therein, as needed.

In order to form these layers, blade coating method, meyer bar coating method, spray coating method, dip coating method, bead coating method, air knife coating method, curtain coating method, melt molding method, injection molding method or the like may be employed.

In order to charge the electrophotographic photoreceptor using the electrically-conductive members, a voltage is applied to the electrically-conductive member. The voltage thus applied may comprise a DC voltage or DC voltage having an AC voltage superposed thereon.

The charging process for use in the electrophotographic photoreceptor of the invention is not specifically limited. However, the recent trend is that a contact type charging process evolving little emission of ozone and giving little environmental burden is preferably used. In general, the contact type charging process has a lower charging capability than the non-contact charging process such as scorotron and corotron and thus easily raises problems in image forming apparatus requiring high response. When the charging capability is low, the charge left in the photosensitive layer of the electrophotographic photoreceptor causes image quality defects such as fogging. However, in the electrophotographic photoreceptor of the invention, the charge-generating layer contains little hydroxygallium phthalocyanine pigment particles out of shape causing the retention of charge. Therefore, the aforementioned image quality defects can difficultly occur. Thus, the electrophotographic photoreceptor of the invention can be used in combination with the contact type charging process to advantage.

The charging unit 8 is preferably a unit capable of controlling charging potential so that the charging potential after predetermined times of the repetition of an electrophotographic process comprising charging by the charging unit 8, exposure by the exposure unit 10, development by the development unit 11 and transfer by the transferring unit 12 is lower than the charging potential in the first cycle of the electrophotographic process. The aforementioned process for controlling the charging potential on the surface of the electrophotographic photoreceptor will be further described in connection with the attached drawings.

In the electrophotographic device 200 shown in FIG. 3, to the charging unit 8 is connected an electric supply 9 to which a charging potential controller (not shown) is electrically connected. To the charging potential controller is electrically connected a measuring instrument (not shown) for measuring the number of rotations of the electrophotographic photoreceptor. The charging potential controller is adapted to control the electric field applied to the photosensitive layer from the electric supply 9 via the charging unit 8. In this arrangement, the charging potential of the surface of the photosensitive layer can be lowered when the electrophotographic process is repeated predetermined times.

Figure 26:
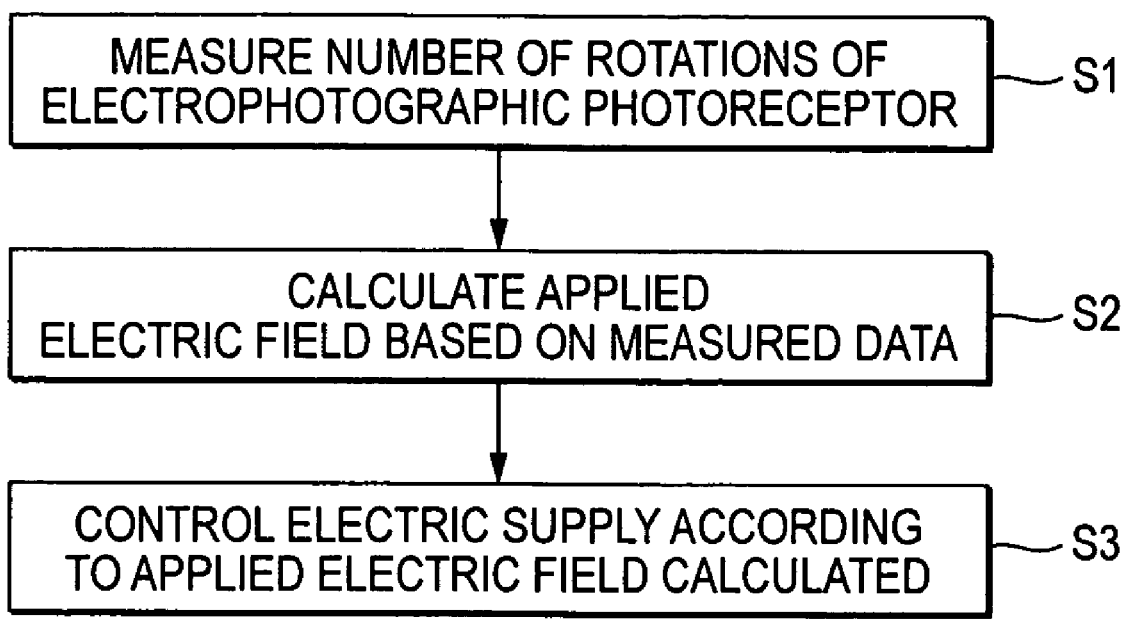
FIG. 26 is a flowchart illustrating an example of a process for lowering the charging potential of the photosensitive layer developed after predetermined times of repetition of electrophotographic process.

FIG. 26 is a flow chart illustrating the process for controlling the charging potential so that the charging potential after predetermined times of the repetition of the electrophotographic process is lower than the charging potential in the first cycle of the electrophotographic process. Firstly, at Step S1, the number of rotations of the electrophotographic photoreceptor 7, which is an index of the number of repetition of the electrophotographic process, is measured by the measuring instrument. Subsequently, at Step S2, data signal concerning the number of rotations thus measured is delivered from the measuring instrument to the charging potential controller where it is then converted to the number of repetition of the electrophotographic process. To the charging potential controller have been previously inputted date concerning the relationship between the thickness of the photosensitive layer which has been subjected to the electrophotographic process predetermined times and the charging potential developed when a predetermined electric field has been applied to the photosensitive layer having the thickness. In this manner, the thickness of the photosensitive layer which has been subjected to the electrophotographic process by the number of repetition thus obtained is estimated on the basis of the number of repetition. Subsequently, the electric field to be applied to the photosensitive layer is determined such that the charging potential of the photosensitive layer is lowered when an electric field is applied to the photosensitive layer having the thickness thus estimated. Subsequently, at Step s3, a control signal concerning the electric field thus determined is delivered to the electric supply 9 from which an electric field based on the control signal is then applied to the photosensitive layer via the charging roll. In this manner, the charging potential of the photosensitive layer can be lowered with the rise of the number of repetition of the electrophotographic process.

While the aforementioned process has been described comprises a step of converting the number of rotations of the electrophotographic photoreceptor 7 to the number of repetition of the electrophotographic process, such a conversion step is not always needed. In other words, data concerning the relationship between the thickness of the photosensitive layer which has been subjected to the electrophotographic process predetermined times and the charging potential developed when a predetermined electric field has been applied to the photosensitive layer having the thickness may be previously inputted to the charging potential controller so that the number of rotations of the electrophotographic photoreceptor 7 measured by the measuring instrument is directly used to estimate the thickness of the photosensitive layer which has been rotated by the times thus measured.

Alternatively, the electric field applied to the photosensitive layer may be determined directly from the diameter and number of rotations of the electrophotographic photoreceptor without providing the step of estimating the thickness (or abrasion) of the photosensitive layer. In other words, by lowering the electric field according to a theoretical curve which has previously been determined on the electric field to be applied to the electrophotographic photoreceptor to lower the charging potential when the electrophotographic process has been repeated predetermined times as a function of the diameter and number of rotations of the electrophotographic photoreceptor 7, the charging potential of the photosensitive layer can be properly lowered when the electrophotographic process has been repeated predetermined times.

Figure 27A:
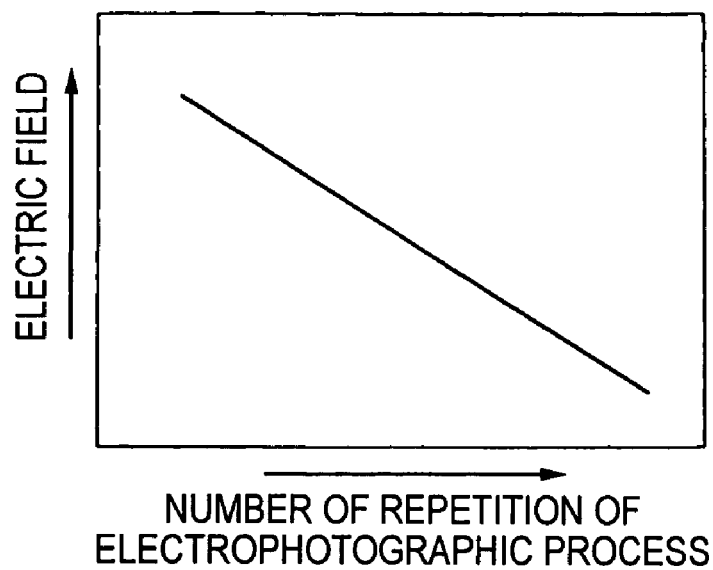
FIGS. 27A and 27B each are a graph illustrating an example of the relationship between the number of repetition of electrophotographic process and the electric field applied to the photosensitive layer (electric field reduction schedule)

The schedule of lowering the electric field in the invention is not specifically limited so far as the charging potential can be controlled so that the charging potential after predetermined times of the repetition of the electrophotographic process is lower than the charging potential in the first cycle of the electrophotographic process. As shown in FIG. 27A, the electric field may be continuously lowered with the rise of the number of repetition of the electrophotographic process. Alternatively, as shown in FIG. 28B, the electric field may be lowered stepwise.

By thus controlling the electric field applied to the photosensitive layer during charging according to the relationship between the thickness of the photosensitive layer after repetition of the electrophotographic process predetermined times and the charging potential developed when a predetermined electric field has been applied to the photosensitive layer having the thickness, the procedure of lowering the charging potential on the surface of the photosensitive layer with the rise of the number of repetition of the electrophotographic process is carried out effectively, making it assured that the occurrence of image quality defects such as fogging can be inhibited to obtain a good image quality over an extended period of time.

As the exposure unit 10, there may be used an optical device capable of imagewise exposing the surface of the electrophotographic photoreceptor to light, e.g., semiconductor laser, LED (light emitting diode), liquid crystal shutter.

As the development unit 11, there may be used any known development unit using a one-component or two-component a developer using charge area development or a developer using reversal development. The normal developer is a developer used for charge area development and the reversal developer is a developer used for reversal development. The shape of the toner to be used in the development unit 11 is not specifically limited and maybe amorphous, spherical or other specific forms. Among these forms of toners, a spherical toner is preferably used from the standpoint of enhancement of image quality and ecology. A spherical toner is a toner having a spherical form with an average shape coefficient ($ML^2/A$) of from 100 to 145, preferably from 100 to 140 to realize a high transferring efficiency. When the average shape coefficient ($ML^2/A$) is greater than 145, the transferring efficiency is lowered, giving a tendency that the deterioration of the image quality of the print sample can be visually observed. The average shape coefficient ($ML^2/A$) is defined in the following manner. A projected image of a toner particle is scanned by an optical microscope while the toner is spread on a slide glass, and shape coefficient ($ML^2/A$) of the toner particle is calculated by an image analyzer (for example, LUZEXIII produced by Nireco Corporation.) according to following formula (2) and average the shape coefficient per toner particle.

$$(ML^2/A) = (\text{maximum length of a projected toner particle image})^2 \times \pi \times 100/(\text{projected area} \times 4)$$

The spherical toner comprises at least a binder resin and a colorant. As the spherical toner there is preferably used a particulate material having a particle diameter of from 2 μm to 12 μm, more preferably from 3 μm to 9 μm.

Examples of the binder resin employable herein include homopolymers and copolymers such as styrenes, monoolefins, vinyl esters, α-methylenealiphatic monocarboxylic acid esters, vinyl ethers and vinyl ketones. Representative examples of the binder resin include polystyrenes, styrene-alkyl acrylate copolymers, styrene-alkyl methacrylate copolymers, styrene-acrylonitrile copolymers, styrene-butadiene copolymers, styrene-maleic anhydride copolymers, polyethylenes, and polypropylenes. Further examples of the binder resin include polyesters, polyurethanes, epoxy resins, silicone resins, polyamides, modified rosins, and paraffin waxes.

Representative examples of the colorant employable herein include magnetic powders such as magnetite and ferrite, carbon black, aniline blue, chalcoyl blue, chrome yellow, ultramarine blue, Du Pont oil red, quinoline yellow, methylene blue chloride, phthalocyanine blue, malachite green oxalate, lamp black, rose Bengal, C. I. pigment red 48:1, C. I. pigment red 122, C. I. pigment red 57:1, C. I. pigment yellow 97, C. I. pigment yellow 17, C. I. pigment blue 15:1, and C. I. pigment blue 15:3.

The spherical toner may be subjected to inner or external treatment with a known additive such as charge control agent, releasing agent and other inorganic particulate materials.

Representative examples of the releasing agent employable herein include low molecular polyethylenes, low molecular polypropylenes, Fischer-Tropsch waxes, montan waxes, carnauba waxes, rice waxes, and candelilla waxes.

As the charge control agent, there may be used any known charge control agent. Examples of the charge control agent employable herein include azo-based metal complexes, metal complexes of salicylic acid, and resin type charge control agent having a polar group.

As the other inorganic particulate materials, there may be used a small diameter inorganic particulate material having an average primary particle diameter of 40 nm or less for the purpose of controlling the fluidity and chargeability of powder. If necessary, an inorganic or organic particulate material having a greater particle diameter may be used as well for the purpose of reducing the adhesive force. As the other inorganic particulate material, there may be used any known inorganic particulate material.

When the small diameter inorganic particulate material is subjected to surface treatment, it has a raised dispersibility and hence a raised powder fluidity to advantage.

The process for the production of the spherical toner is not specifically limited but may be any known process. Specific examples of the process for the production of the spherical toner include a knead crushing process, a process which comprises applying a mechanical impact or heat energy to the particulate material obtained by the knead crushing process to change the shape thereof, an emulsion polymerization aggregation process, and solution suspension process. Alternatively, a production process may be effected which comprises attaching aggregated particles to the spherical toner thus obtained as a core, and then heat-fusing the aggregated particles to the core to form a core-shell structure. External additives, if added, may be mixed in the spherical toner using a Henschel mixer, V-blender or the like. In the case where the spherical toner is produced in a wet process, these additives may be externally added in a wet process.

The exposure unit 10 is preferably adapted to form an electrostatic latent image on the electrophotographic photoreceptor 7 between the time at which the electrophotographic photoreceptor in stationary state is actuated and the time at which the electrophotographic photoreceptor has completed one rotation. In this manner, the time for idle rotation can be eliminated, making it possible to sufficiently reduce FCOT. At the same time, the use of the hydroxygallium phthalocyanine pigment of the invention makes it possible to obtain a good image quality sufficiently free from the occurrence of ghost.

As the transferring unit 12, there may be used a contact type transferring charger using a belt, roller, film, rubber blade, etc. or a scorotron transferring charger or corotron transferring charger utilizing corona discharge.

The cleaning unit 13 is adapted to remove the residual toner attached to the surface of the electrophotographic photoreceptor after the transferring step. The electrophotographic photoreceptor the surface of which has been thus cleaned is repeatedly used for the subsequent image formation process (electrophotographic process).

As the cleaning unit 13, there maybe used a brush cleaner or roll cleaner besides the cleaning blade. Preferred among these cleaning units is cleaning blade. Examples of the material of the cleaning blade employable herein include urethane rubber, neoprene rubber, and silicone rubber.

The discharger 14 is adapted to prevent the occurrence of a phenomenon that the residual potential on the electrophotographic photoreceptor is carried over to the subsequent cycle. In this manner, the image quality can be further enhanced in the case where the electrophotographic photoreceptor is repeatedly used.

Though not shown in FIGS. 3 and 4, the electrophotographic device of the invention may comprise an intermediate transferring unit. As the intermediate transferring unit according to the invention, there may be used one having a structure that an elastic layer containing a rubber, an elastomer and a resin and at least one coat layer are laminated on an conductive support. Examples of the material of the intermediate transferring unit employable herein include one having an electrically-conductive carbon powder or metal powder incorporated or dispersed in a resin such as polyurethane-based resin, polyester-based resin, polystyrene-based resin, polyolefinic resin, polybutadiene-based resin, polyamide-based resin, polyvinyl chloride-based resin, polyethylene-based resin and fluororesin. The intermediate transferring unit may be in the form of roller, belt or the like.

Figure 28:
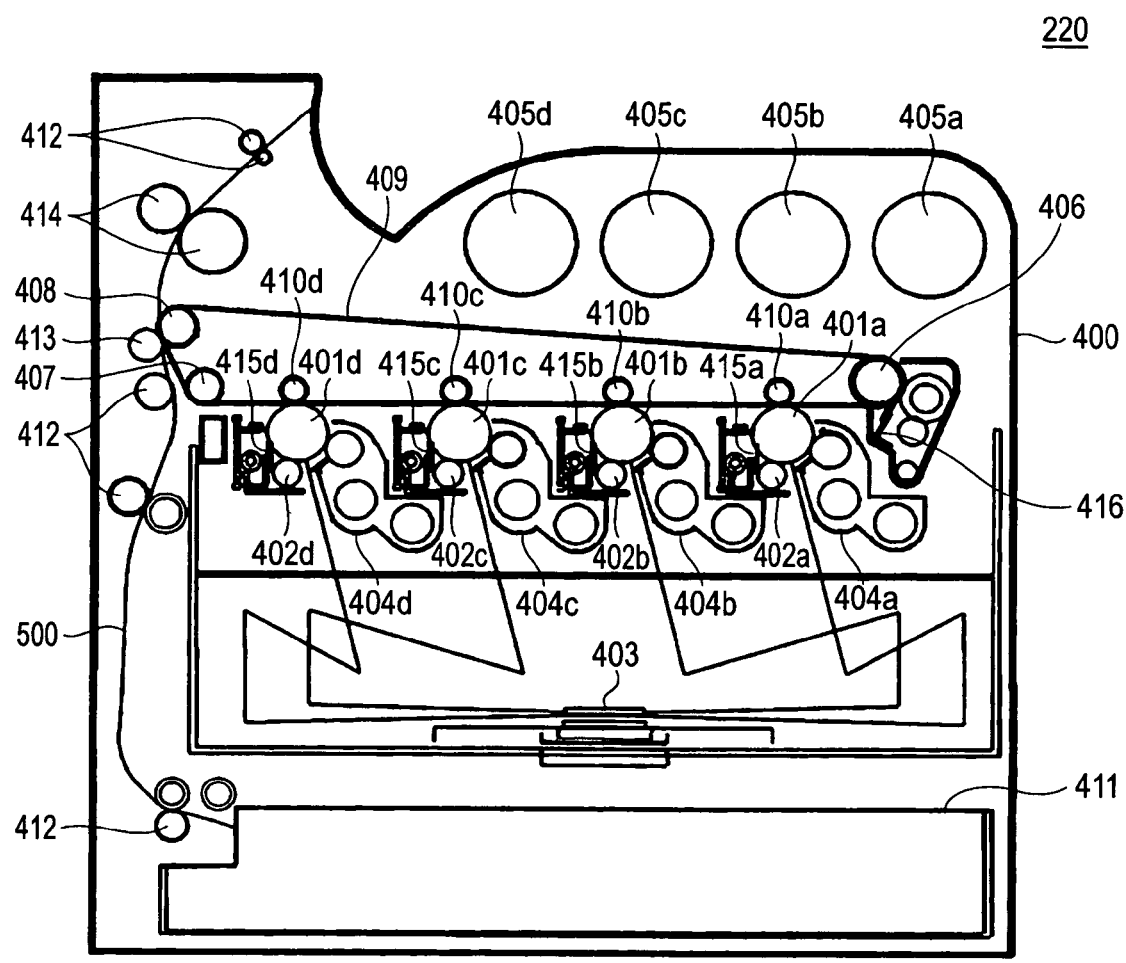
FIG. 28 is a sectional view schematically illustrating the basic configuration of another preferred embodiment of implementation of the electrophotographic device of the invention.

FIG. 28 is a sectional view schematically illustrating the basic configuration of another embodiment of implementation of the electrophotographic device of the invention. The image formation device 220 shown in FIG. 28 is an intermediate transferring process type image formation device having four electrophotographic photoreceptors 401a to 401d (the electrophotographic photoreceptors 401a, 401b, 401c and 401d are capable of forming yellow, magenta, cyan and black images, respectively, for example) disposed juxtaposed to each other along an intermediate transferring belt 409 in a housing 400.

The electrophotographic photoreceptors 401a to 401d mounted on the image formation device 220 each are an electrophotographic photoreceptor according to the invention.

The electrophotographic photoreceptors 410a to 401d each can rotate in a predetermined direction (counterclockwise as viewed on the drawing). Disposed on the electrophotographic photoreceptors 401a to 401d along the direction of rotation are charging rolls 402a to 402d, development units 404a to 404d, primary transferring rolls 410a to 410d, and cleaning blades 415a to 415d. Into the development units 404a to 404d can be supplied four color toners (black, yellow, magenta, cyan) received in toner cartridges 405a to 405d, respectively. The primary transferring rolls 410a to 410d come in contact with the electrophotographic photoreceptors 401a to 401d, respectively, via the intermediate transferring belt 409.

Further, a laser source (exposure device) 403 is disposed in a predetermined position in the housing 400. In this arrangement, laser beam emitted by the laser source 403 can be applied to the surface of the electrophotographic photoreceptors 401a to 401d which have been charged. In this arrangement, various steps of charging, exposure, development, primary transferring and cleaning are sequentially effected at the step of rotation of the electrophotographic photoreceptors 401a to 401d so that the various color toner images are laminated on each other on the intermediate transferring belt 409.

The intermediate transferring belt 409 is supported on a driving roll 406, a backup roll 408 and a tension roll 407 with a predetermined tension. In this arrangement, when these rolls rotate, the intermediate transferring belt 409 can move without sagging. A secondary transferring roll 413 is disposed in contact with the backup roll 408 via the intermediate transferring belt 409. The intermediate transferring belt 409 which has passed through the gap between the backup roll 408 and the secondary transferring roll 413 is cleaned on the surface thereof by, e.g., a cleaning blade 416 disclosed in the vicinity of the driving roll 406, and then repeatedly used for the subsequent image formation process.

Further, a tray (transferring medium tray) 411 is provided in a predetermined position in the housing 400. In this manner, a transferring medium 500 such as paper in the tray 411 is sequentially delivered by a transferring roll 412 to the gap between the intermediate transferring belt 409 and the secondary transferring roll 413 and to the gap between two fixing rolls 414 which come in contact with each other, and then discharged out of the housing 400.

While the aforementioned description has been made with reference to the case where as the intermediate transferring material there is used the intermediate transferring belt 409, the intermediate transferring material may be in the form of belt as in the intermediate transferring belt 409 or in the form of drum.

In the case where the intermediate transferring material is in the form of belt, as the resin material to be used as the substrate, there may be used any known resin. Examples of the resin employable herein include resin materials such as polyimide resin, polycarbonate resin (PC), polyvinylidene fluoride (PVDF), polyalkylene terephthalate (PAT), blend material of ethylene tetrafluoroethylene copolymer (ETFE)/PC, ETFE/PAT and PC/PAT, polyester, polyether ether ketone and polyamide, and resin materials mainly composed of these resin materials. Further, resin materials and elastic materials may be blended.

Examples of the elastic material employable herein include polyurethanes, chlorinated polyisoprenes, NBR, chloropyrene rubbers, EPDM, hydrogenated polybutadienes, butyl rubbers, and silicone rubbers. These elastic materials may be used singly. Alternatively, a material obtained by blending two or more of these elastic materials may be used. The resin material and elastic material to be used as substrate may comprise electrically-conductive agents or ionically-conducting agents incorporated therein singly or in combination of two or more thereof as necessary. Preferred among these compounds is polyimide resin having an electrically-conductive agent dispersed therein because of excellent mechanical strength. As the aforementioned electrically-conductive agent, there may be used carbon black, metal oxide or electrically-conductive polymer such as polyaniline. In the case whereas the intermediate transferring material there is used a belt-shaped structure such as intermediate transferring belt 409, the thickness of the belt is preferably from 50 µm to 500 µm, more preferably from 60 µm to 150 µm. However, the thickness of the belt may be properties predetermined according to the hardness of the belt material.

Referring to the process for the production of the intermediate transferring belt 409, in the case where a belt made of a polyimide resin having an electrically conducting agent dispersed is produced, carbon black is dispersed in a solution of a polyamidic acid which is a polyimide precursor as an electrically conducting agent in an amount of from 5 to 20% by weight as disclosed in JP-A-63-311263. The dispersion is casted onto the metallic drum where it is then dried. The film thus formed is peeled off the drum, and then stretched at high temperature to form a polyimide film which is then cut into a proper size as an endless belt.

The aforementioned film formation is normally carried out by injecting a film-forming stock solution of polyamidic acid having an electrically conducting agent dispersed therein into a cylindrical mold while being heated to a temperature of from 100° C. to 200° C. and rotated at a rotary speed of from 500 to 2,000 rpm to cause centrifugal molding by which it is formed into a film, releasing the film from the mold while kept semi-hardened, putting the film onto an iron core, and then subjecting the film to polyimidization reaction (ring-closing reaction of polyamidic acid) at a temperature as high as 300° C. or more to finish hardening. Alternatively, the film-forming stock solution may be casted over a metallic sheet to a uniform thickness, heated to a temperature of from 100° C. to 200° C. as described above to remove the majority of the solvent, and then stepwise heated to a temperature as high as 300° C. to form a polyimide film. The intermediate transferring material may have a surface layer.

In the case where as the intermediate transferring material there is used a drum-shaped intermediate transferring material, as the substrate there is preferably used a cylindrical substrate formed by aluminum, stainless steel (SUS), copper or the like. The cylindrical substrate may be coated with an elastic layer on which a surface layer is formed as necessary.

In general, in the case where the intermediate transferring material is used, a potential is applied to the surface of the electrophotographic photoreceptor via the intermediate transferring material. Therefore, the residual potential present in the photosensitive layer is affected, causing the occurrence of image quality defects such as ghost (phenomenon involving the appearance of an image at a cycle in the subsequent cycle) in the subsequent cycle in the electrophotographic process. However, in the electrophotographic photoreceptor of the invention, the charge-generating layer contains little hydroxygallium phthalocyanine pigment particles out of shape which cause the retention of charge. Therefore, the aforementioned image quality defects can difficultly occur. Thus, the electrophotographic photoreceptor of the invention can be used in combination with the intermediate transferring material to advantage.

The material to be transferred to be used in the invention is not specifically limited so far as it is a medium capable of transferring the toner image formed on the electrophotographic photoreceptor. For example, the term "material to be transferred" as used herein is meant to indicate the medium to be transferred in the case where the toner image is transferred directly from the electrophotographic photoreceptor to the medium to be transferred such as paper or is meant to indicate an intermediate transfer material in a case where the intermediate transferring material is used.

Figure 5:
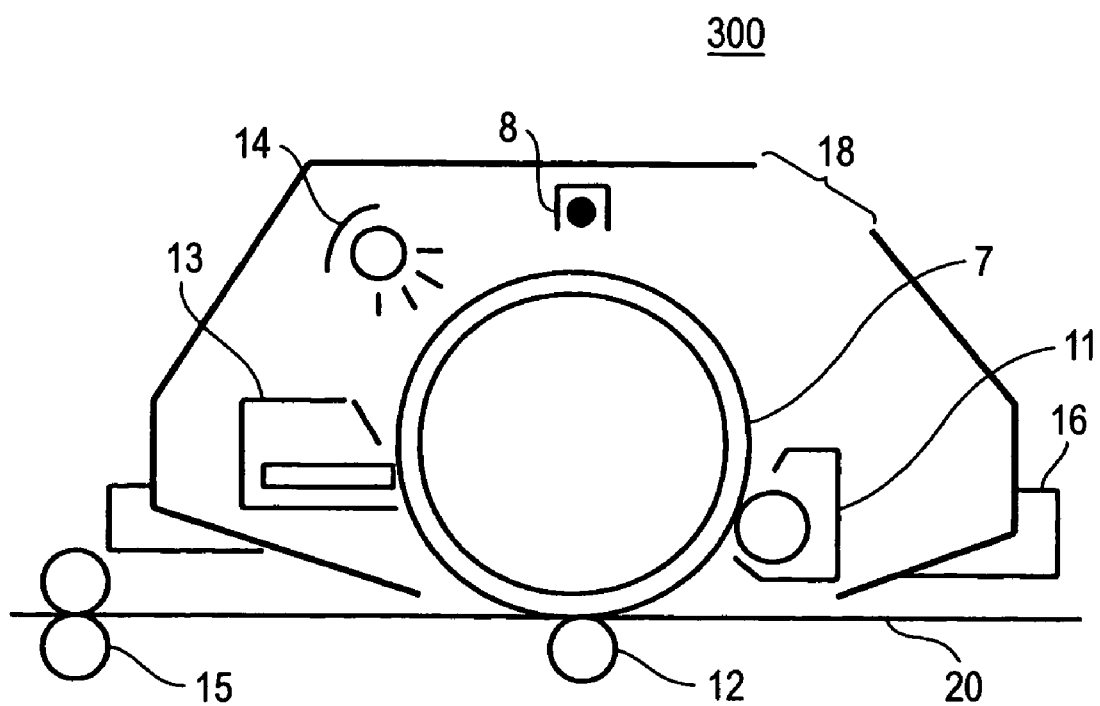
FIG. 5 is a sectional view schematically illustrating the basic configuration of a preferred embodiment of implementation of the process cartridge of the invention.

FIG. 5 is a sectional view schematically illustrating the basic configuration of a preferred embodiment of implementation of the process cartridge of the invention. The process cartridge 300 comprises a charging unit 8, a development unit 11, a cleaning unit 13, an opening 18 for exposure and a discharger 14 integrally combined with the electrophotographic photoreceptor 7 of the invention using a mounting rail 16. The process cartridge 300 can be attached to and detached from the main body of the electrophotographic device comprising a transferring unit 12, a fixing device 15 and other constituents which are not shown. The process cartridge 300 forms the electrophotographic device with the main body of the electrophotographic device.

Figure 29:
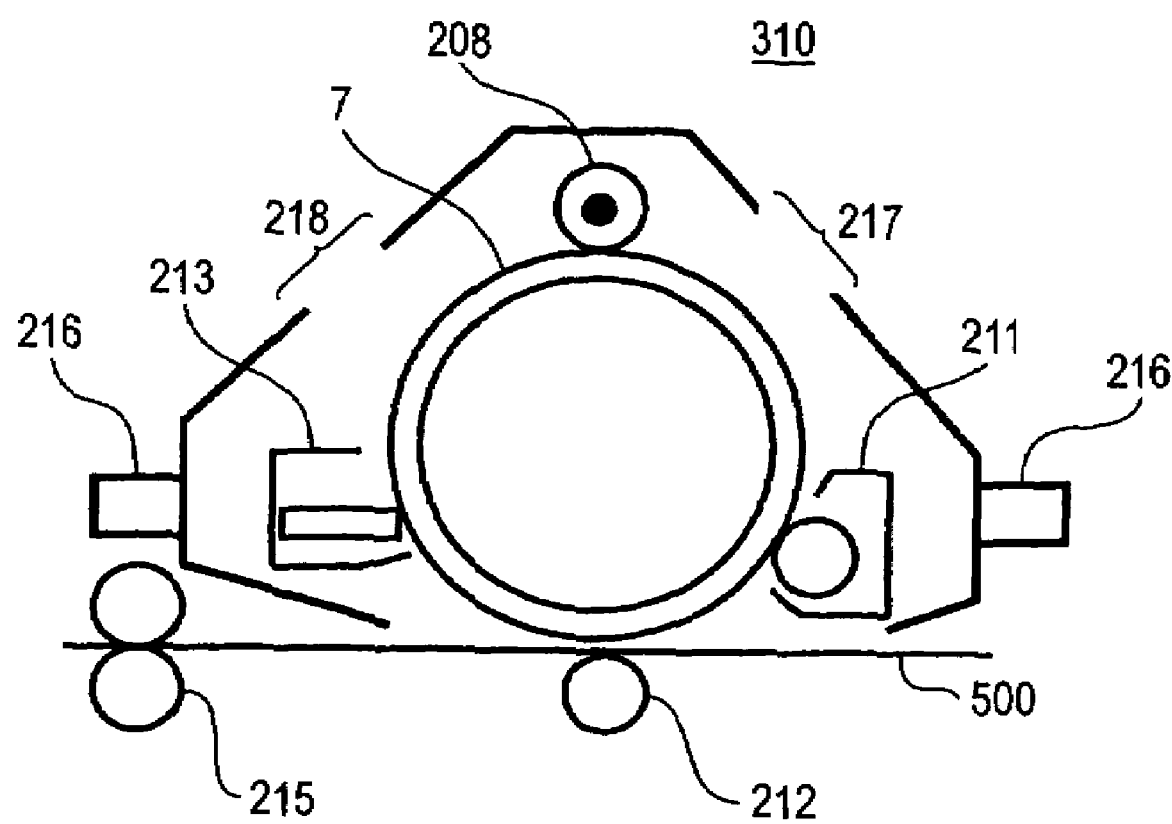
FIG. 29 is a sectional view schematically illustrating the basic configuration of another preferred embodiment of implementation of the process cartridge of the invention.

FIG. 29 is a sectional view schematically illustrating the basic configuration of another preferred embodiment of implementation of the process cartridge of the invention. As shown in FIG. 29, the process cartridge 310 comprises a charging unit 208, a development unit 211, a cleaning device (cleaning unit) 213, an opening 218 for exposure and an opening 217 for discharge exposure 217 integrally combined with the electrophotographic photoreceptor 7 of the invention using a mounting rail 216. The process cartridge 310 can be attached to and detached from the main body of the electrophotographic device comprising a transferring unit 212, a fixing device 215 and other constituents which are not shown. The process cartridge 300 forms the electrophotographic device with the main body of the electrophotographic device.

The electrophotographic device and process cartridge of the invention described above are provided with an electrophotographic photoreceptor comprising the hydroxygallium phthalocyanine pigment of the invention, making it possible to obtain a stabilized image quality over an extended period of time without causing any image quality defects.

(Image Formation Process)

The image formation process of the invention comprises a charging step of charging the electrophotographic photoreceptor of the invention, an exposure step of forming an electrostatic latent image on the electrophotographic photoreceptor, a development step of developing the electrostatic latent image formed on the electrophotographic photoreceptor with a toner to form a toner image and a transferring step of transferring the toner image onto a transferring material.

The charging step, exposure step, development step and transferring step are steps of charging by the charging unit 8, exposure by the exposure unit 10, development by the development unit 11 and transferring by the transferring unit 12, respectively, in the electrophotographic device 200 of the invention. In accordance with the image formation process, the use of the electrophotographic photoreceptor comprising the hydroxygallium phthalocyanine pigment of the invention makes it possible to obtain sufficient sensitivity, chargeability and dark decay properties. Thus, an image having a stabilized quality can be formed over an extended period of time without causing image quality defects such as fogging, black spot and white spot.

The image formation process of the invention is preferably characterized in that the surface of the electrophotographic photoreceptor is charged in such a manner that the charging potential is controlled so that the charging potential after predetermined times of the repetition of an electrophotographic process comprising charging by the charging unit, exposure by the exposure unit, development by the development unit and transfer by the transferring unit is lower than the charging potential in the first cycle of the electrophotographic process.

Figure 27B:
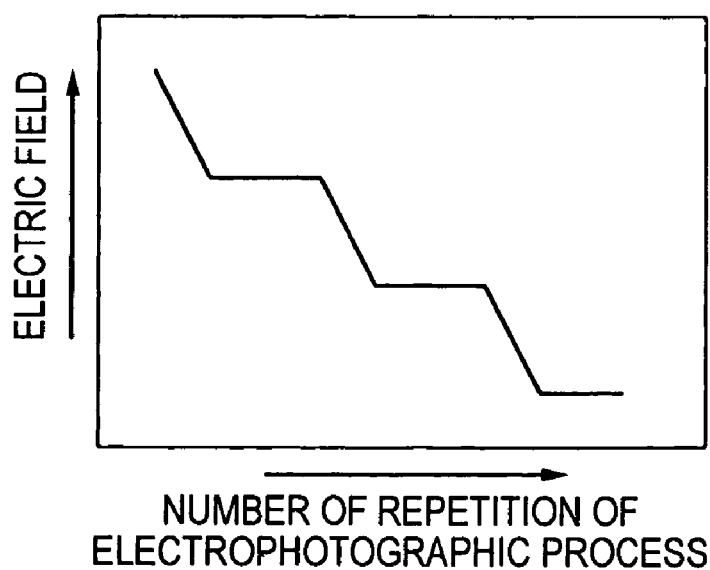

The aforementioned charging step may be effected by the method described above in connection with FIGS. 26 and 27. By thus effecting the charging step, the intensity of the electric field applied to the photosensitive layer can be predetermined within a predetermined range, making it possible to form an image having a stabilized quality over a longer period of time without causing image quality defects such as density drop.

In the image formation process of the invention, the aforementioned exposure step involves the formation of an electrostatic latent image on the electrophotographic photoreceptor between the time at which the electrophotographic photoreceptor in stationary state is actuated and the time at which the electrophotographic photoreceptor has completed one rotation.

By thus effecting the exposure step, the time for idle rotation can be eliminated, making it possible to sufficiently reduce FCOT. Further, the use of the hydroxygallium phthalocyanine pigment of the invention makes it possible to obtain a good image quality sufficiently free from the occurrence of ghost.

EXAMPLE

The invention will be further described in the following examples and comparative examples, but the invention should not be construed as being limited thereto. In the case where an electrophotographic process is effected in the following examples, image exposure is effected after several idle rotations of the electrophotographic photoreceptor unless otherwise specified.

Synthesis Example 1

[Synthesis of I Type Hydroxygallium Phthalocyanine]

30 parts by weight of 1,3-diiminoisoindoline and 9.1 parts by weight of gallium trichloride are added to 230 parts by weight of dimethyl sulfoxide. The mixture is then reacted at 160° C. with stirring for 6 hours to obtain a reddish purple crystal. The crystal thus obtained is washed with dimethyl sulfoxide, washed with ion-exchanged water, and then dried to obtain 28 parts by weight of a crude crystal of an I type chlorogallium phthalocyanine.

Subsequently, a solution obtained by thoroughly dissolving 10 parts by weight of the crude crystal of the I type chlorogallium phthalocyanine thus obtained in 300 parts by weight of sulfuric acid (concentration: 97%) which had been heated to 60° C. is added dropwise to a mixture of 600 parts by weight of a 25% aqueous ammonia and 200 parts by weight of ion-exchanged water to cause crystallization of hydroxygallium phthalocyanine. The crystal thus obtained is collected by filtration, washed with ion-exchanged water, and then dried to obtain 8 parts by weight of I type chlorogallium phthalocyanine pigment.

Figure 6:
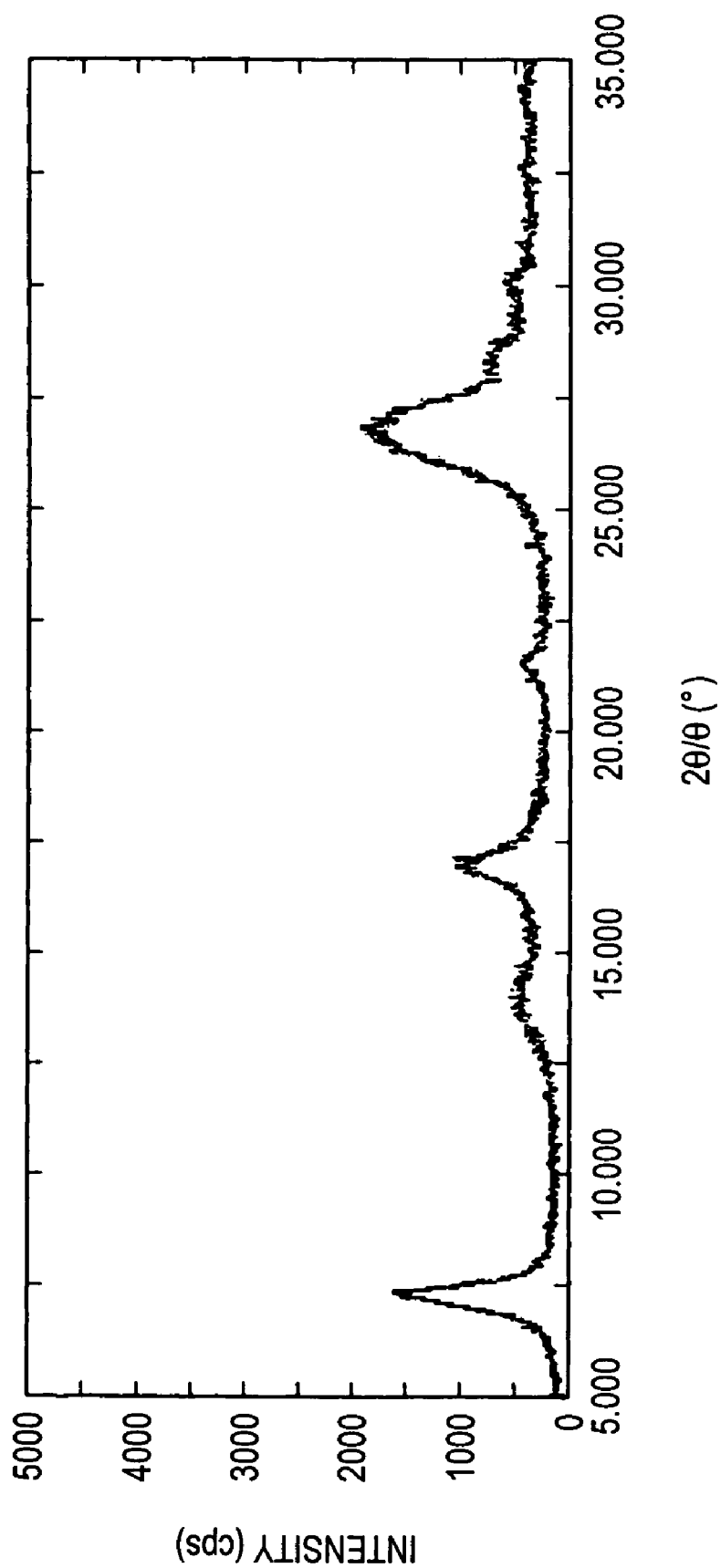
FIG. 6 is a powder X-ray diffraction pattern of I type hydroxygallium phthalocyanine pigment synthesized in examples.

The I type chlorogallium phthalocyanine pigment thus obtained is then subjected to X-ray diffraction spectroscopy. The results are shown in FIG. 6. The X-ray diffraction spectroscopy in the present example is conducted by a powder method using CuKα characteristic X-ray under the following conditions.

Measuring instrument used: X-ray diffraction device "Miniflex", produced by Rigaku Corporation
X-ray tube: Cu
Tube current: 15 mA
Scanning speed: 5.0 deg/min
Sampling interval: 0.02 deg.
Starting angle (2θ): 5 deg.
Stop angle (2θ): 35 deg.
Stepping angle (2θ): 0.02 deg.

Example 1

6 parts by weight of the I type chlorogallium phthalocyanine pigment obtained in Synthesis Example 1 are subjected to wet grinding together with 90 parts by weight of N,N-dimethyl formamide and 350 parts by weight of spherical glass media having an outer diameter of 0.9 mm using a glass ball mill at 25° C. for 48 hours. During this procedure, the progress of crystal transformation is monitored by the measurements of absorption wavelength of the wet-grinding process solution to confirm that the maximum peak wavelength ($\lambda_{MAX}$) of the hydroxygallium phthalocyanine pigment after subjected to wet grinding step in optical absorption spectrum in a wavelength range of from 600 nm to 900 nm is 827 nm.

Figure 7:
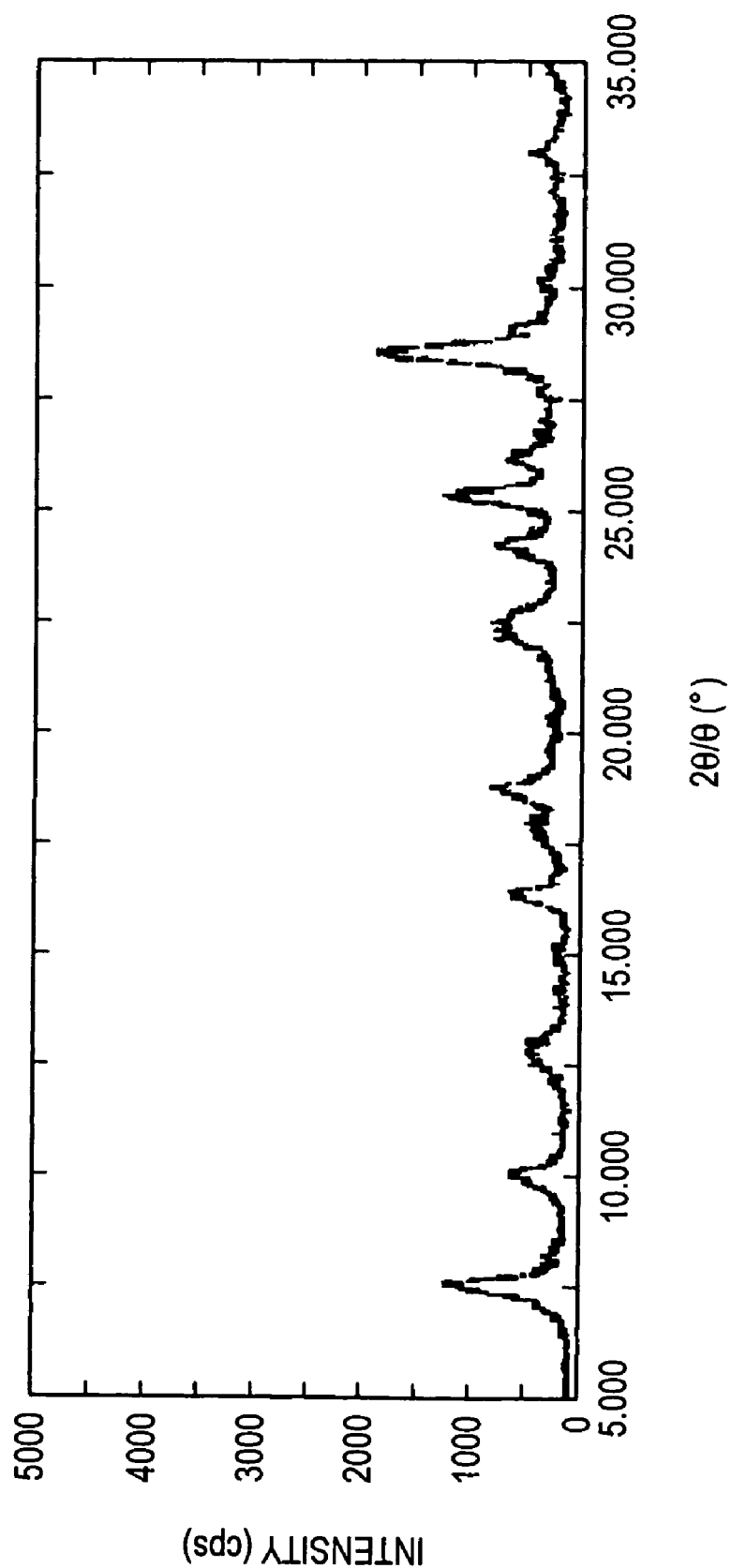
FIG. 7 is a powder X-ray diffraction pattern of hydroxygallium phthalocyanine pigment prepared in Example 1.
Figure 12:
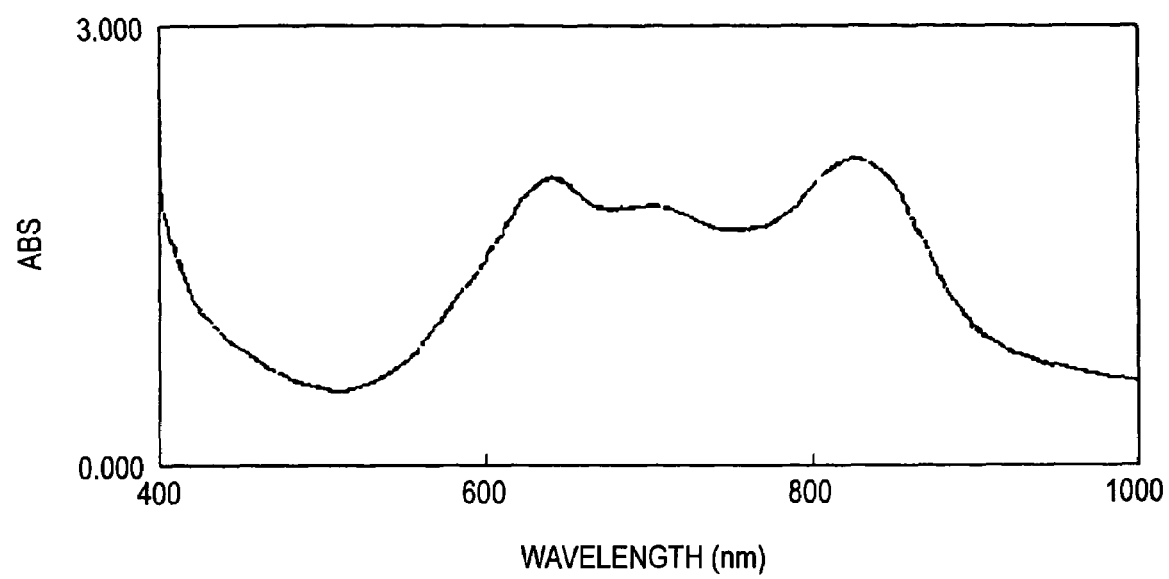
FIG. 12 is optical absorption spectrum of hydroxygallium phthalocyanine pigment prepared in Example 1.
Figure 19:
FIG. 19 is a transmission electron microphotograph of hydroxygallium phthalocyanine pigment prepared in Example 1.

Subsequently, the crystal thus obtained is washed with acetone, and then dried to obtain 5.5 parts by weight of a hydroxygallium phthalocyanine pigment having diffraction peaks at positions of 7.5°, 9.9°, 12.5°, 16.3°, 18.6°, 25.1° and 28.3° in a Bragg angle (2θ±0.2°) of X-ray diffraction spectrum using CuKα characteristic X-ray. X-ray diffraction spectrum, optical absorption spectrum and transmission electron microphotograph of the hydroxygallium phthalocyanine pigment thus obtained are shown in FIGS. 7, 12 and 19, respectively.

The measurement of optical absorption spectrum is conducted by a liquid cell method with acetone using a Type U-2000 spectrophotometer (produced by Hitachi, Limited). The crystalline state of the hydroxygallium phthalocyanine pigment thus obtained is observed using a Type H-9000 transmission electron microscope (produced by Hitachi, Limited).

Example 2

Figure 8:
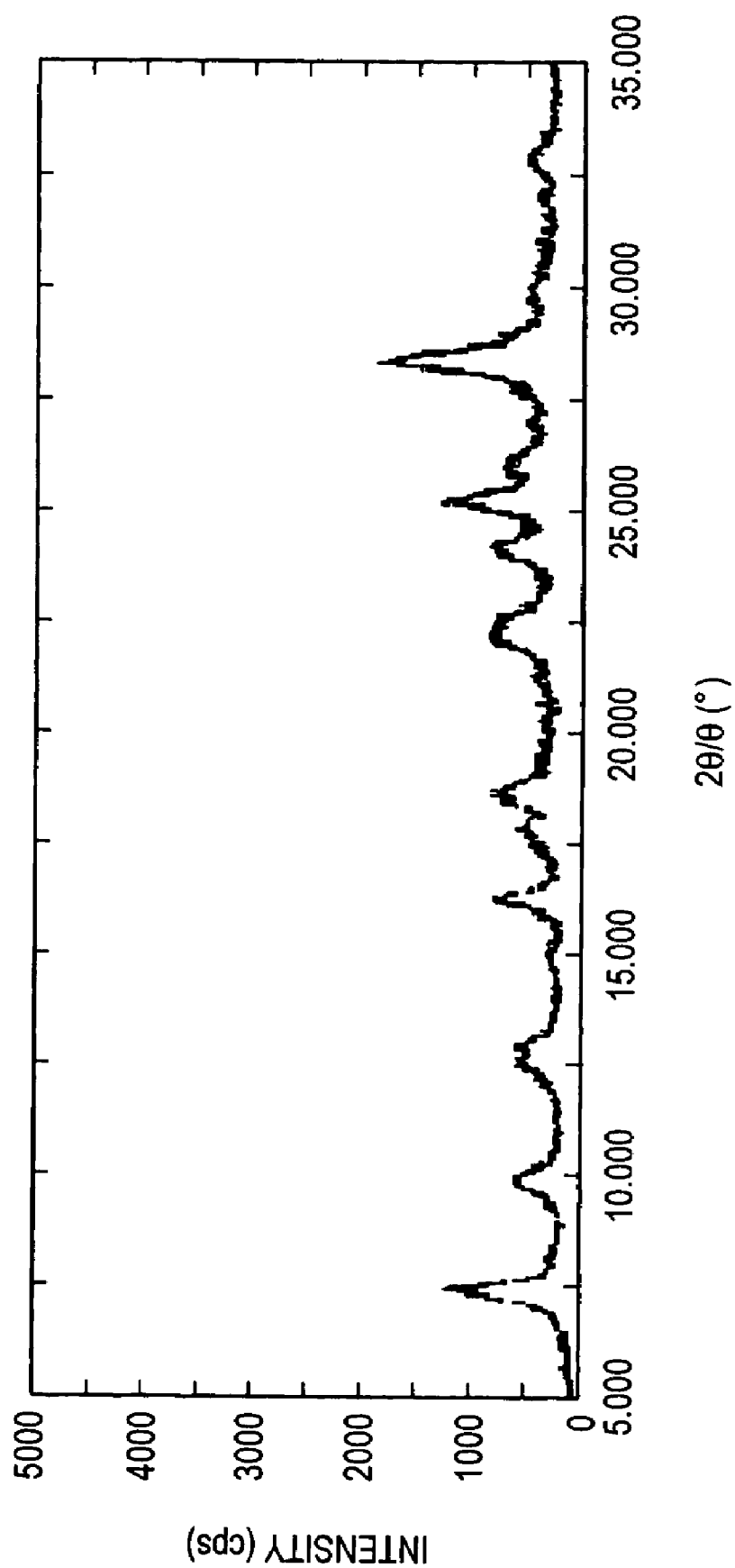
FIG. 8 is a powder X-ray diffraction pattern of hydroxygallium phthalocyanine pigment prepared in Example 2.
Figure 13:
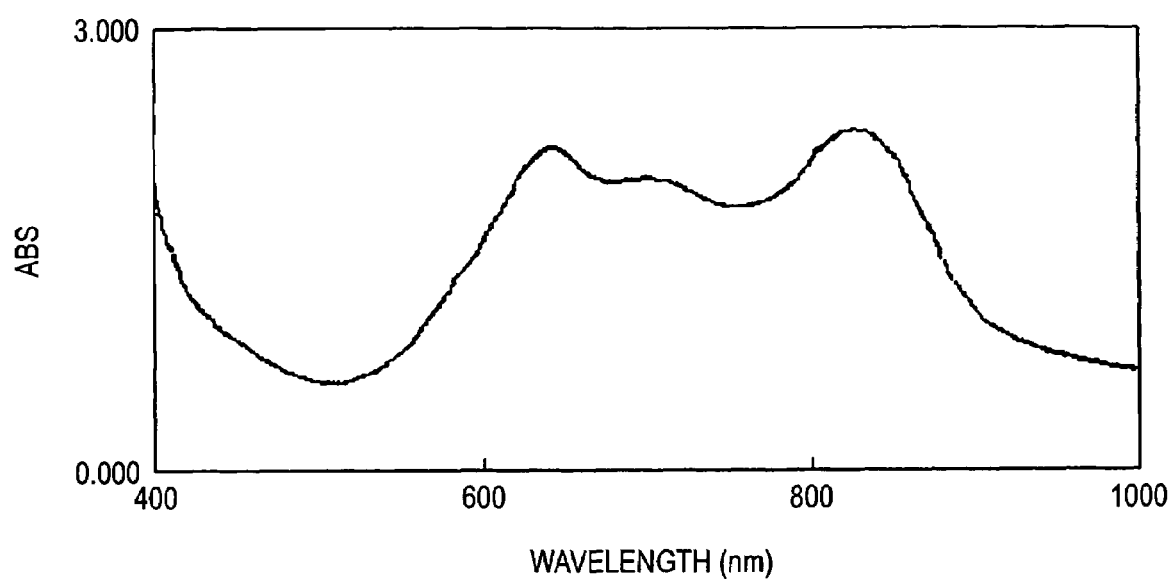
FIG. 13 is optical absorption spectrum of hydroxygallium phthalocyanine pigment prepared in Example 2.
Figure 20:
FIG. 20 is a transmission electron microphotograph of hydroxygallium phthalocyanine pigment prepared in Example 2.

The procedure of Example 1 is followed except that the wet grinding time is changed from 48 hours to 96 hours. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment wet-ground in optical absorption spectrum in a wavelength range of from 600 nm to 900 nm during the monitoring of the progress of crystal transformation after the wet-grinding step is 825 nm. X-ray diffraction spectrum, optical absorption spectrum and transmission electron microphotograph of the hydroxygallium phthalocyanine pigment thus obtained are shown in FIGS. 8, 13 and 20, respectively.

Example 3

Figure 9:
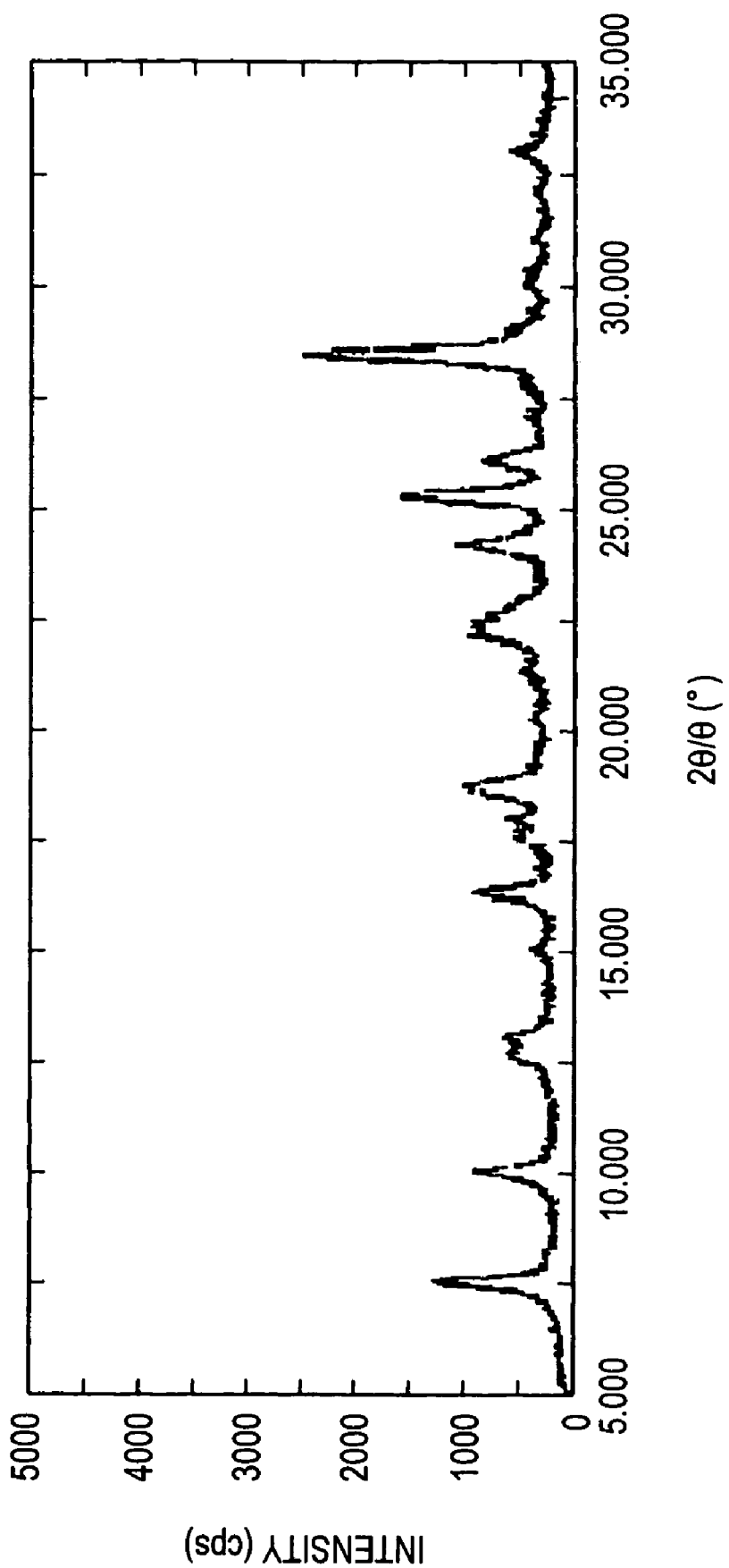
FIG. 9 is a powder X-ray diffraction pattern of hydroxygallium phthalocyanine pigment prepared in Example 3.
Figure 14:
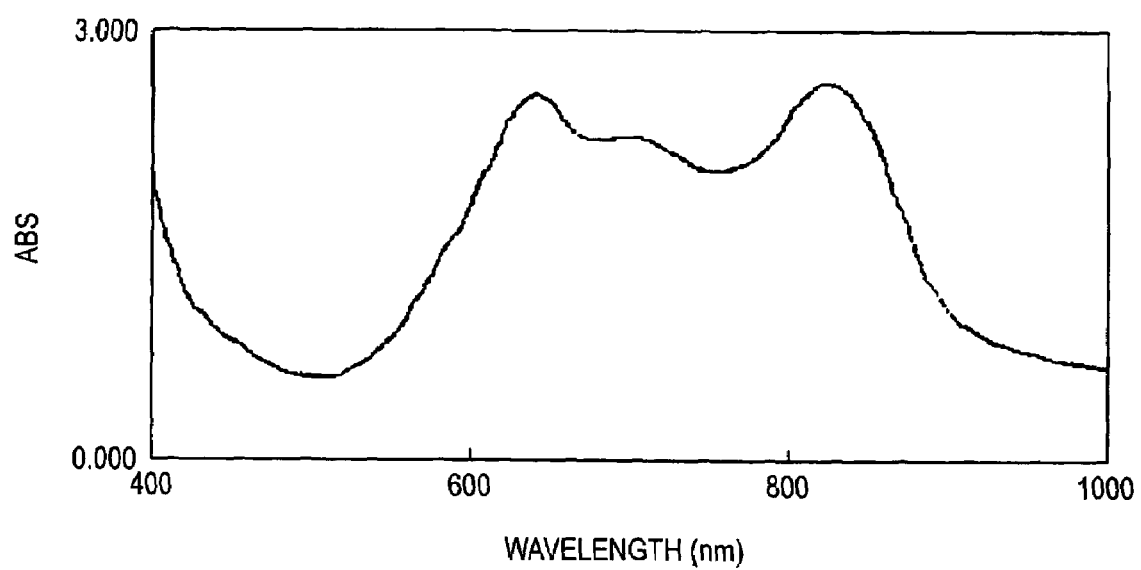
FIG. 14 is optical absorption spectrum of hydroxygallium phthalocyanine pigment prepared in Example 3.
Figure 21:
FIG. 21 is a transmission electron microphotograph of hydroxygallium phthalocyanine pigment prepared in Example 3.

The procedure of Example 1 is followed except that the wet grinding time is changed from 48 hours to 192 hours. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 819 nm. X-ray diffraction spectrum, optical absorption spectrum and transmission electron microphotograph of the hydroxygallium phthalocyanine pigment thus obtained are shown in FIGS. 9, 14 and 21, respectively.

Example 4

The procedure of Example 1 is followed except that 350 parts by weight of spherical glass media having an outer diameter of 2.0 mm are used instead of 350 parts by weight of spherical glass media having an outer diameter of 0.9 mm. As a result, 5.5 parts by weight of a hydroxygallium phthalocyanine pigment satisfying the requirements for diffraction peak in X-ray diffraction spectrum as defined in Example 1 are obtained. The maximum peak wavelength ($\mu_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 827 nm. The hydroxygallium phthalocyanine pigment showed almost the same X-ray diffraction spectrum and optical absorption spectrum as in Example 1.

Example 5

The procedure of Example 1 is followed except that 400 parts by weight of spherical glass media having an outer diameter of 0.3 mm are used instead of 350 parts by weight of spherical glass media having an outer diameter of 0.9 mm, and the amount of N,N-dimethyl formamide used is changed from 90 parts by weight to 120 parts by weight. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 826 nm. The hydroxygallium phthalocyanine pigment showed almost the same X-ray diffraction spectrum and optical absorption spectrum as in Example 1.

Example 6

Wet grinding is effected in the same manner as in Example 1. The crystal thus obtained is then washed with 300 parts by weight of acetone over a ceramic filter having a pore size of 1.0 μm (UF-wound ceramic filter produced by NGK INSULATORS, LTD.). Subsequently, the crystal is heat-dried at 80° C. for 24 hours in an optically shielded dryer (Type DFB, produced by Irie Shokai K. K.) and then heat-dried at 110° C. under a pressure of 0.01 mmHg for 2 hours in an optically shielded vacuum dryer (Type DP61, produced by Yamato Scientific Co., Ltd.) to obtain 5.5 parts by weight of a hydroxygallium phthalocyanine pigment satisfying the requirements for diffraction peak in X-ray diffraction spectrum as defined in Example 1. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 823 nm. The hydroxygallium phthalocyanine pigment showed almost the same X-ray diffraction spectrum and optical absorption spectrum as in Example 1.

Example 7

Figure 15:
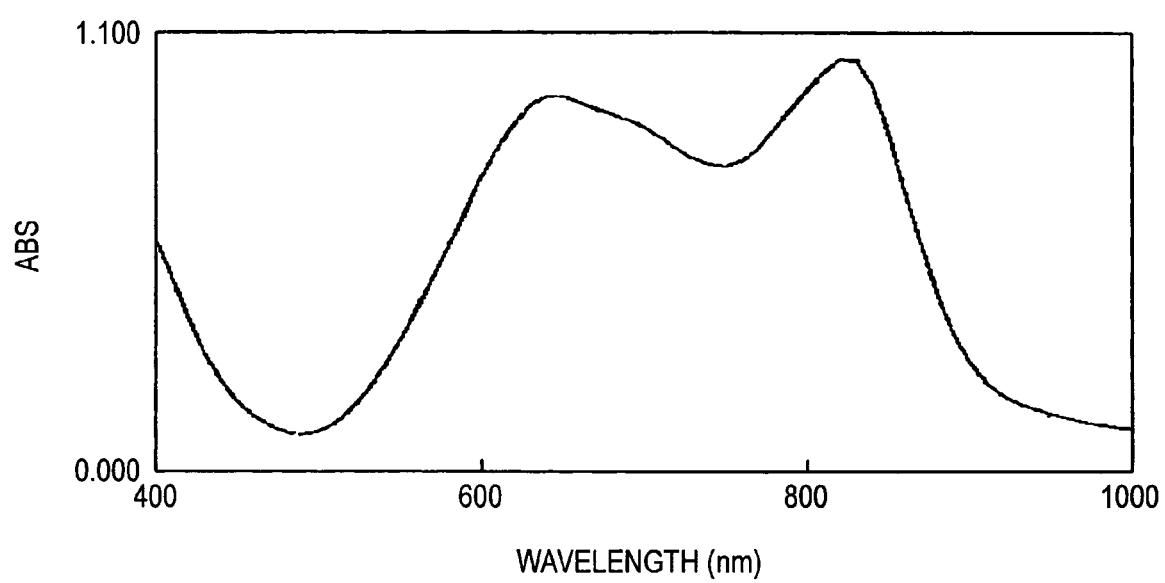
FIG. 15 is optical absorption spectrum of hydroxygallium phthalocyanine pigment prepared in Example 7.

The wet grinding procedure of Example 1 is followed except that 350 parts by weight of spherical glass media having an outer diameter of 1.0 mm are used instead of 350 parts by weight of spherical glass media having an outer diameter of 0.9 mm. The crystal thus obtained is then washed with 300 parts by weight of acetone over a ceramic filter having a pore size of 1.0 μm. Subsequently, the crystal is heat-dried at 80° C. for 24 hours in an optically shielded dryer (Type DFB, produced by Irie Shokai K. K.) and then heat-dried at 110° C. under a pressure of −0.98 kPa for 2 hours in an optically shielded vacuum dryer (Type DP61, produced by Yamato Scientific Co., Ltd.) to obtain 5.5 parts by weight of a hydroxygallium phthalocyanine pigment satisfying the requirements for diffraction peak in X-ray diffraction spectrum as defined in Example 1. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 818 nm. The optical absorption spectrum of the hydroxygallium phthalocyanine pigment is shown in FIG. 15. The hydroxygallium phthalocyanine pigment thus obtained showed almost the same X-ray diffraction spectrum as in Example 1.

Example 8

The procedure of Example 7 is followed except that the heat drying temperature in the optically shielded vacuum dryer is changed from 110° C. to 150° C. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 821 nm. The hydroxygallium phthalocyanine pigment showed almost the same X-ray diffraction spectrum and optical absorption spectrum as in Example 1.

Example 9

The procedure of Example 7 is followed except that 350 parts by weight of spherical glass media having an outer diameter of 3.0 mm are used instead of 350 parts by weight of spherical glass media having an outer diameter of 1.0 mm. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 835 nm. The hydroxygallium phthalocyanine pigment showed almost the same X-ray diffraction spectrum and optical absorption spectrum as in Example 1.

Example 10

The procedure of Example 7 is followed except that the heat drying temperature in the optically shielded vacuum dryer is changed from 110° C. to 220° C. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 823 nm. The hydroxygallium phthalocyanine pigment showed almost the same X-ray diffraction spectrum and optical absorption spectrum as in Example 1.

Comparative Example 1

5 parts by weight of the I type chlorogallium phthalocyanine pigment obtained in Synthesis Example 1 are stirred at 25° C. with 80 parts by weight of N,N-dimethyl formamide in a glass stirring bath having an agitator for 48 hours. The maximum peak wavelength ($\lambda_{MAX}$) of the hydroxygallium phthalocyanine pigment thus stirred in optical absorption spectrum in a wavelength range of from 600 nm to 900 nm is 846 nm.

Figure 10:
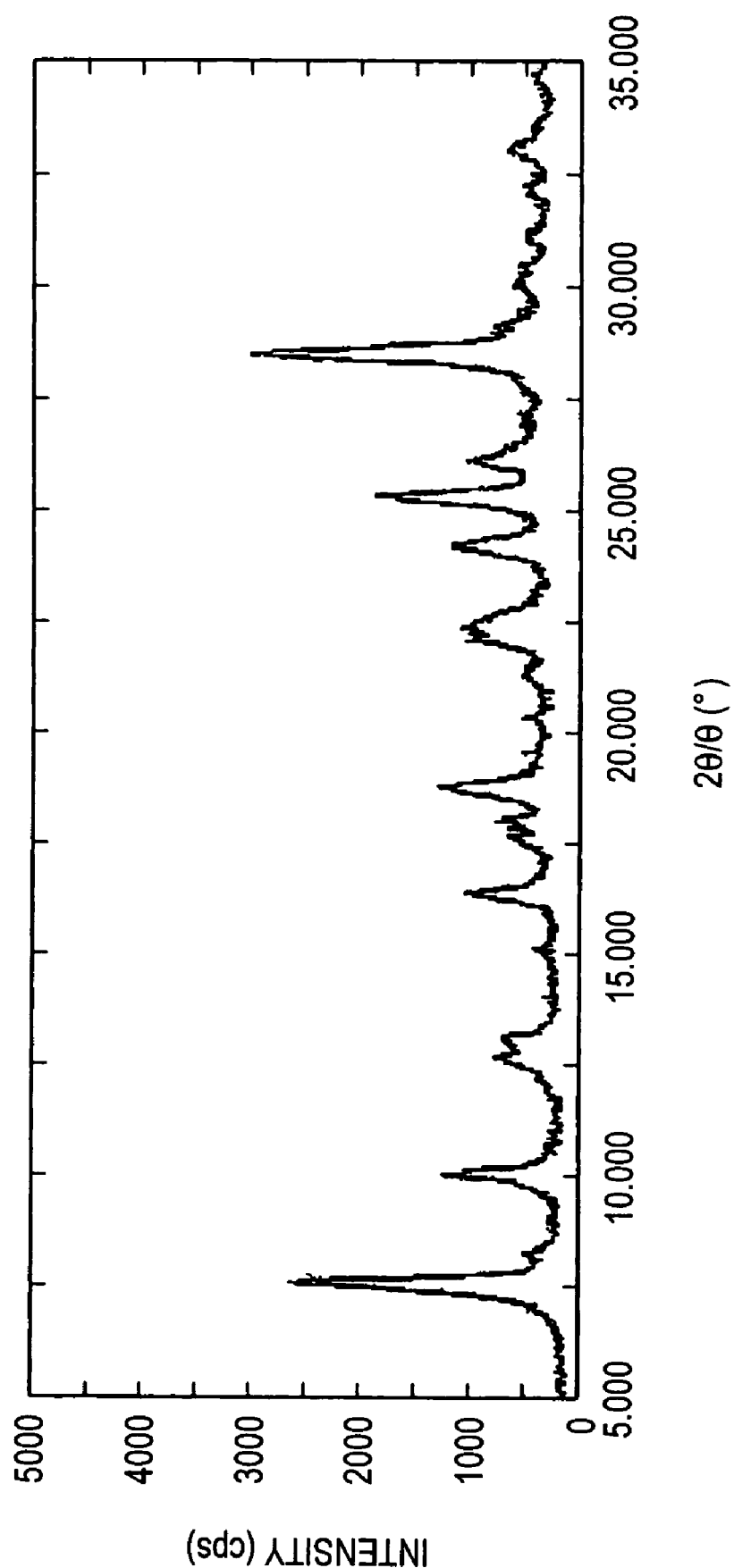
FIG. 10 is a powder X-ray diffraction pattern of hydroxygallium phthalocyanine pigment prepared in Comparative Example 1.
Figure 16:
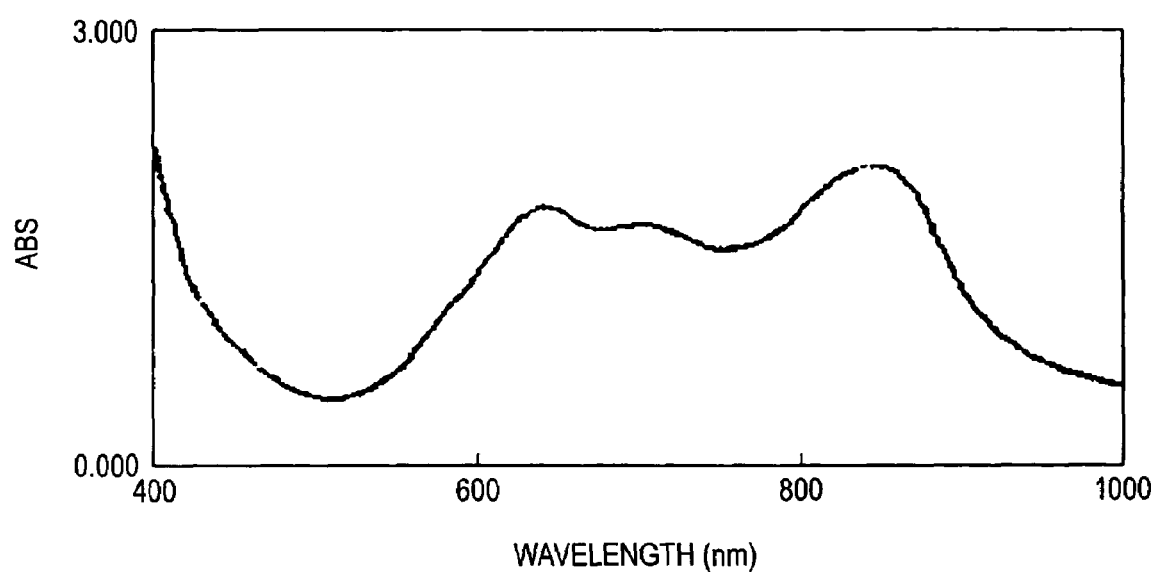
FIG. 16 is optical absorption spectrum of hydroxygallium phthalocyanine pigment prepared in Comparative Example 1.
Figure 22:
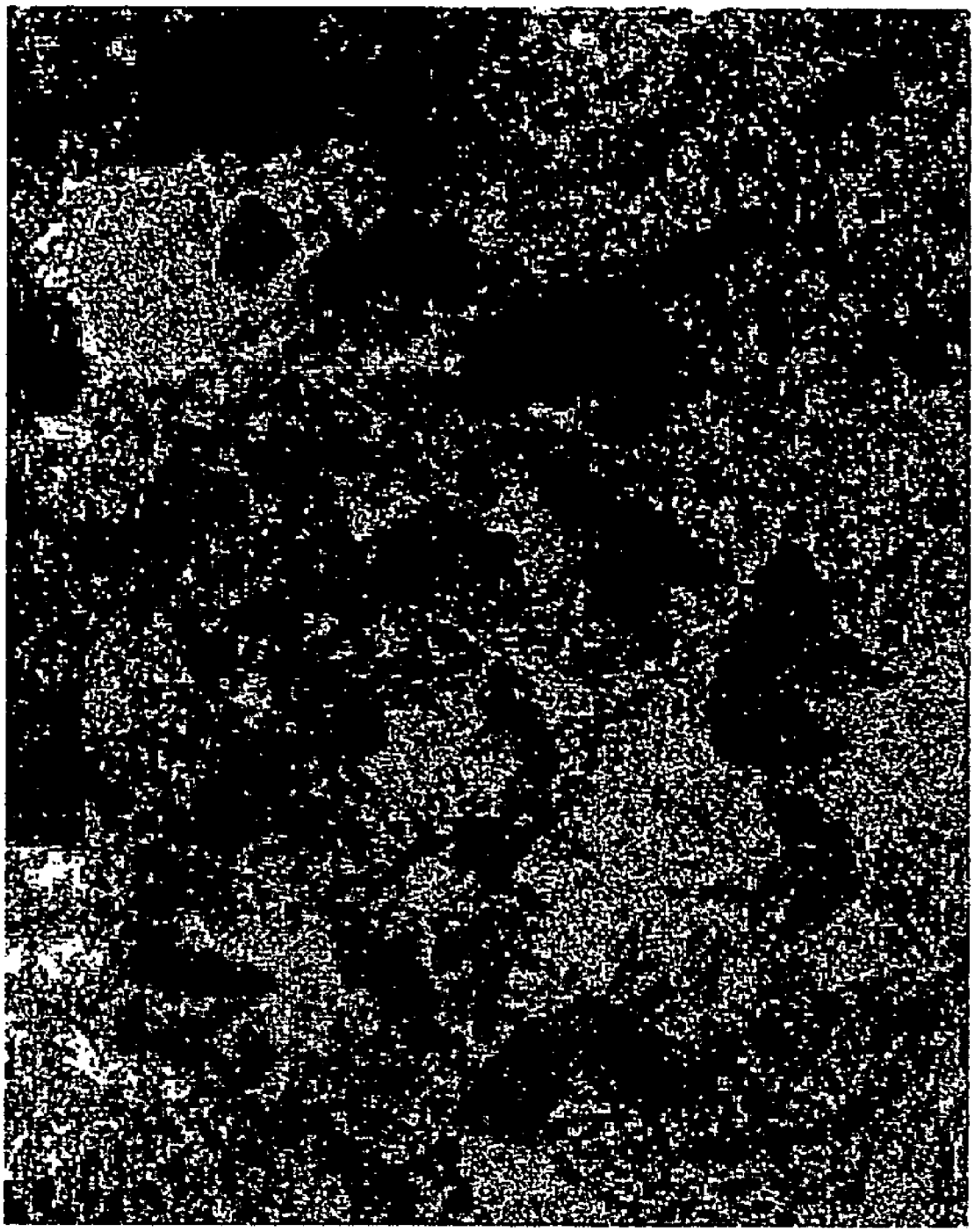
FIG. 22 is a transmission electron microphotograph of hydroxygallium phthalocyanine pigment prepared in Comparative Example 1.

Subsequently, the crystal thus obtained is washed with acetone, and then dried to obtain 5.5 parts by weight of a hydroxygallium phthalocyanine pigment having diffraction peaks at positions of of 7.5°, 9.9°, 12.5°, 16.3°, 18.6°, 25.1° and 28.3° in a Bragg angle (2θ±0.2°) of X-ray diffraction spectrum using CuKα characteristic X-ray. X-ray diffraction spectrum, optical absorption spectrum and transmission electron microphotograph of the hydroxygallium phthalocyanine pigment thus obtained are shown in FIGS. 10, 16 and 22, respectively.

Comparative Example 2

Figure 11:
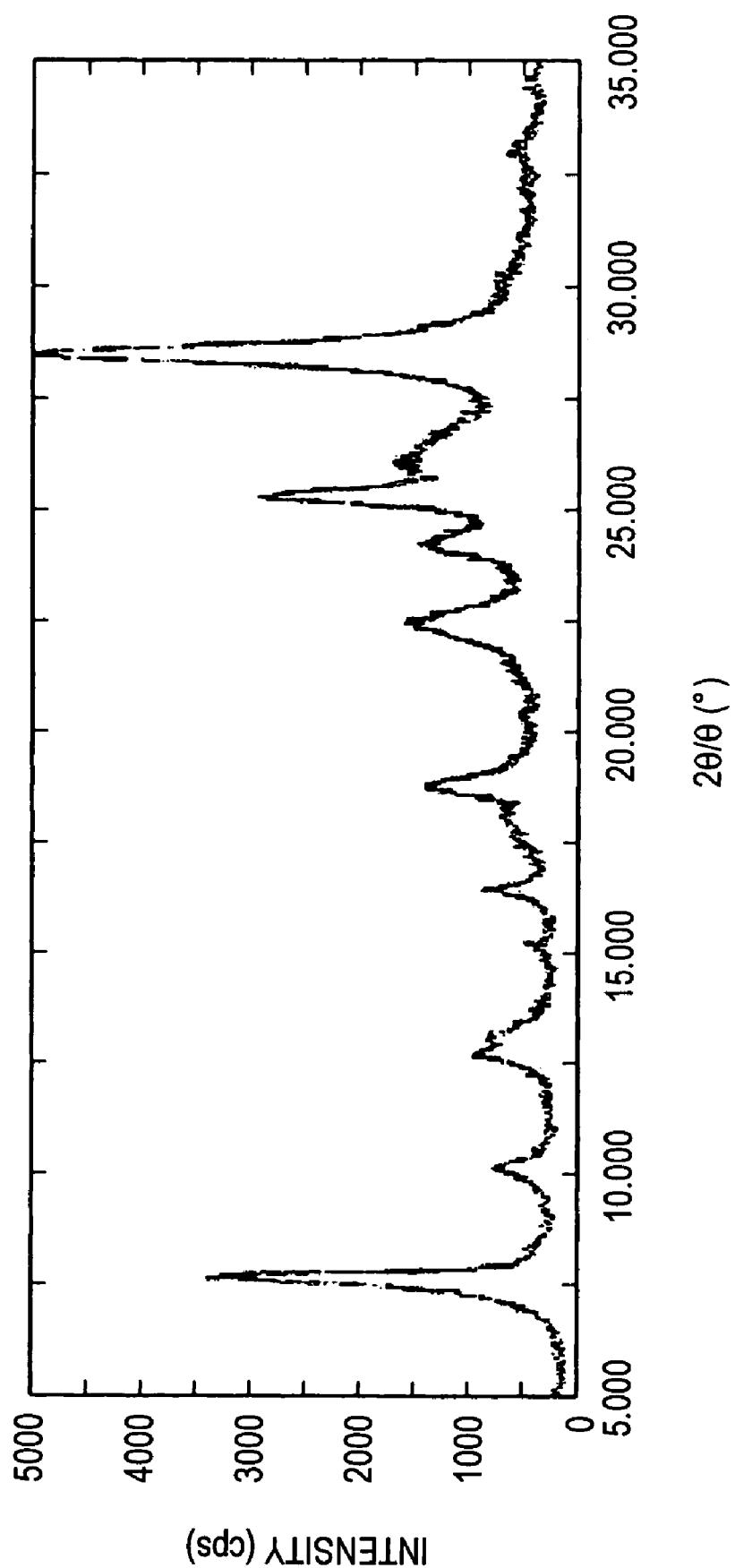
FIG. 11 is a powder X-ray diffraction pattern of hydroxygallium phthalocyanine pigment prepared in Comparative Example 2.
Figure 17:
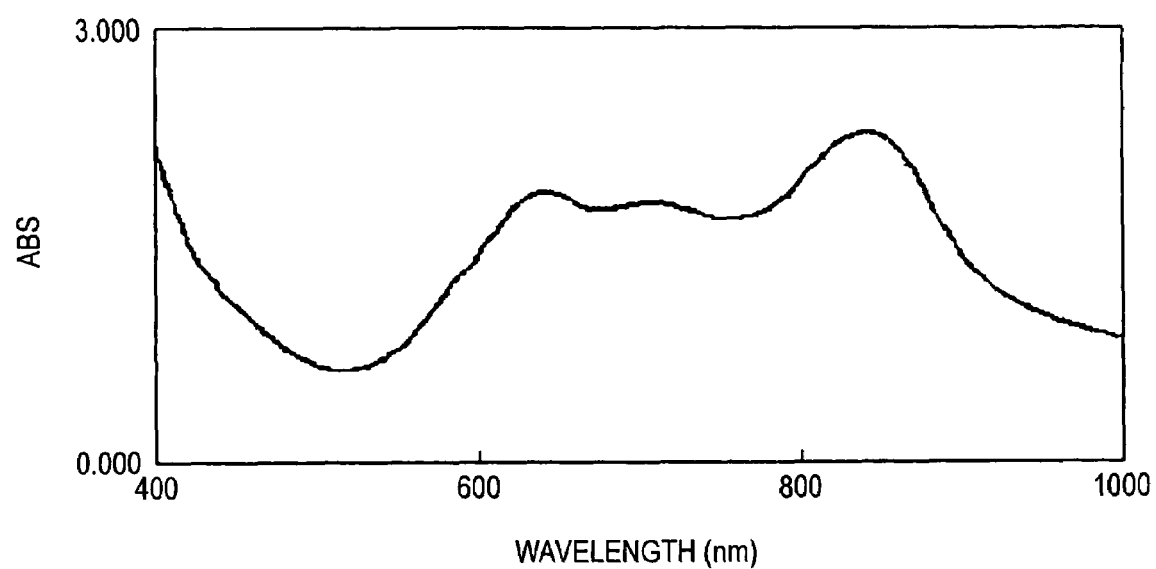
FIG. 17 is optical absorption spectrum of hydroxygallium phthalocyanine pigment prepared in Comparative Example 2.
Figure 23:
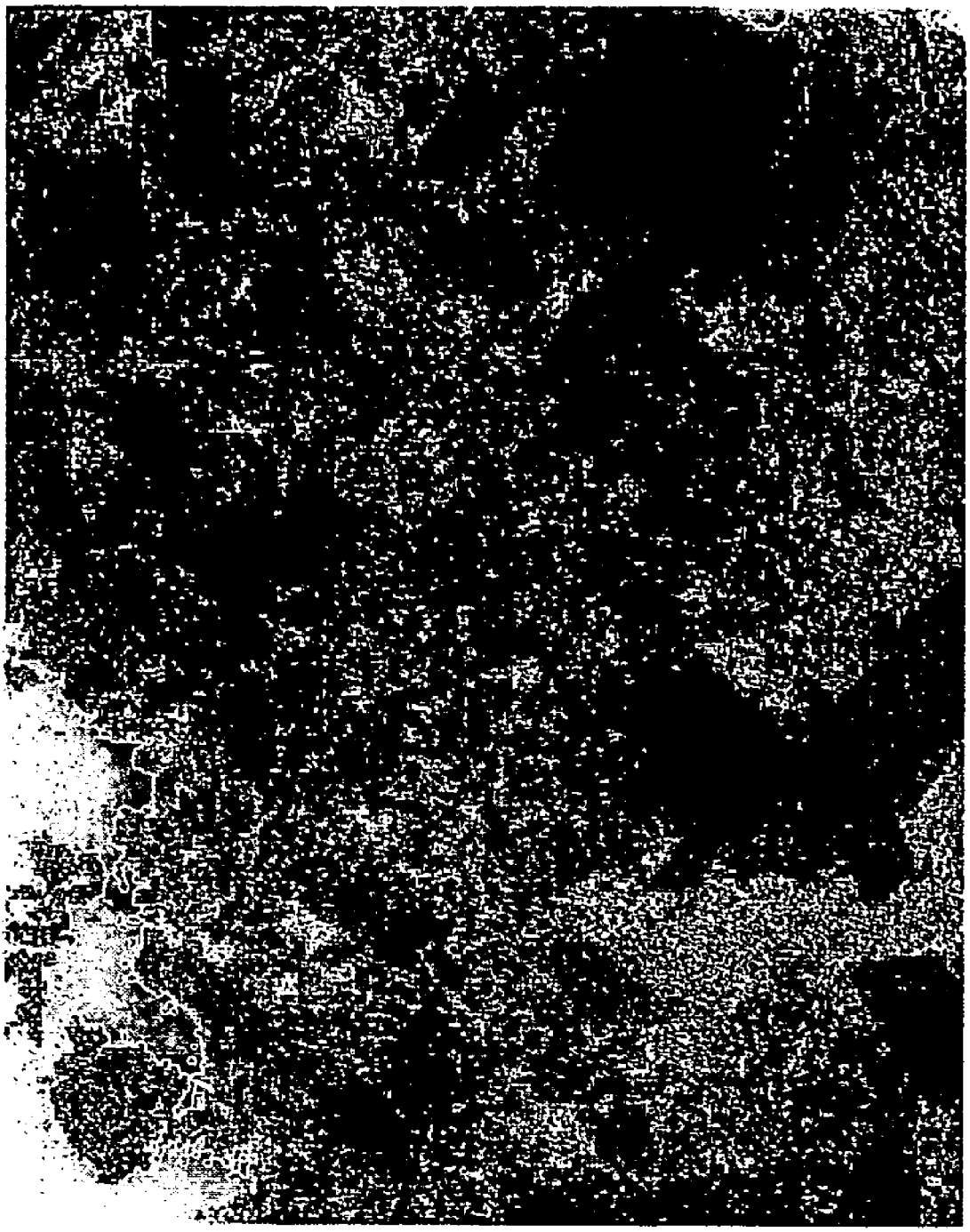
FIG. 23 is a transmission electron microphotograph of hydroxygallium phthalocyanine pigment prepared in Comparative Example 2.

The procedure of Example 1 is followed except that 350 parts by weight of spherical glass media having an outer diameter of 5.0 mm are used instead of 350 parts by weight of spherical glass media having an outer diameter of 0.9 mm. As a result, 5.5 parts by weight of a hydroxygallium phthalocyanine pigment satisfying the requirements for diffraction peak in X-ray diffraction spectrum as defined in Example 1 are obtained. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 845 nm. X-ray diffraction spectrum, optical absorption spectrum and transmission electron microphotograph of the hydroxygallium phthalocyanine pigment thus obtained are shown in FIGS. 11, 17 and 23, respectively.

Comparative Example 3

The wet grinding procedure of Example 1 is followed except that 350 parts by weight of spherical glass media having an outer diameter of 5.0 mm are used instead of 350 parts by weight of spherical glass media having an outer diameter of 0.9 mm. The crystal thus obtained is then washed with 300 parts by weight of acetone on a ceramic filter having a pore size of 1.0 μm. Subsequently, the crystal is heat-dried at 60° C. for 24 hours in an optically shielded dryer (Type DFB, produced by Irie Shokai K. K.) to obtain 5.5 parts by weight of a hydroxygallium phthalocyanine pigment satisfying the requirements for diffraction peak in X-ray diffraction spectrum as defined in Example 1. The maximum peak wavelength ($\lambda_{MAX}$) of the hydroxygallium phthalocyanine pigment after subjected to wet-grinding step in optical absorption spectrum in a wavelength range of from 600 nm to 900 nm during the monitoring of the progress of crystal transformation at the wet-grinding step is 842 nm. The hydroxygallium phthalocyanine pigment thus obtained showed almost the same X-ray diffraction spectrum and optical absorption spectrum as in Comparative Example 2.

Comparative Example 4

Figure 18:
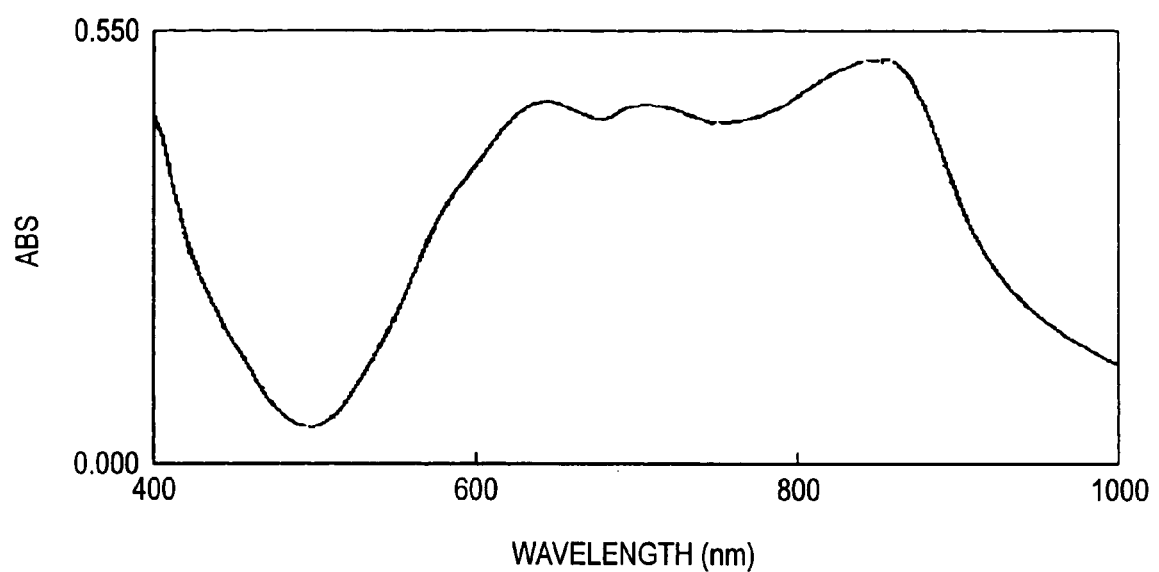
FIG. 18 is optical absorption spectrum of hydroxygallium phthalocyanine pigment prepared in Comparative Example 4.

5 parts by weight of the I type chlorogallium phthalocyanine pigment obtained in Synthesis Example 1 are stirred at 25° C. with 80 parts by weight of N,N-dimethyl formamide in a glass stirring bath having an agitator for 48 hours to obtain a crystal. Subsequently, the crystal thus obtained is washed with acetone, and then heat-dried at 80° C. in an optically shielded dryer for 24 hours to obtain 5.5 parts by weight of a hydroxygallium phthalocyanine pigment satisfying the requirements for diffraction peak in X-ray diffraction spectrum as defined in Example 1. The maximum peak wavelength ($\lambda_{MAX}$) of the hydroxygallium phthalocyanine pigment thus obtained in optical absorption spectrum in a wavelength range of from 600 nm to 900 nm is 858 nm. The optical absorption spectrum of the hydroxygallium phthalocyanine pigment thus obtained is shown in FIG. 18. The hydroxygallium phthalocyanine pigment thus obtained showed almost the same X-ray diffraction spectrum as in Comparative Example 2.

Example 11

30 parts by weight of 1,3-diiminoisoindoline and 9.1 parts by weight of gallium trichloride are added to 230 parts by weight of quinoline. The mixture is reacted at 200° C. for 3 hours. The resulting product is then withdrawn by filtration. Subsequently, the product is washed with acetone and methanol. The wet cake thus obtained is then dried to obtain 28 parts by weight of a chlorogallium phthalocyanine crystal. A solution obtained by dissolving 3 parts by weight of the chlorogallium phthalocyanine crystal in 60 parts by weight of concentrated sulfuric acid (concentration: 97%) at 0° C. is then added dropwise to 450 parts by weight of 5° C. distilled water to cause the precipitation of hydroxygallium phthalocyanine crystal. The crystal thus obtained is washed with distilled water and diluted aqueous ammonia, and then dried to obtain 2.5 parts by weight of hydroxygallium phthalocyanine crystal. The hydroxygallium phthalocyanine crystal thus obtained is then ground in an automatic mortar for 5.5 hours to obtain an amorphous hydroxygallium phthalocyanine pigment.

Figure 24:
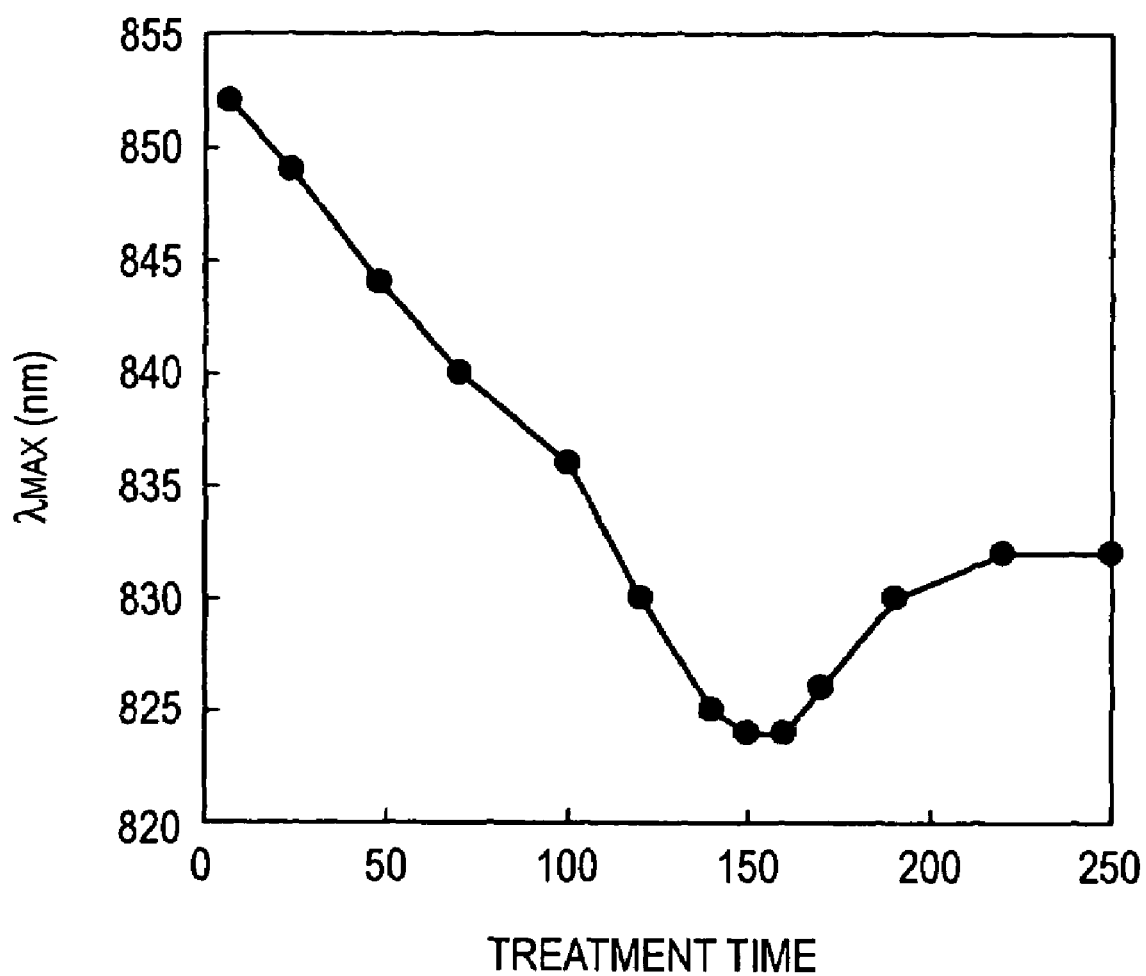
FIG. 24 illustrates maximum peak wavelength ($\lambda_{MAX}$) of hydroxygallium phthalocyanine pigment in Example 11.

5.0 parts by weight of the hydroxygallium phthalocyanine pigment thus obtained are then subjected to milling with 150 parts by weight of dimethyl formamide and 300 parts by weight of glass beads having a diameter of 1 mm. During this procedure, the change of the maximum peak wavelength ($\lambda_{MAX}$) of the hydroxygallium phthalocyanine pigment in optical absorption spectrum in a wavelength range of from 600 nm to 900 nm with time is traced for 250 hours while monitoring the progress of crystal transformation by the measurements of the absorption wavelength of the wet-grinding process solution. The results are shown in FIG. 24. As can be seen in the graph of FIG. 24, the maximum peak wavelength ($\lambda_{MAX}$) is minimum (824 nm) when the treatment time is 150 hours. When the treatment is conducted for 150 hours, the hydroxygallium phthalocyanine pigment thus obtained is washed with methanol, and then dried to obtain the desired hydroxygallium phthalocyanine pigment satisfying the requirements for diffraction peak in X-ray diffraction spectrum as defined in Example 1.

Comparative Example 5

Crystal transformation treatment is effected for 24 hours in the same manner as in Example 11. The product is washed with methanol, and then dried to obtain 0.4 parts by weight of the desired hydroxygallium phthalocyanine pigment satisfying the requirements for diffraction peak in X-ray diffraction spectrum as defined in Example 1.

Comparative Example 6

Crystal transformation treatment is effected for 48 hours in the same manner as in Example 11. The product is washed with methanol, and then dried to obtain 0.4 parts by weight of the desired hydroxygallium phthalocyanine pigment satisfying the requirements for diffraction peak in X-ray diffraction spectrum as defined in Example 1.

The maximum peak wavelength ($\lambda_{MAX}$) of the hydroxygallium phthalocyanine pigments obtained in Examples 1 to 11 and Comparative Examples 1 to 6 as measured by a liquid cell method with acetone using a Type U-2000 spectrophotometer (produced by Hitachi, Limited), BET specific surface area of these hydroxygallium phthalocyanine pigments as measured by a nitrogen substitution method using a BET process specific surface area measuring instrument (Flowsoap II2300, produced by Shimadzu Corporation), the volume average particle diameter of these hydroxygallium phthalocyanine pigments as measured using a laser diffraction scattering grain size distribution measuring instrument (LA-700, produced by HORIBA, Ltd.) and the maximum primary particle diameter of these hydroxygallium phthalocyanine pigments as measured by observation under transmission electron microscope are set forth in Table 2.

The measurements of weight loss of the hydroxygallium phthalocyanine pigments obtained in Examples 6 to 10 and Comparative Examples 3 to 4 developed when heated from 25° C. to 400° C. by a thermobalance (Type TGA-50 standalone thermogravimeter produced by Shimadzu Corporation) are set forth in Table 2.

TABLE 2

| Charge-generating material | Wet grinding conditions | | | Physical properties of hydroxygallium phthalocyanine | | | | |
|---|---|---|---|---|---|---|---|---|
| | Outer diameter of media (mm) | Weight ratio of pigment/media/solvent (DMF) | Wet grinding time (hr) | Volume average particle diameter (μm) | Maximum primary particle diameter (μm) | λMAX (nm) | BET specific surface area (m²/g) | % Thermal weight loss |
| Example 1 | 0.9 | 6/350/90 | 48 | 0.07 | 0.13 | 827 | 68.3 | — |
| Example 2 | 0.9 | 6/350/90 | 96 | 0.05 | 0.12 | 825 | 72.8 | — |
| Example 3 | 0.9 | 6/350/90 | 192 | 0.06 | 0.14 | 819 | 78.6 | — |
| Example 4 | 2.0 | 6/350/90 | 48 | 0.07 | 0.16 | 827 | 67.1 | — |
| Example 5 | 0.3 | 6/400/120 | 48 | 0.06 | 0.12 | 826 | 61.0 | — |
| Example 6 | 0.9 | 6/350/90 | 48 | 0.09 | 0.16 | 823 | 54.3 | 2.9 |
| Example 7 | 1.0 | 6/350/90 | 200 | 0.08 | 0.17 | 818 | 62.3 | 3.1 |
| Example 8 | 1.0 | 6/350/90 | 200 | 0.09 | 0.18 | 821 | 60.7 | 2.3 |
| Example 9 | 3.0 | 6/350/90 | 200 | 0.14 | 0.25 | 835 | 48.7 | 3.5 |
| Example 10 | 1.0 | 6/350/90 | 200 | 0.07 | 0.14 | 823 | 67.2 | 1.2 |
| Example 11 | 1.0 | 0.5/30/15 | 150 | 0.06 | 0.14 | 824 | 68.1 | — |
| Comparative Example 1 | — | 5/0/80 | 48 | 1.80 | 3.20 | 846 | 41.4 | — |
| Comparative Example 2 | 5.0 | 6/350/90 | 48 | 1.62 | 2.54 | 845 | 43.8 | — |
| Comparative Example 3 | 4.0 | 6/350/90 | 48 | 0.32 | 0.58 | 842 | 44.3 | 4.9 |
| Comparative Example 4 | 4.0 | 6/350/90 | 200 | 0.36 | 0.63 | 858 | 36.8 | 4.9 |
| Comparative Example 5 | 1.0 | 0.5/30/15 | 24 | 1.94 | 4.21 | 849 | 38.1 | — |
| Comparative Example 6 | 1.0 | 0.5/30/15 | 48 | 1.31 | 2.23 | 844 | 41.2 | — |

Example 12

[Preparation of Electrophotographic Photoreceptor Sheet]

100 parts by weight of zinc oxide (average particle diameter: 70 nm; specific surface area: 15 m$^2$/g; produced by TAYCA CORPORATION) are mixed with 500 parts by weight of toluene with stirring. To the mixture are then added 1.25 parts by weight of a silane coupling agent (KBM603, produced by Shin-Etsu Chemical Co., Ltd.). The mixture is then stirred for 2 hours. Thereafter, toluene is distilled off under reduced pressure. The residue is then baked at 120° C. for 2 hours to obtain a surface-treated zinc oxide pigment.

38 parts by weight of a solution having 60 parts by weight of the aforementioned surface-treated zinc oxide pigment, 13.5 parts by weight of a blocked isocyanate (Sumidur 3175, produced by Sumitomo Beyer Urethane Co., Ltd.) as a hardener and 15 parts by weight of a butyral resin (BM-1, produced by SEKISUI CHEMICAL CO., LTD.) dissolved in 85 parts by weight of methyl ethyl ketone and 25 parts by weight of methyl ethyl ketone are mixed. The mixture is then subjected to dispersion in a sandmill with glass beads having a diameter of 1 mm for 2 hours to obtain a dispersion solution. To the dispersion solution thus obtained are then added 0.005 parts by weight of dioctyl tin dilaurate as a catalyst and 3.4 parts by weight of a particulate silicone resin (Tospearl 145, produced by GE Toshiba Silicone Co., Ltd.) to obtain a subbing layer-forming coating solution. The coating solution thus obtained is spread over an aluminum substrate having a diameter of 30 mm, a length of 340 mm and a thickness of 1 mm by a dip coating method, and then dried and hardened at 170° C. for 40 minutes to form a subbing layer to a thickness of 25 μm.

Subsequently, a solution of 1 part by weight of a vinyl chloride-vinyl acetate copolymer resin (VMCH, produced by Nippon Unicar Co., Ltd.) in 100 parts by weight of n-butylacetate and 1 part by weight of the hydroxygallium phthalocyanine pigment obtained in Example 1 are mixed. The mixture is then subjected to dispersion with 150 parts by weight of glass beads having an outer diameter of 1 mm in a sandmill for 5 hours to obtain a charge-generating layer-forming coating solution. The coating solution thus obtained is spread over the aforementioned subbing layer by a dip coating method, and then heat-dried at 100° C. for 10 minutes to form a charge-generating layer to a thickness of 0.20 μm.

Separately, 4 parts by weight of N,N'-diphenyl-N,N'-bis (3-methylphenyl)-[1,1'-biphenyl]-4,4'-diamine as a charge-transporting material, 6 parts by weight of a bisphenol Z type polycarbonate resin having a viscosity-average molecular weight of 30,000 as a binder resin, 80 parts by weight of tetrahydrofurane and 0.2 parts by weight of 2,6-di-t-butyl-4-methylphenol are mixed to prepare a charge-transporting layer-forming coating solution. The coating solution thus prepared is spread over the aforementioned charge-generating layer by a dip coating method, and then heat-dried at 120° C. for 40 minutes to form a charge-transporting layer to a thickness of 25 μm. Thus, the desired electrophotographic photoreceptor sheet is prepared.

[Preparation of Electrophotographic Photoreceptor Drum]

An aluminum pipe having a diameter of 84 mm, a length of 347 mm and a thickness of 1 mm is subjected to roughening by liquid honing with an abrasive (Type CB-A30S alumina bead; average particle diameter D50: 30 μm; produced by Showa Titanium Co., Ltd.) to prepare an conductive support having a center line average roughness Ra of 0.18 μm. Ra is obtained in conformity with JIS (Japanese Industrial Standards) B0610-1982. The conductive support thus prepared is provided with a subbing layer, a charge-generating layer and a charge-transporting layer sequentially thereon by the same procedure as in the preparation of the aforementioned electrophotographic photoreceptor sheet. Thus, the desired electrophotographic photoreceptor drum is prepared.

Examples 13 to 22

Electrophotographic photoreceptors of Examples 13 to 22 (electrophotographic photoreceptor sheet and electrophotographic photoreceptor drum) are prepared in the same manner as in Example 12 except that, as the charge-generating material, there are used hydroxygallium phthalocyanine pigments of Examples 2 to 11 instead of the hydroxygallium phthalocyanine pigment of Example 1, respectively.

Comparative Examples 7 to 12

Electrophotographic photoreceptors of Comparative Examples 7 to 12 (electrophotographic photoreceptor sheet and electrophotographic photoreceptor drum) are prepared in the same manner as in Example 8 except that, as the charge-generating material, there are used hydroxygallium phthalocyanine pigments of Comparative Examples 1 to 6 instead of the hydroxygallium phthalocyanine pigment of Example 1, respectively.

[Test for Evaluation of Electrophotographic Properties of Electrophotographic Photoreceptor]

(1) Evaluation of Properties in the Initial Stage of Use

In order to evaluate the electrophotographic properties of the electrophotographic photoreceptor sheets of Examples 12 to 22 and Comparative Examples 7 to 12, the measurement of electrophotographic properties is conducted in the following manner. Firstly, the electrophotographic photoreceptor is negatively charged by corona discharge at −5.0 kV with a small area mask having 20 mm using an electrostatic copying paper testing machine (EPA8200, produced by Kawaguchi Electric Co., Ltd.) at 20° C. and 50% RH. Subsequently, the electrophotographic photoreceptor is irradiated with light from a halogen lamp which had been spectrally separated to 780 nm through an interference filter in such a manner that the dose at the surface thereof is 5.0 μW/cm$^2$. At this time, the initial surface potential $V_0$ [V], the half exposure $E_{1/2}$ [J/cm$^2$] required until the surface potential reaches ½ of $V_0$ and the dark decay (DDR) [%] represented by $\{(V_0-V_1)/V_0\} \times 100$ wherein $V_1$ is the surface potential after 1 second from the measurement of surface potential $V_0$ are measured. The results are set forth in Table 3.

(2) Evaluation of Repeatability

The aforementioned procedure of charging, exposure and destaticization is repeated 10,000 times. The surface potential $V_0$ [V], the half exposure $E_{1/2}$ [μJ/cm$^2$] required until the surface potential reaches ½ of $V_0$ and the dark decay (DDR) [%] are then measured. The results are set forth in Table 3.

(3) Test for Evaluation of Image Quality

The electrophotographic photoreceptor drums of Examples 12 to 22 and Comparative Examples 7 to 12 are each mounted on a full-color laser printer having the configuration shown in FIG. 4 (DocuPrint C620, produced by Fuji Xerox Co., Ltd.) by which they are then evaluated for image quality to see whether image quality defects such as thickening and thinning of fine line, fogging, black spot and white spot occurred or not. The results are set forth in Table 3. The aforementioned full-color laser printer is comprised of a roller charger (BCR) as a charging unit, ROS having a semiconductor laser emitting laser beam of 780 nm as an exposure unit and a roller charger (BTR) as a transferring unit and employed a two-component reversal development process as a development process and a belt intermediate transferring process as a transferring process.

(4) Evaluation of Dispersibility of Charge-generating Material

In order to evaluate the dispersibility of the hydroxygallium phthalocyanine pigments used in Examples 12 to 22 and Comparative Examples 7 to 12, the charge-generating layer-forming coating solutions of Examples 12 to 22 and Comparative Examples 7 to 12 are used to form a charge-generating layer on a glass plate. These charge-generating layers are each then observed for the dispersion state of the hydroxygallium phthalocyanine pigment therein under microscope. The results are set forth in Table 3. In Table 3, the term "good" means that no aggregates are found in the charge-generating layer. The term "poor" means that aggregates are found or the surface of the coat layer is rough.

Example 23

[Preparation of Electrophotographic Photoreceptor]

38 parts by weight of a solution having 60 parts by weight of zincoxide (average particle diameter: 70 nm; specific surface area: 15 $m^2/g$; produced by TAYCA CORPORATION on an experimental basis) which had been subjected to surface treatment with a silane coupling agent (KBM603, produced by Shin-Etsu Chemical Co., Ltd.), 15 parts by weight of a blocked isocyanate (Sumidur 3175, produced by Sumitomo Beyer Urethane Co., Ltd.) as a hardener and 15 parts by weight of a butyral resin (BM-1, produced by SEKISUI CHEMICAL CO., LTD.) dissolved in 85 parts by weight of methyl ethyl ketone, and 25 parts by weight of methyl ethyl ketone are mixed. The mixture is then subjected to dispersion in a sandmill with glass beads having a diameter of 1 mm for 2 hours to obtain a dispersion solution. To the dispersion solution thus obtained are then added 0.005 parts by weight of dioctyl tin dilaurate as a catalyst to obtain a subbing layer-forming coating solution. The coating solution thus obtained is spread over an aluminum substrate having a diameter of 30 mm, a length of 340 mm and a thickness of 1 mm by a dip coating method, and then dried

TABLE 3

| Electro-photoreceptor | Properties of electrophotographic photoreceptor (initial) | | | Properties of electrophotographic photoreceptor (after 10,000 cycles) | | | Image quality | Evaluation of dispersibility of charge-generating material |
|---|---|---|---|---|---|---|---|---|
| | $V_0$ (V) | $E_{1/2}$ ($\mu J/cm^2$) | % DDR | $V_0$ (V) | $E_{1/2}$ ($\mu J/cm^2$) | % DDR | | |
| Example 12 | −487 | 0.58 | 4.6 | −490 | 0.53 | 4.8 | Good | Good |
| Example 13 | −489 | 0.57 | 4.8 | −487 | 0.54 | 5.1 | Good | Good |
| Example 14 | −488 | 0.54 | 5.2 | −484 | 0.58 | 4.8 | Good | Good |
| Example 15 | −487 | 0.57 | 5.1 | −481 | 0.55 | 5.0 | Good | Good |
| Example 16 | −479 | 0.58 | 7.5 | −470 | 0.63 | 7.9 | Good | Good |
| Example 17 | −484 | 0.51 | 4.8 | −487 | 0.54 | 5.1 | Good | Good |
| Example 18 | −481 | 0.58 | 4.7 | −490 | 0.60 | 4.9 | Good | Good |
| Example 19 | −487 | 0.53 | 4.5 | −491 | 0.56 | 4.7 | Good | Good |
| Example 20 | −484 | 0.51 | 4.8 | −487 | 0.54 | 5.1 | Good | Good |
| Example 21 | −482 | 1.41 | 4.4 | −485 | 1.56 | 4.8 | Density drop | Good |
| Example 22 | −480 | 0.56 | 6.1 | −481 | 0.53 | 4.8 | Good | Good |
| Comparative Example 7 | −453 | 0.75 | 12.2 | −422 | 0.95 | 19.2 | Fogging | Poor |
| Comparative Example 8 | −460 | 0.61 | 16.4 | −425 | 0.81 | 22.3 | Fogging | Poor |
| Comparative Example 9 | −463 | 0.55 | 12.2 | −491 | 0.50 | 19.2 | Fogging | Poor |
| Comparative Example 10 | −463 | 0.55 | 12.2 | −421 | 0.50 | 19.2 | Fogging | Poor |
| Comparative Example 11 | −441 | 0.81 | 16.7 | −429 | 0.95 | 23.5 | Fogging | Poor |
| Comparative Example 12 | −462 | 0.63 | 14.8 | −441 | 0.76 | 21.6 | Fogging | Poor |

As can be seen in Tables 2 and 3, the electrophotographic photoreceptors of Examples 12 to 22 comprising the hydroxygallium phthalocyanine pigments having a maximum peak wavelength within a range of from 810 nm to 839 nm in optical absorption spectrum in a wavelength range of from 600 nm to 900 nm exhibit excellent electrophotographic properties and good dispersibility and thus can provide a good image quality without causing phenomena such as thickening and thinning of fine line, fogging and black or white spot as compared with the electrophotographic photoreceptors of Comparative Examples 7 to 12.

and hardened at 160° C. for 100 minutes to form a subbing layer to a thickness of 20 μm.

Subsequently, a solution having 10 parts by weight of a vinyl chloride-vinyl acetate copolymer resin (VMCH, produced by Nippon Unicar Co., Ltd.) dissolved in 300 parts by weight of n-butyl acetate and 15 parts by weight of the hydroxygallium phthalocyanine pigment obtained in Example 1 are mixed. The mixture is then subjected to dispersion with glass beads having an outer diameter of 1 mm in a proportion of 30% by volume based on the volume of the dispersion chamber in a horizontal sandmill for 100- minutes to prepare a charge-generating layer-forming coating solution. The coating solution thus prepared is spread over the aforementioned subbing layer by a dip coating method, and then dried to form a charge-generating layer having a thickness of 0.20 μm.

Separately, 4 parts by weight of N,N'-diphenyl-N, N'-bis (3-methylphenyl)-[1,1'-biphenyl]-4,4¹-diamine as a charge-transporting material and 6 parts by weight of a bisphenol Z type polycarbonate resin having a viscosity-average molecular weight of 40,000 represented by the following general formula (7) as a binder resin are dissolved in 60 parts by weight of tetrahydrofurane to prepare a charge-transporting layer-forming coating solution. The coating solution thus prepared is spread over the aforementioned charge-generating layer by a dip coating method, and then dried at 130° C. for 40 minutes to form a charge-transporting layer having a thickness of 33 μm. Thus, the desired electrophotographic photoreceptor (electrophotographic photoreceptor drum) is prepared.

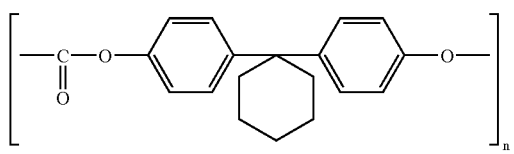

(7)

[Preparation of Electrophotographic Device]

The electrophotographic photoreceptor thus obtained is then mounted on a remodeled version of a full-color printer (DocuCenter Color 400CP, produced by Fuji Xerox Co., Ltd.) having the configuration shown in FIG. 4 to prepare an electrophotographic device.

The contact type charging unit in the electrophotographic device is a unit capable of controlling the charging potential after repetition of the electrophotographic process predetermined times is lower than that of the first cycle of the electrophotographic process. In some detail, the contact type charging unit is adapted to control the charging potential of the surface of the electrophotographic photoreceptor to be 720 V at the first cycle of the electrophotographic process and fall by 0.2 V every 10,000 cycles of the electrophotographic process under the conditions represented by the following equation (B) wherein VH [V] is the charging potential of the surface of the electrophotographic photoreceptor and α [1000 times] is the number of repetition of the electrophotographic process. The following equation (B) is established on the basis of previously determined relationship between the number of repetition of the electrophotographic process and the thickness of the photosensitive layer and charging potential required to maintain the intensity of electric field within a predetermined range when the thickness of the photosensitive layer decreases.

$$VH = 720 - \alpha \times 0.2 \tag{B}$$

Examples 24-26

Electrophotographic photoreceptors and electrophotographic devices of Examples 24 to 26 are prepared in the same manner as in Example 23 except that, as the charge-generating material, there are used hydroxygallium phthalocyanine pigments of Examples 3 to 5 instead of the hydroxygallium phthalocyanine pigment of Example 1, respectively.

Comparative Examples 13-15

Electrophotographic photoreceptors and electrophotographic devices of Comparative Examples 13 to 15 are prepared in the same manner as in Example 23 except that, as the charge-generating material, there are used hydroxygallium phthalocyanine pigments of Comparative Examples 1, 2 and 5 instead of the hydroxygallium phthalocyanine pigment of Example 1, respectively.

Examples 27-29

Electrophotographic photoreceptors and electrophotographic devices of Examples 27 to 29 are prepared in the same manner as in Examples 23 to 25 except that, as the contact type charging unit, there is used one arranged to keep the charging potential at 720 V rather than to control the charging potential according to the aforementioned equation (B).

Example 30

[Preparation of Electrophotographic Photoreceptor]

38 parts by weight of a solution having 60 parts by weight of zinc oxide (average particle diameter: 70 nm; specific surface area: 15 m²/g; produced by TAYCA CORPORATION on an experimental basis) which had been subjected to surface treatment with a silane coupling agent (KBM603, produced by Shin-Etsu Chemical Co., Ltd.), 15 parts by weight of a blocked isocyanate (Sumidur 3175, produced by Sumitomo Beyer Urethane Co., Ltd.) as a hardener and 15 parts by weight of a butyral resin (BM-1, produced by SEKISUI CHEMICAL CO., LTD.) dissolved in 85 parts by weight of methyl ethyl ketone, and 25 parts by weight of methyl ethyl ketone are mixed. The mixture is then subjected to dispersion in a sandmill with glass beads having a diameter of 1 mm for 1.5 hours to obtain a dispersion solution. To the dispersion solution thus obtained are then added 0.005 parts by weight of dioctyl tin dilaurate as a catalyst to obtain a subbing layer-forming coating solution. The coating solution thus obtained is spread over an aluminum substrate having a diameter of 30 mm, a length of 340 mm and a thickness of 1 mm by a dip coating method, and then dried and hardened at 160° C. for 100 minutes to form a subbing layer having a thickness of 18 μm.

Subsequently, 4 parts by weight of a polyvinyl butyral resin (S-Lec BM-S, produced by SEKISUI CHEMICAL CO., LTD.) are dissolved in 170 parts by weight of n-butyl alcohol. The solution is then mixed with 30 parts by weight of an organic zirconium compound (acetyl acetone zirconium butyrate) and 3 parts by weight of an organic silane compound (γ-aminopropyltrimethoxy silane) with stirring to prepare an interlayer-forming coating solution. The coating solution thus obtained is spread over the aforementioned subbing layer, and then heat-dried at 150° C. for 1 hour to form an interlayer having a thickness of 1.2 μm.

Subsequently, a solution having 10 parts by weight of a vinyl chloride-vinyl acetate copolymer resin (VMCH, produced by Nippon Unicar Co., Ltd.) dissolved in 300 parts by weight of n-butyl acetate and 15 parts by weight of the hydroxygallium phthalocyanine pigment obtained in Example 1 are mixed. The mixture is then subjected to dispersion with glass beads having an outer diameter of 1 mm in a proportion of 30% by volume based on the volume of the dispersion chamber in a horizontal sandmill for 100 minutes to prepare a charge-generating layer-forming coating solution. The coating solution thus prepared is spread over the aforementioned subbing layer by a dip coating method, and then dried to form a charge-generating layer having a thickness of 0.20 μm.

Separately, 4 parts by weight of N,N'-diphenyl-N, N'-bis(3-methylphenyl)-[1,1'-biphenyl]-4,4'-diamine as a charge-transporting material and 6 parts by weight of a bisphenol Z type polycarbonate resin having a viscosity-average molecular weight of 40,000 represented by the aforementioned general formula (7) as a binder resin are dissolved in 60 parts by weight of tetrahydrofurane to prepare a charge-transporting layer-forming coating solution. The coating solution thus prepared is spread over the aforementioned charge-generating layer by a dip coating method, and then dried at 130° C. for 40 minutes to form a charge-transporting layer having a thickness of 33 μm. Thus, the desired electrophotographic photoreceptor (electrophotographic photoreceptor drum) is prepared.

[Preparation of Electrophotographic Device]

An electrophotographic device of Example 30 is prepared in the same manner as in Example 23 except that the electrophotographic photoreceptor thus prepared is used.

Examples 31-33

Electrophotographic photoreceptors and electrophotographic devices of Examples 31 to 33 are prepared in the same manner as in Example 30 except that, as the charge-generating material, there are used hydroxygallium phthalocyanine pigments of Examples 3 to 5 instead of the hydroxygallium phthalocyanine pigment of Example 1, respectively.

Comparative Examples 16-18)

Electrophotographic photoreceptors and electrophotographic devices of Comparative Examples 16 to 18 are prepared in the same manner as in Example 30 except that, as the charge-generating material, there are used hydroxygallium phthalocyanine pigments of Comparative Examples 1, 2 and 5 instead of the hydroxygallium phthalocyanine pigment of Example 1, respectively.

Example 34

An electrophotographic photoreceptor and an electrophotographic device of Example 34 are prepared in the same manner as in Example 30 except that, as the binder resin to be used in the preparation of the charge-generating layer-forming coating solution, there is used 6 parts by weight of a bisphenol C polyacrylate resin represented by the following general formula (8) (viscosity-average molecular weight: 40,000) instead of 6 parts by weight of the bisphenol Z type polycarbonate resin represented by the general formula (7).

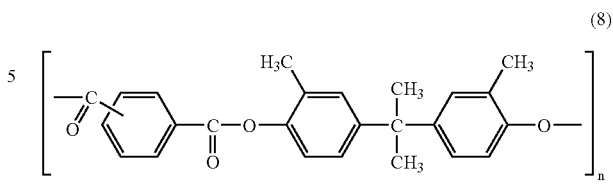

Examples 35-36

Electrophotographic photoreceptors and electrophotographic devices of Examples 35 to 36 are prepared in the same manner as in Example 34 except that, as the charge-generating material, there are used hydroxygallium phthalocyanine pigments of Examples 3 and 4 instead of the hydroxygallium phthalocyanine pigment of Example 1, respectively.

Comparative Examples 19-21

Electrophotographic photoreceptors and electrophotographic devices of Comparative Examples 19 to 21 are prepared in the same manner as in Example 34 except that, as the charge-generating material, there are used hydroxygallium phthalocyanine pigments of Comparative Examples 1, 2 and 5 instead of the hydroxygallium phthalocyanine pigment of Example 1, respectively.

[Test for Evaluation of Properties of Electrophotographic Photoreceptors and Electrophotographic Devices of Examples 23 to 36 and Comparative Examples 13 to 21]

(1) Measurement of Optical Absorption Spectrum of Charge-generating Layer

Coating solutions having a solid content of from 4.0 to 5.0% by weight are prepared by adjusting the content of n-butyl acetate among the constituents of the charge-generating layer-forming coating solutions used in Examples 23 to 36 and Comparative Examples 13 to 21. These coating solutions are each then spread over a glass plate by a dip coating method to prepare charge-generating layers for the measurement of optical absorption spectrum. The pulling speed is from 50 to 200 mm/min. The charge-generating layer thus obtained is then measured for optical absorption spectrum by a Type U-2000 spectrophotometer (produced by Hitachi, Ltd.). From the optical absorption spectrum thus measured is then determined peak ratio represented by the ratio of maximum peak in a wavelength range of from 600 to 700 nm to maximum peak in a wavelength range of from 810 to 850 nm (maximum peak in a wavelength range of from 600 to 700/maximum peak in a wavelength range of from 810 to 850 nm). The results are set forth in Table 4. The maximum peak wavelength ($\lambda_{MAX}$) of the hydroxygallium phthalocyanine pigments used, too, are set forth in Table 4.

The optical absorption spectrum of the coat layer can be measured by various methods even if it is provided on the electrophotographic photoreceptor. For example, in the case where the layers disposed closer to the surface than the hydroxygallium phthalocyanine pigment-containing layer don't show absorption in a wavelength range of from 600 nm to 900 nm, the spectrum of light reflected by the electrophotographic photoreceptor may be measured. Even when the layers disposed closer to the surface than the hydroxygallium phthalocyanine pigment-containing layer show absorption in a wavelength range of from 600 nm to 900 nm, these layers may be eluted before the measurement of the spectrum of light reflected by the hydroxygallium phthalocyanine pigment-containing layer.

(2) Evaluation of Properties in the Initial Stage of Use

The electrophotographic process is effected once using the electrophotographic devices of Examples 23 to 36 and Comparative Examples 13 to 21. The charging potential (VH) of the surface of the electrophotographic photoreceptor thus charged and the charging potential (VL) of the surface of the electrophotographic photoreceptor thus exposed are then measured. The results are set forth in Table 4.

(3) Evaluation of Repeatability

The electrophotographic process is repeated 600,000 times using the electrophotographic devices of Examples 23 to 36 and Comparative Examples 13 to 21. At the 600,000th cycle of the electrophotographic process, the charging potential (VH) of the surface of the electrophotographic photoreceptor thus charged, the charging potential (VL) of the surface of the electrophotographic photoreceptor thus exposed and the thickness of the photosensitive layer are measured. The quality (presence of density drop) of image thus formed is evaluated. The results are set forth in Table 4.

Example 37

[Preparation of Electrophotographic Photoreceptor]

38 parts by weight of a solution having 60 parts by weight of zinc oxide (average particle diameter: 70 nm; specific surface area: 15 m$^2$/g; produced by TAYCA CORPORATION on an experimental basis) which had been subjected to surface treatment with a silane coupling agent (KBM603, produced by Shin-Etsu Chemical Co., Ltd.), 15 parts by weight of a blocked isocyanate (Sumidur 3175, produced by Sumitomo Beyer Urethane Co., Ltd.) as a hardener and 15 parts by weight of a butyral resin (BM-1, produced by SEKISUI CHEMICAL CO., LTD.) dissolved in 85 parts by weight of methyl ethyl ketone, and 25 parts by weight of methyl ethyl ketone are mixed. The mixture is then subjected to dispersion in a sandmill with glass beads having a diameter of 1 mm for 2 hours to obtain a dispersion solution. To the dispersion solution thus obtained are then added 0.005 parts by weight of dioctyl tin dilaurate as a catalyst to obtain a subbing layer-forming coating solution. The coating solution thus obtained is spread over an aluminum substrate having a diameter of 30 mm, a length of 340 mm and a thickness of 1 mm by a dip coating method, and then dried

TABLE 4

| | Properties of electrophotographic photoreceptor | | | | | | | Image quality |
| --- | --- | --- | --- | --- | --- | --- | --- | --- |
| | | | Initial | | | After 600,000 cycles | | |
| | $\lambda_{MAX}$ (nm) | Peak ratio | VH (V) | VL (V) | Thickness of photosensitive layer (μm) | VH (V) | VL (V) | Thickness of photosensitive layer (μm) | after repeating 600,000 cycles |
| Example 23 | 827 | 1.14 | 720 | 305 | 33 | 600 | 320 | 14.2 | Good |
| Example 24 | 819 | 1.21 | 720 | 300 | 33 | 600 | 325 | 14.0 | Good |
| Example 25 | 827 | 1.12 | 720 | 315 | 33 | 600 | 335 | 13.9 | Good |
| Example 26 | 826 | 1.10 | 720 | 300 | 33 | 600 | 320 | 13.5 | Good |
| Comparative Example 13 | 846 | 0.90 | 720 | 298 | 33 | 600 | 400 | 14.6 | Density drop |
| Comparative Example 14 | 845 | 0.95 | 720 | 300 | 33 | 600 | 405 | 14.1 | Density drop |
| Comparative Example 15 | 849 | 0.92 | 720 | 320 | 33 | 600 | 395 | 13.6 | Density drop |
| Example 27 | 827 | 1.14 | 720 | 315 | 33 | 720 | 375 | 13.5 | Slight density drop |
| Example 28 | 819 | 1.21 | 720 | 300 | 33 | 720 | 365 | 14.2 | Slight density drop |
| Example 29 | 827 | 1.12 | 720 | 305 | 33 | 720 | 370 | 14.5 | Slight density drop |
| Example 30 | 827 | 1.14 | 720 | 305 | 33 | 600 | 320 | 14.3 | Good |
| Example 31 | 819 | 1.21 | 720 | 310 | 33 | 600 | 315 | 14.2 | Good |
| Example 32 | 827 | 1.12 | 720 | 325 | 33 | 600 | 305 | 14.8 | Good |
| Example 33 | 826 | 1.10 | 720 | 310 | 33 | 600 | 310 | 13.5 | Good |
| Comparative Example 17 | 845 | 0.95 | 720 | 295 | 33 | 600 | 425 | 14.8 | Density drop |
| Comparative Example 18 | 849 | 0.92 | 720 | 290 | 33 | 600 | 405 | 13.9 | Density drop |
| Example 34 | 827 | 1.14 | 720 | 310 | 33 | 600 | 330 | 16.2 | Good |
| Example 35 | 819 | 1.21 | 720 | 305 | 33 | 600 | 320 | 16.5 | Good |
| Example 36 | 827 | 1.12 | 720 | 300 | 33 | 600 | 325 | 17.1 | Good |
| Comparative Example 19 | 846 | 0.90 | 720 | 310 | 33 | 600 | 405 | 13.7 | Density drop |
| Comparative Example 20 | 845 | 0.95 | 720 | 315 | 33 | 600 | 405 | 14.2 | Density drop |
| Comparative Example 21 | 849 | 0.92 | 720 | 305 | 33 | 600 | 400 | 16.9 | Density drop | and hardened at 160° C. for 100 minutes to form a subbing layer having a thickness of 20 μm.

Subsequently, a solution having 10 parts by weight of a vinyl chloride-vinyl acetate copolymer resin (VMCH, produced by Nippon Unicar Co., Ltd.) dissolved in 300 parts by weight of n-butyl acetate and 15 parts by weight of the hydroxygallium phthalocyanine pigment obtained in Example 1 are mixed. The mixture is then subjected to dispersion with glass beads having an outer diameter of 1 mm in a proportion of 30% by volume based on the volume of the dispersion chamber in a horizontal sandmill for 100 minutes to prepare a charge-generating layer-forming coating solution. The coating solution thus prepared is spread over the aforementioned subbing layer by a dip coating method, and then dried to form a charge-generating layer having a thickness of 0.20 μm.

Separately, 4 parts by weight of N,N'-diphenyl-N, N'-bis (3-methylphenyl)-[1,1'-biphenyl]-4,4'-diamine as a charge-transporting material and 6 parts by weight of a bisphenol Z type polycarbonate resin having a viscosity-average molecular weight of 40,000 represented by the general formula (7) as a binder resin are dissolved in 60 parts by weight of tetrahydrofurane to prepare a charge-transporting layer-forming coating solution. The coating solution thus prepared is spread over the aforementioned charge-generating layer by a dip coating method, and then dried at 130° C. for 40 minutes to form a charge-transporting layer having a thickness of 33 μm. Thus, the desired electrophotographic photoreceptor (electrophotographic photoreceptor drum) is prepared.

[Preparation of Electrophotographic Device]

The electrophotographic photoreceptor thus obtained is then mounted on a remodeled version of a full-color printer (DocuCenter Color 400CP, produced by Fuji Xerox Co., Ltd.) having the configuration shown in FIG. 4 to prepare an electrophotographic device.

The exposure unit in the electrophotographic device is a unit for forming an electrostatic latent image on the electrophotographic photoreceptor between the time at which the electrophotographic photoreceptor in stationary state is actuated and the time at which the electrophotographic photoreceptor has completed one rotation.

Examples 38-40

Electrophotographic photoreceptors and electrophotographic devices of Examples 38 to 40 are prepared in the same manner as in Example 37 except that, as the charge-generating material, there are used hydroxygallium phthalocyanine pigments of Examples 3 to 5 instead of the hydroxygallium phthalocyanine pigment of Example 1, respectively.

Comparative Examples 22-24

Electrophotographic photoreceptors and electrophotographic devices of Comparative Examples 13 to 15 are prepared in the same manner as in Example 23 except that, as the charge-generating material, there are used hydroxygallium phthalocyanine pigments of Comparative Examples 1, 2 and 5 instead of the hydroxygallium phthalocyanine pigment of Example 1, respectively.

Example 41

[Preparation of Electrophotographic Photoreceptor]

38 parts by weight of a solution having 60 parts by weight of zinc oxide (average particle diameter: 70 nm; specific surface area: 15 $m^2/g$; produced by TAYCA CORPORATION on an experimental basis) which had been subjected to surface treatment with a silane coupling agent (KBM603, produced by Shin-Etsu Chemical Co., Ltd.), 15 parts by weight of a blocked isocyanate (Sumidur 3175, produced by Sumitomo Beyer Urethane Co., Ltd.) as a hardener and 15 parts by weight of a butyral resin (BM-1, produced by SEKISUI CHEMICAL CO., LTD.) dissolved in 85 parts by weight of methyl ethyl ketone, and 25 parts by weight of methyl ethyl ketone are mixed. The mixture is then subjected to dispersion in a sandmill with glass beads having a diameter of 1 mm for 1.5 hours to obtain a dispersion solution. To the dispersion solution thus obtained are then added 0.005 parts by weight of dioctyl tin dilaurate as a catalyst to obtain a subbing layer-forming coating solution. The coating solution thus obtained is spread over an aluminum substrate having a diameter of 30 mm, a length of 340 mm and a thickness of 1 mm by a dip coating method, and then dried and hardened at 160° C. for 100 minutes to form a subbing layer having a thickness of 18 μm.

Subsequently, 4 parts by weight of a polyvinyl butyral resin (S-Lec BM-S, produced by SEKISUI CHEMICAL CO., LTD.) are dissolved in 170 parts by weight of n-butyl alcohol. The solution is then mixed with 30 parts by weight of an organic zirconium compound (acetyl acetone zirconium butyrate) and 3 parts by weight of an organic silane compound (γ-aminopropyltrimethoxy silane) with stirring to prepare an interlayer-forming coating solution. The coating solution thus obtained is spread over the aforementioned subbing layer, and then heat-dried at 150° C. for 1 hour to form an interlayer having a thickness of 1.2 μm.

Subsequently, a solution having 10 parts by weight of a vinyl chloride-vinyl acetate copolymer resin (VMCH, produced by Nippon Unicar Co., Ltd.) dissolved in 300 parts by weight of n-butyl acetate and 15 parts by weight of the hydroxygallium phthalocyanine pigment obtained in Example 1 are mixed. The mixture is then subjected to dispersion with glass beads having an outer diameter of 1 mm in a proportion of 30% by volume based on the volume of the dispersion chamber in a horizontal sandmill for 100 minutes to prepare a charge-generating layer-forming coating solution. The coating solution thus prepared is spread over the aforementioned subbing layer by a dip coating method, and then dried to form a charge-generating layer having a thickness of 0.20 μm.

Separately, 4 parts by weight of N,N'-diphenyl-N, N'-bis (3-methylphenyl)-[1,1'-biphenyl]-4,4'-diamine as a charge-transporting material and 6 parts by weight of a bisphenol Z type polycarbonate resin having a viscosity-average molecular weight of 40,000 represented by the aforementioned general formula (7) as a binder resin are dissolved in 60 parts by weight of tetrahydrofurane to prepare a charge-transporting layer-forming coating solution. The coating solution thus prepared is spread over the aforementioned charge-generating layer by a dip coating method, and then dried at 130° C. for 40 minutes to form a charge-transporting layer having a thickness of 33 μm. Thus, the desired electrophotographic photoreceptor (electrophotographic photoreceptor drum) is prepared.

[Preparation of Electrophotographic Device]

An electrophotographic device of Example 41 is prepared in the same manner as in Example 37 except that the electrophotographic photoreceptor thus prepared is used.

Examples 42-44

Electrophotographic photoreceptors and electrophotographic devices of Examples 42 to 44 are prepared in the same manner as in Example 41 except that, as the charge-generating material, there are used hydroxygallium phthalocyanine pigments of Examples 3 to 5 instead of the hydroxygallium phthalocyanine pigment of Example 1, respectively.

Comparative Examples 25-27

Electrophotographic photoreceptors and electrophotographic devices of Comparative Examples 25 to 27 are prepared in the same manner as in Example 41 except that, as the charge-generating material, there are used hydroxygallium phthalocyanine pigments of Comparative Examples 1, 2 and 5 instead of the hydroxygallium phthalocyanine pigment of Example 1, respectively.

Example 45

An electrophotographic photoreceptor and an electrophotographic device of Example 45 are prepared in the same manner as in Example 41 except that, as the binder resin to be used in the preparation of the charge-generating layer-forming coating solution, there is used 6 parts by weight of a bisphenol C polyacrylate resin represented by the aforementioned general formula (8) (viscosity-average molecular weight: 40,000) instead of 6 parts by weight of the bisphenol Z type polycarbonate resin represented by the general formula (7).

Examples 46-47

Electrophotographic photoreceptors and electrophotographic devices of Examples 46 to 47 are prepared in the same manner as in Example 45 except that, as the charge-generating material, there are used hydroxygallium phthalocyanine pigments of Examples 3 and 4 instead of the hydroxygallium phthalocyanine pigment of Example 1, respectively.

Comparative Examples 28-30

Electrophotographic photoreceptors and electrophotographic devices of Comparative Examples 28 to 30 are prepared in the same manner as in Example 45 except that, as the charge-generating material, there are used hydroxygallium phthalocyanine pigments of Comparative Examples 1, 2 and 5 instead of the hydroxygallium phthalocyanine pigment of Example 1, respectively.

[Test for Evaluation of Properties of Electrophotographic Devices of Examples 37 to 47 and Comparative Examples 22 to 30]

(1) Evaluation of Image Quality

The electrophotographic devices of Examples 37 to 47 and Comparative Examples 22 to 30 are used. The electrophotographic photoreceptor in stationary state is actuated. Electrostatic latent images are then formed on the electrophotographic photoreceptor starting from the first rotation without performing idle rotation. The quality of image formed on the first, second and third sheets of paper are then evaluated. The results are set forth in Table 5. The maximum peak wavelength ($\lambda_{MAX}$) of the hydroxygallium phthalocyanine pigments used, too, are set forth in Table 5.

TABLE 5

| | $\lambda_{MAX}$ (nm) | Image quality | | |
|---|---|---|---|---|
| | | 1st sheet | 2nd sheet | 3rd sheet |
| Example 37 | 827 | Good | Good | Good |
| Example 38 | 818 | Good | Good | Good |
| Example 39 | 827 | Good | Good | Good |
| Example 40 | 826 | Good | Good | Good |
| Comparative Example 22 | 846 | Ghost generated | Ghost generated | Good |
| Comparative Example 23 | 845 | Ghost generated | Ghost generated (slight) | Good |
| Comparative Example 24 | 849 | Ghost generated | Ghost generated (slight) | Good |
| Example 41 | 827 | Good | Good | Good |
| Example 42 | 819 | Good | Good | Good |
| Example 43 | 827 | Good | Good | Good |
| Example 44 | 826 | Good | Good | Good |
| Comparative Example 25 | 846 | Ghost generated | Ghost generated | Good |
| Comparative Example 26 | 845 | Ghost generated | Ghost generated (slight) | Good |
| Comparative Example 27 | 849 | Ghost generated | Ghost generated | Good |
| Example 45 | 827 | Good | Good | Good |
| Example 46 | 819 | Good | Good | Good |
| Example 47 | 827 | Good | Good | Good |
| Comparative Example 28 | 846 | Ghost generated | Ghost generated | Good |
| Comparative Example 29 | 845 | Ghost generated | Ghost generated (slight) | Good |
| Comparative Example 30 | 849 | Ghost generated | Ghost generated | Good |

Example 48

[Preparation of Photosensitive Layer-forming Coating Solution]

A solution having 10 parts by weight of a vinyl chloride-vinyl acetate copolymer (VMCH, produced by Nippon Unicar Co., Ltd.) dissolved in 300 parts by weight of n-butyl acetate, and 15 parts by weight of the hydroxygallium phthalocyanine pigment obtained in Example 1 are mixed. Subsequently, the mixture is then subjected to dispersion in a horizontal sandmill comprising a 1,400 ml dispersion chamber filled with glass beads having an outer diameter of 1 mm in a packing of 40% by weight while being circulated at a flow rate of 1,400 ml/min for 100 minutes to obtain a dispersion. At this point, the value of ($V_c/V_0$) is 1. The dispersion thus obtained is then subjected to centrifugal sedimentation at a rotary speed of 8,300 rpm using a Type SCR20BB centrifugal separator (produced by Hitachi, Ltd.) for 30 minutes to obtain a charge-generating layer-forming coating solution.

[Preparation of Electrophotographic Photoreceptor]

4 parts by weight of a polyvinyl butyral resin (S-Lec BM-S, produced by SEKISUI CHEMICAL CO., LTD.) are dissolved in 170 parts by weight of n-butyl alcohol. The solution is then mixed with 30 parts by weight of an organic zirconium compound (acetyl acetone zirconium butyrate) and 3 parts by weight of an organic silane compound (γ-aminopropyltrimethoxy silane) with stirring to prepare a subbing layer-forming coating solution. The coating solution thus obtained is spread over an aluminum substrate having a diameter of 30 mm, a length of 340 mm and a thickness of 1 mm by a dip coating method, and then subjected to hardening at 150° C. for 1 hour to form a subbing layer having a thickness of 1.2 μm.

Subsequently, the aforementioned charge-generating layer-forming coating solution is spread over the aforementioned subbing layer by a dip coating method, and then heat-dried at 100° C. for 10 minutes to form a charge-generating layer having a thickness of 0.2 μm.

Separately, 4 parts by weight of N,N'-diphenyl-N, N'-bis (3-methylphenyl)-[1,1'-biphenyl]-4,4'-diamine as a charge-transporting material and 6 parts by weight of a bisphenol Z type polycarbonate resin having a viscosity-average molecular weight of 40,000 represented by the general formula (7) as a binder resin are dissolved in 60 parts by weight of tetrahydrofurane to prepare a charge-transporting layer-forming coating solution. The coating solution thus prepared is spread over the aforementioned charge-generating layer by a dip coating method, and then dried at 130° C. for 40 minutes to form a charge-transporting layer having a thickness of 25 μm. Thus, the desired electrophotographic photoreceptor (electrophotographic photoreceptor drum) is prepared.

[Preparation of Electrophotographic Device]

The electrophotographic photoreceptor thus obtained is then mounted on a remodeled version of a full-color printer (DocuCenter C2220, produced by Fuji Xerox Co., Ltd.) having the configuration shown in FIG. 4 to prepare an electrophotographic device.

Example 49

An electrophotographic photoreceptor and an electrophotographic device of Example 49 are prepared in the same manner as in Example 48 except that, as the charge-generating material, there is used the hydroxygallium phthalocyanine pigment of Example 2 instead of the hydroxygallium phthalocyanine pigment of Example 1 and the packing of glass beads and the circulating flow rate of the mixture in the horizontal sandmill during the preparation of the charge-generating layer-forming coating solution are as set forth in Table 6.

Example 50

An electrophotographic photoreceptor and an electrophotographic device of Example 50 are prepared in the same manner as in Example 48 except for using hydroxygallium phthalocyanine dispersion solution prepared in Example 48, as a charge-generating material, without being subjected to centrifugal sedimentation to form a charge-generating layer coating solution.

Examples 51-54

Electrophotographic photoreceptors and electrophotographic devices of Examples 51 to 54 are prepared in the same manner as in Example 48 except that the packing of glass beads and the circulating flow rate of the mixture in the horizontal sandmill during the preparation of the charge-generating layer-forming coating solution are as set forth in Table 6.

Example 55

An electrophotographic photoreceptor and an electrophotographic device of Example 55 are prepared in the same manner as in Example 48 except that, as the charge-generating material, there is used the hydroxygallium phthalocyanine pigment of Comparative Example 1 instead of the hydroxygallium phthalocyanine pigment of Example 1 and the packing of glass beads and the circulating flow rate of the mixture in the horizontal sandmill during the preparation of the charge-generating layer-forming coating solution are as set forth in Table 6.

Comparative Examples 31-33

Electrophotographic photoreceptors and electrophotographic devices of Examples 31 to 33 are prepared in the same manner as in Example 48 except that the packing of glass beads and the circulating flow rate of the mixture in the horizontal sandmill during the preparation of the charge-generating layer-forming coating solution are as set forth in Table 6.

[Measurement of Physical Properties of Hydroxygallium Phthalocyanine Pigment]

The maximum peak wavelength ($\lambda_{MAX}$) of the hydroxygallium phthalocyanine pigments used in Examples 48 to 55 and Comparative Examples 31 and 32 are set forth in Table 6.

TABLE 6

|  | Physical properties of pigment $\lambda_{MAX}$ (nm) | Dispersion conditions | | | |
| --- | --- | --- | --- | --- | --- |
|  |  | Packing fraction of media (vol-%) | Flow rate of mixture (ml/min) | $Vc/V_0$ | Centrifugal sedimentation |
| Example 48 | 827 | 40 | 1,400 | 1 | 8,300 rpm × 30 min |
| Example 49 | 825 | 40 | 1,400 | 1 | 8,300 rpm × 30 min |
| Example 50 | 827 | 40 | 1,400 | 1 | None |
| Example 51 | 827 | 20 | 380 | 0.27 | 8,300 rpm × 30 min |
| Example 52 | 827 | 45 | 380 | 0.27 | 8,300 rpm × 30 min |
| Example 53 | 827 | 15 | 450 | 0.32 | 8,300 rpm × 30 min |
| Example 54 | 827 | 15 | 2,200 | 1.57 | 8,300 rpm × 30 min |
| Example 55 | 846 | 40 | 1,400 | 1 | 8,300 rpm × 30 min |
| Comparative Example 31 | 827 | 15 | 380 | 0.27 | 8,300 rpm × 30 min |

TABLE 6-continued

|  | Physical properties of pigment $\lambda_{MAX}$ (nm) | Dispersion conditions | | | |
|---|---|---|---|---|---|
|  |  | Packing fraction of media (vol-%) | Flow rate of mixture (ml/min) | Vc/V$_0$ | Centrifugal sedimentation |
| Comparative Example 32 | 827 | 70 | 380 | 0.27 | 8,300 rpm × 30 min |
| Comparative Example 33 | 827 | 15 | 3,000 | 2.14 | 8,300 rpm × 30 min |

[Test for Evaluation of Properties of Electrophotographic Photoreceptors and Electrophotographic Devices of Examples 48 to 55 and Comparative Examples 31 to 33]

(1) Evaluation of Properties of Electrophotographic Photoreceptor

Using the electrophotographic devices of Examples 48 to 55 and Comparative Examples 31 to 33, the following steps (A) to (C) are conducted at ordinary temperature and humidity (20° C., 40% RH).

(2) Evaluation of Image Quality

Using the electrophotographic devices of Examples 48 to 55 and Comparative Examples 31 to 33, the image quality at the initial stage and after 100,000 cycles of these steps (A) to (C) is evaluated by the output of images at high temperature and humidity (28C, 85% RH). For the evaluation of image quality, the occurrence of image quality defects such as fogging and ghost is observed. The results are set forth in Table 7.

TABLE 7

| | Properties of electrophotographic photoreceptor | | | | | | Image quality | | | |
|---|---|---|---|---|---|---|---|---|---|---|
| | Initial | | 1st cycle – 2nd cycle | | After 100,000 cycles | | Initial | | After 100,000 cycles | |
| | $V_H$(V) | $V_L$(V) | $\Delta V_H$(V) | $\Delta V_L$(V) | $V_H$(V) | $V_L$(V) | Fogging | Ghost | Fogging | Ghost |
| Example 48 | 700 | 240 | −5 | −6 | 664 | 275 | Good | Good | Good | Good |
| Example 49 | 701 | 241 | −3 | −4 | 677 | 281 | Good | Good | Good | Good |
| Example 50 | 700 | 243 | −6 | −3 | 647 | 291 | Extremely slight | Good | Slight | Good |
| Example 51 | 701 | 251 | −1 | −5 | 673 | 353 | Good | Good | Good | Good |
| Example 52 | 700 | 255 | −10 | −8 | 648 | 333 | Good | Good | Slight | Good |
| Example 53 | 705 | 242 | −4 | −9 | 655 | 286 | Good | Good | Good | Slight |
| Example 54 | 700 | 240 | −8 | −11 | 639 | 281 | Good | Good | Good | Slight |
| Example 55 | 703 | 248 | −6 | −10 | 672 | 305 | Good | Slight | Slight | Good |
| Comparative Example 31 | 702 | 311 | −54 | −63 | 653 | 425 | Fogged | Fogged | Fogged | Fogged |
| Comparative Example 32 | 700 | 426 | −44 | 72 | 620 | 567 | Fogged | Fogged considerably | Fogged considerably | Fogged |
| Comparative Example 33 | 700 | 355 | −44 | 72 | 648 | 437 | Fogged | Fogged | Fogged | Fogged |

(A): Charging step of charging the electrophotographic photoreceptor by a scorotron charger having a grid voltage of −700 V;

(B): Exposure step of irradiating the electrophotographic photoreceptor with light from a semiconductor laser emitting light of 780 nm at a dose of 10.0 erg/cm$^2$ after 1 second from Step (A) to cause discharge;

(C): Discharging step of irradiating the electrophotographic photoreceptor with red LED light at a dose of 50.0 erg/cm$^2$ after 3 seconds from Step (A) to destaticize the electrophotographic photoreceptor.

At this point, using a remodeled scanner of laser printer (remodeled version of XP-15, produced by Fuji Xerox Co., Ltd.), the charging potential $V_H$ at Step (A) and the charging potential $V_L$ at Step (B) are measured. The measurement of $V_H$ and the charging potential $V_L$ is conducted at the initial stage and after 100,000 cycles of these steps. The results are set forth in Table 7.

What is claimed is:

1. A hydroxygallium phthalocyanine pigment characterized by having a maximum peak wavelength within a range of from 810 nm to 839 nm in optical absorption spectrum in a wavelength range of from 600 nm to 900 nm; and diffraction peaks at positions of at least 7.5°, 9.9°, 12.5°, 16.3°, 18.6°, 25.1° and 28.3° in a Bragg angle of the X-ray diffraction spectrum using CuKα characteristic X-rays.

2. The hydroxygallium phthalocyanine pigment according to claim 1, characterized by having an volume average particle diameter equal to or less than 0.20 μm and BET specific surface area equal to or more than 45 m$^2$/g.

3. The hydroxygallium phthalocyanine pigment according to claim 1, characterized by having a maximum primary particle diameter equal to or less than 0.3 μm.

4. The hydroxygallium phthalocyanine pigment according to claim 1, characterized by having a thermal weight loss of from 2.0% to 4.0% when heated from 25° C. to 400° C.

5. A process for producing a hydroxygallium phthalocyanine pigment, comprising:

a wet grinding which causes a hydroxygallium phthalocyanine pigment having diffraction peaks at positions of at least 6.9°, 13.2 to 14.2°, 16.5°, 26.0° and 26.4° or 7.0°, 13.4°, 16.6°, 26.0° and 26.7° in a Bragg angle of X-ray diffraction spectrum using CuKα characteristic X-rays the hydroxygallium phthalocyanine pigment to crystal transformation, wherein the wet grinding uses a grinding device with spherical media having an outer diameter of from 0.1 mm to 3.0 mm in an amount equal to or more than 50 parts by weight based on 1 part by weight of the hydroxygallium phthalocyanine pigment, and time of the wet grinding is determined by the measurements of the absorption wavelength of the hydroxygallium phthalocyanine pigment which is being ground, the Bragg angle represents 2θ±0.2°.

6. The process according to claim 5, further comprising at least one of cleaning with a solvent and heat drying subsequently the wet grinding.

7. An electrophotographic photoreceptor comprising:
a conductive support; and
a photosensitive layer which is disposed on the conductive layer and has a hydroxygallium phthalocyanine pigment characterized by having a maximum peak wavelength within a range of from 810 nm to 839 nm in optical absorption spectrum in a wavelength range of from 600 nm to 900 nm, diffraction peaks at positions of at least 7.5°, 9.9°, 12.5°, 16.3°, 18.6°, 25.1° and 28.3° in a Bragg angle of the X-ray diffraction spectrum using CuKα characteristic X-rays.

8. An electrophotographic photoreceptor comprising:
an conductive support; and
a photosensitive layer which is disposed on the conductive layer and has is formed of a photosensitive layer-forming coating solution produced by a process for producing the photosensitive layer-forming coating solution, the process including:
preparing a dispersion treatment device filled with a dispersion media of 20 to 50% by volume based on the volume of a dispersion chamber; and
introducing a mixture of a pigment, a binder resin and organic solvent into the dispersion chamber so that the mixture is subject to a dispersion treatment to obtain dispersion solution; wherein the pigment is a hydroxygallium phthalocyanine, characterized by having a maximum peak wavelength within a range of from 810 nm to 839 nm in optical absorption spectrum in a wavelength range of from 600 nm to 900 nm, and diffraction peaks at positions of at least 7.5°, 9.9°, 12.5°, 16.3°, 18.6°, 25.1° and 28.3° in a Bragg angle of the X-ray diffraction spectrum using CuKα characteristic X-rays.

9. The electrophotographic photoreceptor according to claim 7, wherein the optical absorption spectrum of the photosensitive layer has an absorption peak wavelength within a range of from 810 nm to 839 nm.

10. A process cartridge comprising:
an electrophotographic photoreceptor including a conductive support and a photosensitive layer which is disposed on the conductive layer and has a hydroxygallium phthalocyanine pigment having a maximum peak wavelength within a range of from 810 nm to 839 nm in optical absorption spectrum in a wavelength range of from 600 nm to 900 nm and diffraction peaks at positions of at least 7.5°, 9.9°, 12.5°, 16.3°, 18.6°, 25.1° and 28.3° in a Bragg angle of the X-ray diffraction spectrum using CuKα characteristic X-rays;
at least one selected from the group consisting of:
a charging unit which charges the electrophotographic photoreceptor;
an exposure unit which forms an electrostatic latent image on the electrophotographic photoreceptor;
a development unit which develops the electrostatic latent image with a toner to form a toner image; and
a cleaning unit which removing the toner left on the electrophotographic photoreceptor.

11. An electrophotographic apparatus comprising:
an electrophotographic photoreceptor including a conductive support and a photosensitive layer which is disposed on the conductive layer and has a hydroxygallium phthalocyanine pigment having a maximum peak wavelength within a range of from 810 nm to 839 nm in optical absorption spectrum in a wavelength range of from 600 nm to 900 nm and diffraction peaks at positions of at least 7.5°, 9.9°, 12.5°, 16.3°, 18.6°, 25.1° and 28.3° in a Bragg angle of the X-ray diffraction spectrum using CuKα characteristic X-rays;
a charging unit which charges the electrophotographic photoreceptor;
an exposure unit which forms an electrostatic latent image on the electrophotographic photoreceptor;
a development unit which develops the electrostatic latent image with a toner to form a toner image; and
a transferring unit which transfers the toner image onto a recording medium.

12. The electrophotographic device according to claim 11, wherein the charging unit controls and adjusts a charging potential so that a charging potential after predetermined times of repetitions of an electrophotographic process including charging by the charging unit, exposure by the exposure unit, development by the development unit and transferring by the transferring unit is lower than a charging potential in a first cycle of the electrophotographic process.

13. The electrophotographic device according to claim 12, wherein the exposure unit forms an electrostatic latent image on the electrophotographic photoreceptor between a time at which the electrophotographic photoreceptor in stationary state is actuated and a time at which the electrophotographic photoreceptor has completed one rotation.

* * * * *